(12) United States Patent
Nienstedt et al.

(10) Patent No.: US 12,487,663 B2
(45) Date of Patent: Dec. 2, 2025

(54) WEARABLE SYSTEM WITH CONTROLLER LOCALIZATION USING HEADSET CAMERAS AND CONTROLLER FIDUCIALS

(71) Applicant: Magic Leap, Inc., Plantation, FL (US)

(72) Inventors: Zachary C. Nienstedt, Fort Lauderdale, FL (US); Daniel Roberts, Davie, FL (US); Christopher Michael Lopez, Davie, FL (US); Brian Edward Oliver Bucknor, Miramar, FL (US); Samuel A. Miller, Hollywood, FL (US); Nathan Yuki Baumli, Dattwil (CH); Dominik Michael Kasper, Zurich (CH); Manel Quim Sanchez Nicuesa, Zurich (CH); Andrea Lampart, Zurich (CH); Rafa Gomez-Jordana Manas, Kilchberg (CH); Martin Georg Zahnert, Zurich (CH); Nikola Stan, Fort Lauderdale, FL (US); Emily Elizabeth Mount, Sunnyvale, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/956,658

(22) Filed: Nov. 22, 2024

(65) Prior Publication Data
US 2025/0076973 A1 Mar. 6, 2025

Related U.S. Application Data

(63) Continuation of application No. PCT/US2023/023268, filed on May 23, 2023.
(Continued)

(51) Int. Cl.
*G06F 3/01* (2006.01)
*G02B 27/00* (2006.01)
(Continued)

(52) U.S. Cl.
CPC .......... *G06F 3/012* (2013.01); *G02B 27/017* (2013.01); *G06T 7/70* (2017.01); *H04N 23/73* (2023.01);
(Continued)

(58) Field of Classification Search
None
See application file for complete search history.

(56) References Cited

U.S. PATENT DOCUMENTS 10,664,993 B1   5/2020   Reddy et al.
11,269,406 B1 *  3/2022  Sztuk ................ G02B 27/0093
(Continued)

FOREIGN PATENT DOCUMENTS

JP    2022523021 A  *  4/2022  ........... G06F 3/0304

OTHER PUBLICATIONS

PCT/US2023/023268, "International Preliminary Report on Patentability", Dec. 5, 2024, 9 pages.
(Continued)

*Primary Examiner* — Ricky Chin
(74) *Attorney, Agent, or Firm* — KILPATRICK TOWNSEND & STOCKTON LLP

(57) ABSTRACT

Wearable systems and method for operation thereof incorporating headset and controller localization using headset cameras and controller fiducials are disclosed. A wearable system may include a headset and a controller. The wearable system may alternate between performing headset tracking and performing controller tracking by repeatedly capturing images using a headset camera of the headset during headset tracking frames and controller tracking frames. The wearable system may cause the headset camera to capture a first exposure image an exposure above a threshold and cause the headset camera to capture a second exposure image having an exposure below the threshold. The wearable system may
(Continued)

determine a fiducial interval during which fiducials of the controller are to flash at a fiducial frequency and a fiducial period. The wearable system may cause the fiducials to flash during the fiducial interval in accordance with the fiducial frequency and the fiducial period.

18 Claims, 43 Drawing Sheets

Related U.S. Application Data

(60) Provisional application No. 63/345,162, filed on May 24, 2022, provisional application No. 63/345,159, filed on May 24, 2022.

(51) Int. Cl.
    *G02B 27/01* (2006.01)
    *G06T 7/70* (2017.01)
    *H04N 23/73* (2023.01)

(52) U.S. Cl.
    CPC .. *G02B 27/0093* (2013.01); *G02B 2027/0138* (2013.01); *G06T 2207/30204* (2013.01)

(56) References Cited

U.S. PATENT DOCUMENTS

| | | | |
|---|---|---|---|
| 11,520,152 B1* | 12/2022 | Lau | G02B 27/0172 |
| 2010/0259474 A1 | 10/2010 | Hildreth | |
| 2017/0026560 A1* | 1/2017 | Whitehouse | H04N 23/73 |
| 2018/0239144 A1 | 8/2018 | Woods et al. | |
| 2019/0324276 A1* | 10/2019 | Edwin | G06V 20/20 |
| 2020/0043236 A1* | 2/2020 | Miller | G06F 3/013 |
| 2020/0333878 A1* | 10/2020 | Steedly | A63F 13/25 |
| 2021/0383551 A1* | 12/2021 | Fiala | G06V 20/20 |
| 2023/0087662 A1* | 3/2023 | Martins Loureiro | G01N 21/93 |
| 2025/0076973 A1* | 3/2025 | Nienstedt | G06T 7/70 |

OTHER PUBLICATIONS

PCT/US2023/023268, "International Search Report and Written Opinion", Sep. 29, 2023, 14 pages.
PCT/US2023/023268, "Invitation to Pay Additional Fees and, Where Applicable, Protest Fee", Jul. 31, 2023, 3 pages.
PCT/US2023/023271, "International Preliminary Report on Patentability", Dec. 5, 2024, 8 pages.
PCT/US2023/023271, "International Search Report and Written Opinion", Sep. 29, 2023, 12 pages.
PCT/US2023/023271, "Invitation to Pay Additional Fees and, Where Applicable, Protest Fee", Jul. 31, 2023, 3 pages.

* cited by examiner

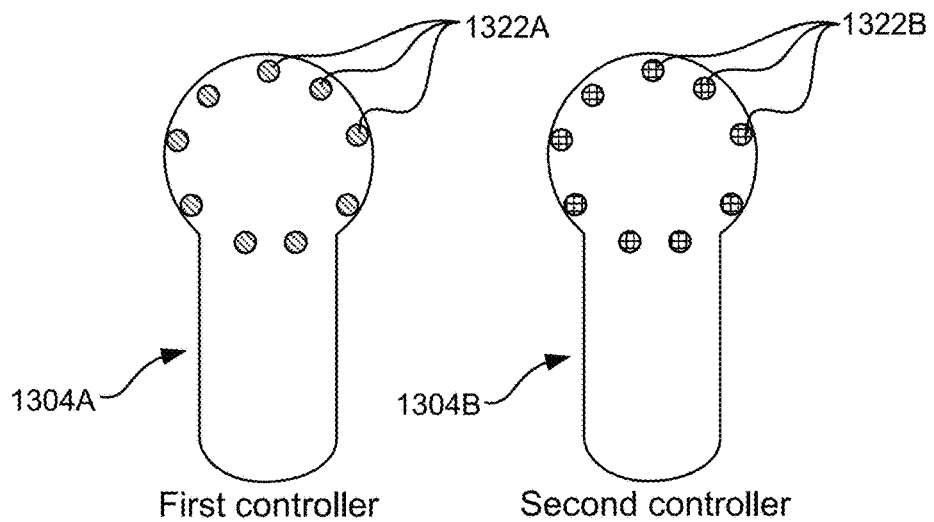
FIG. 13A
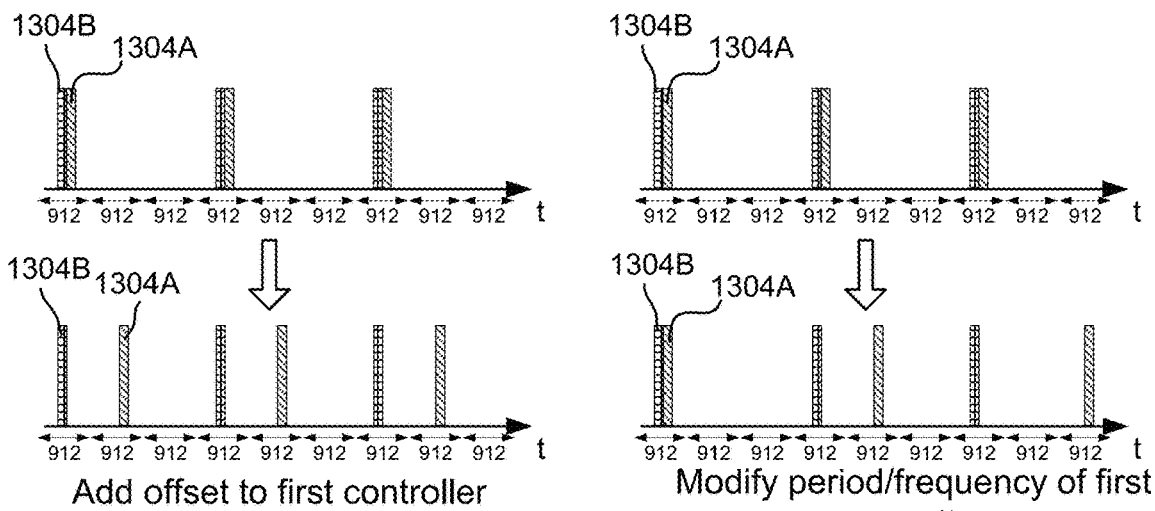
FIG. 13B  FIG. 13C
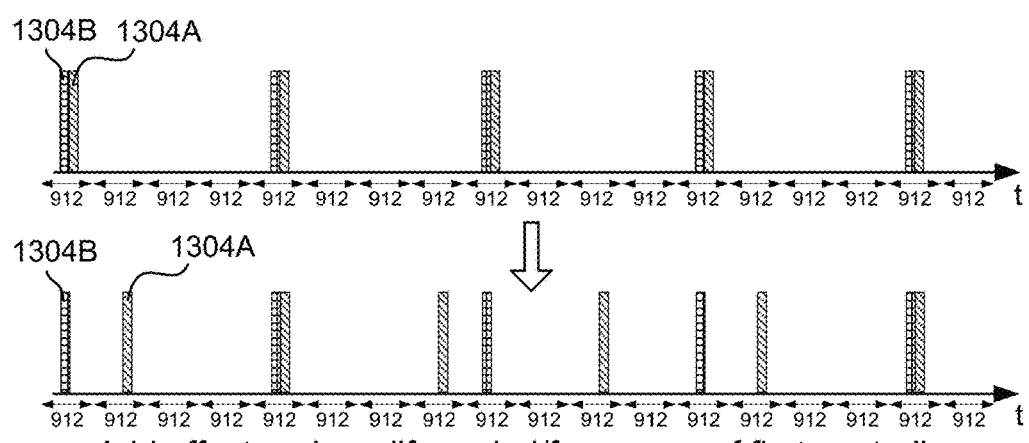
Add offset and modify period/frequency of first controller
FIG. 13D

Introduce coding to first controller

Introduce coding to both controllers

Introduce coding and asymmetric groupings to both controllers

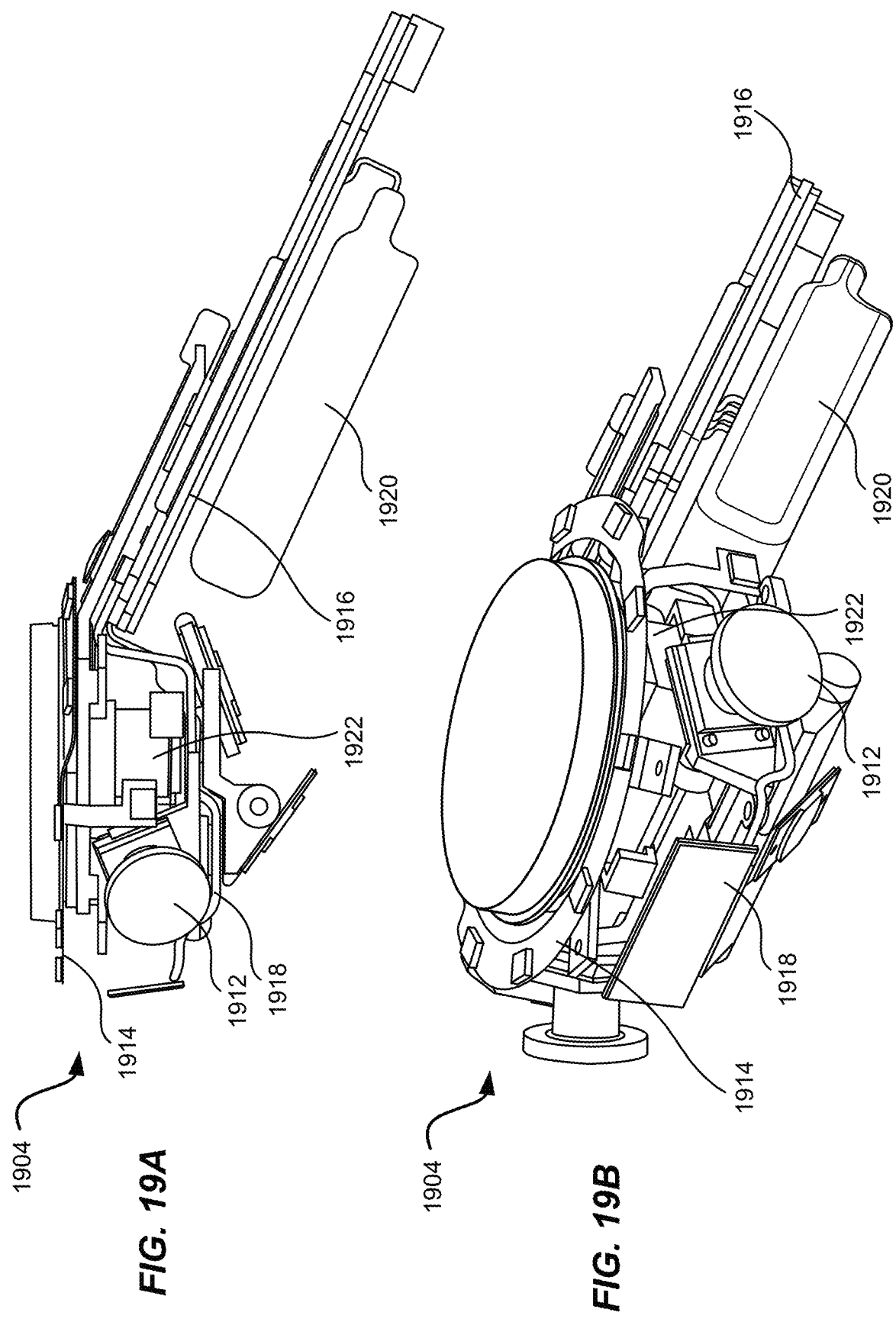

| Fiducials\Detections | 3 | 4 | 5 | 6 | 7 | 8 | 9 | 10 | 11 | 12 |
|---|---|---|---|---|---|---|---|---|---|---|
| 3 | 24 | 96 | 240 | 480 | 840 | 1344 | 2016 | 2880 | 3960 | 5280 |
| 4 | 96 | 384 | 960 | 1920 | 3360 | 5376 | 8064 | 11520 | 15840 | 21120 |
| 5 | 240 | 960 | 2400 | 4800 | 8400 | 13880 | 20160 | 28800 | 39600 | 52800 |
| 6 | 480 | 1920 | 4800 | 9600 | 16800 | 26880 | 40320 | 57600 | 79200 | 105600 |
| 7 | 840 | 3360 | 8400 | 16800 | 29400 | 47040 | 70560 | 100800 | 138600 | 184800 |
| 8 | 1344 | 5376 | 13440 | 26880 | 47040 | 75264 | 112896 | 161280 | 221760 | 295680 |
| 9 | 2016 | 8064 | 20160 | 40320 | 70560 | 112896 | 169344 | 241920 | 332640 | 443520 |
| 10 | 2880 | 11520 | 28800 | 57600 | 100800 | 161280 | 241920 | 345600 | 475200 | 633600 |
| 11 | 3960 | 15840 | 39600 | 79200 | 138600 | 221760 | 332640 | 475200 | 653400 | 871200 |
| 12 | 5280 | 21120 | 52800 | 105600 | 184800 | 295680 | 443520 | 633600 | 871200 | 1161600 |
| 13 | 6864 | 27456 | 68640 | 137280 | 240240 | 384384 | 576576 | 823680 | 1132560 | 1510080 |
| 14 | 8736 | 34944 | 87360 | 174720 | 305760 | 489216 | 733824 | 1048320 | 1441440 | 1921920 |
| 15 | 10920 | 43680 | 109200 | 218400 | 382200 | 611520 | 917280 | 1310400 | 1801800 | 2402400 |

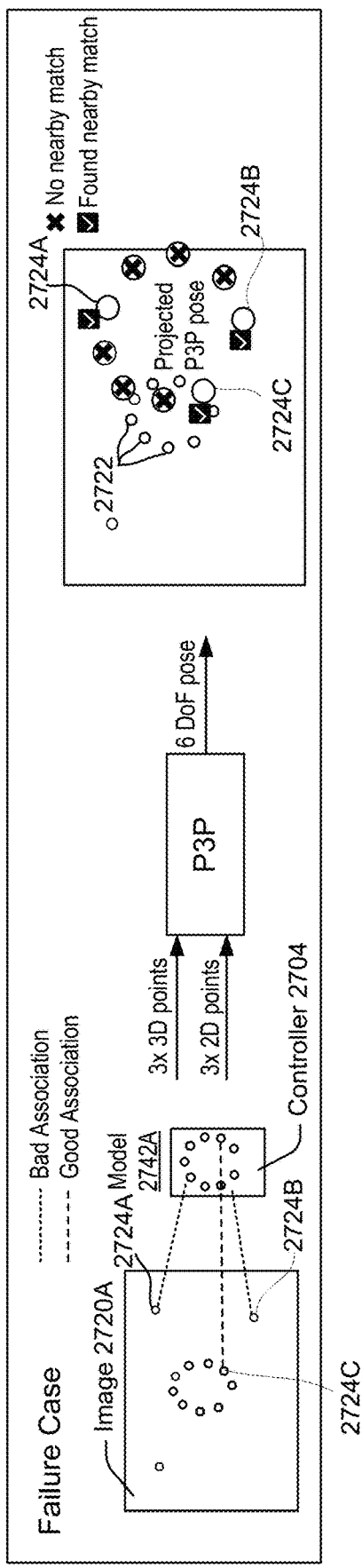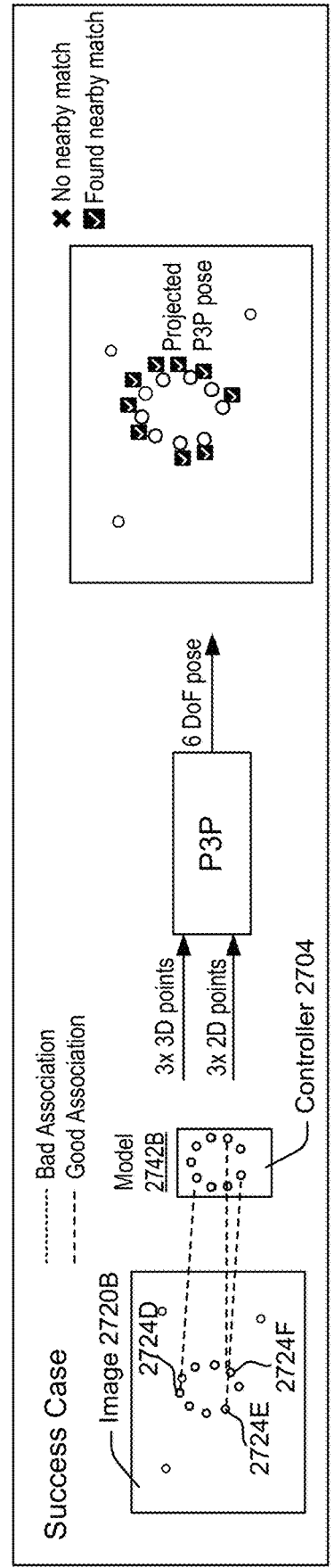
FIG. 27A
FIG. 27B

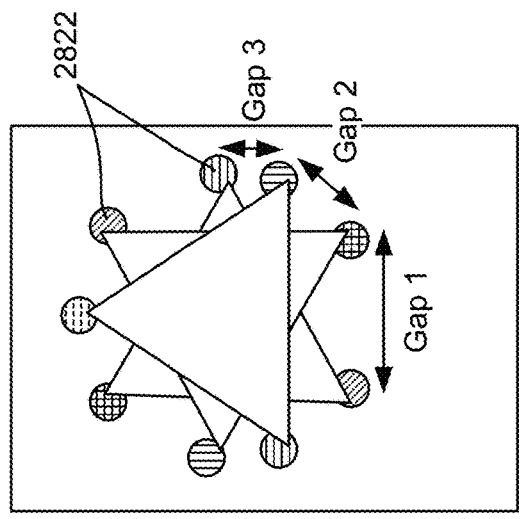
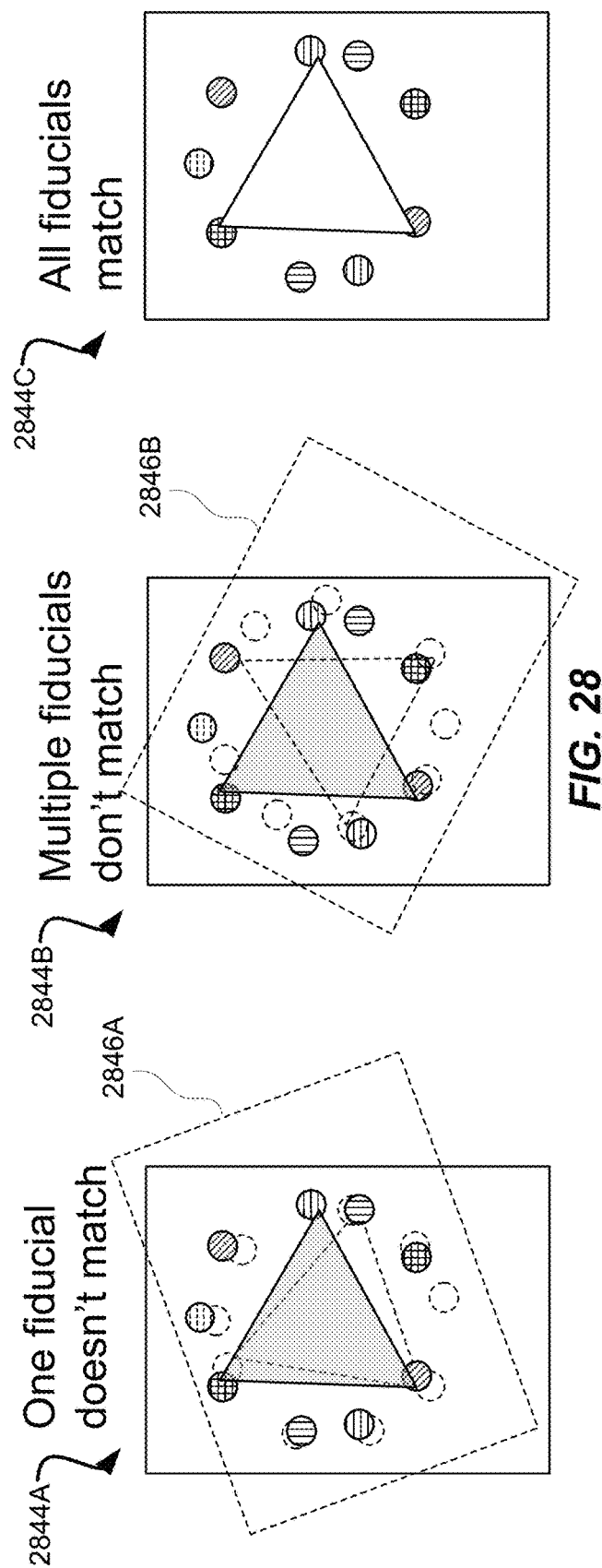
FIG. 28

| Fiducials \ Detections | 3 | 4 | 5 | 6 | 7 | 8 | 9 | 10 | 11 | 12 |
|---|---|---|---|---|---|---|---|---|---|---|
| 3 | 72 | 144 | 240 | 360 | 504 | 672 | 864 | 1080 | 1320 | 1584 |
| 4 | 144 | 288 | 480 | 720 | 1008 | 1344 | 1728 | 2160 | 2640 | 3168 |
| 5 | 240 | 480 | 800 | 1200 | 1680 | 2240 | 2880 | 3600 | 4400 | 5280 |
| 6 | 360 | 720 | 1200 | 1800 | 2520 | 3360 | 4320 | 5400 | 6600 | 7920 |
| 7 | 504 | 1008 | 1680 | 2520 | 3528 | 4704 | 6048 | 7560 | 9240 | 11088 |
| 8 | 672 | 1344 | 2240 | 3360 | 4704 | 6272 | 8064 | 10080 | 12320 | 14784 |
| 9 | 864 | 1728 | 2880 | 4320 | 6048 | 8064 | 10368 | 12960 | 15840 | 19008 |
| 10 | 1080 | 2160 | 3600 | 5400 | 7560 | 10080 | 12960 | 16200 | 19800 | 23760 |
| 11 | 1320 | 2640 | 4400 | 6600 | 9240 | 12320 | 15840 | 19800 | 24200 | 29040 |
| 12 | 1584 | 3168 | 5280 | 7920 | 11088 | 14784 | 19008 | 23760 | 29040 | 34848 |
| 13 | 1872 | 3744 | 6240 | 9360 | 13104 | 17472 | 22464 | 28080 | 34320 | 41184 |
| 14 | 2184 | 4368 | 7280 | 10920 | 15288 | 20384 | 26208 | 32760 | 40040 | 48048 |
| 15 | 2520 | 5040 | 8400 | 12600 | 17640 | 23520 | 30240 | 37800 | 46200 | 55440 |

WEARABLE SYSTEM WITH CONTROLLER LOCALIZATION USING HEADSET CAMERAS AND CONTROLLER FIDUCIALS

CROSS-REFERENCES TO RELATED APPLICATIONS

This application is a continuation of International Patent Application No. PCT/US2023/023268, filed May 23, 2023, entitled "WEARABLE SYSTEM WITH CONTROLLER LOCALIZATION USING HEADSET CAMERAS AND CONTROLLER FIDUCIALS," which claims the benefit of and priority to U.S. Provisional Patent Application No. 63/345,159, filed May 24, 2022, entitled "WEARABLE SYSTEM WITH CONTROLLER LOCALIZATION USING HEADSET CAMERAS AND CONTROLLER FIDUCIALS," and U.S. Provisional Patent Application No. 63/345,162, filed May 24, 2022, entitled "WEARABLE SYSTEM WITH HEADSET AND CONTROLLER INSIDE-OUT TRACKING," the entire disclosures of which are incorporated herein by reference for all purposes.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems.

BRIEF SUMMARY OF THE INVENTION

The present disclosure relates generally to techniques for improving the performance and user experience of optical systems. More particularly, embodiments of the present disclosure provide methods for operating an augmented reality (AR), virtual reality (VR), or mixed reality (MR) wearable system in which a handheld device is employed for assisting operation of the wearable system. Although portions of the present disclosure are described in reference to an AR system, the disclosure is applicable to a variety of applications.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of operating a wearable system having a headset and a controller, the method comprising: alternating between performing headset tracking and performing controller tracking by repeatedly capturing images using a headset camera of the headset during headset tracking frames and controller tracking frames, respectively; during each of the headset tracking frames: causing the headset camera to capture a first exposure image of the images having an exposure above a threshold, wherein the first exposure image is associated with a first exposure interval defined by a first exposure start time, a first exposure end time, and a first exposure duration; during each of the controller tracking frames: causing the headset camera to capture a second exposure image of the images having an exposure below the threshold, wherein the second exposure image is associated with a second exposure interval defined by a second exposure start time, a second exposure end time, and a second exposure duration, wherein the second exposure duration is less than the first exposure duration; determining a fiducial interval defined by a fiducial start time and a fiducial end time during which a set of fiducials of the controller are to flash multiple times at a fiducial frequency and a fiducial period, wherein the fiducial interval is determined such that the second exposure interval at least partially overlaps with the fiducial interval; and causing the set of fiducials to flash multiple times during the fiducial interval in accordance with the fiducial frequency and the fiducial period.

Example 2 is the method of example(s) 1, wherein the wearable system comprises: the headset comprising: the headset camera; and a headset inertial measurement unit; and the controller comprising: the set of fiducials arranged in a known geometry; one or more controller cameras; and a controller inertial measurement unit; wherein the wearable system is configured to determine a position or orientation of the headset or the controller based on data captured by the headset camera, the one or more controller cameras, the headset inertial measurement unit, or the controller inertial measurement unit.

Example 3 is the method of example(s) 2, wherein operating the wearable system comprises: determining a first pose of the headset with respect to a reference frame based on data captured by the headset camera of the headset or the headset inertial measurement unit of the headset; causing the set of fiducials of the controller to flash; determining a second pose of the controller with respect to the headset by: capturing a headset image using the headset camera; identifying the set of fiducials in the headset image; and determining the second pose of the controller with respect to the headset based on the set of fiducials identified in the headset image and the known geometry.

Example 4 is the method of example(s) 1, wherein the fiducial interval is determined such that the second exposure interval is centered with the fiducial interval.

Example 5 is the method of example(s) 1, wherein a first length of time of a headset tracking frame of the headset tracking frames is equal to a second length of time of a controller tracking frame of the controller tracking frames.

Example 6 is the method of example(s) 1, wherein the first exposure duration comprises at least one millisecond.

Example 7 is a method of operating a wearable system comprising a headset, the method comprising: capturing a set of images using a headset camera of the headset; identifying a plurality of fiducials in the set of images that are repeatedly flashing; determining that at least some of the plurality of fiducials include a first set of fiducials belonging to a first controller and a second set of fiducials belonging to a second controller different than the first controller; determining that a flashing of the first set of fiducials is at least partially temporally aligned with a flashing of the second set of fiducials; causing a modification to a period, a frequency, or an offset associated with at least one of the first set of fiducials or the second set of fiducials to misalign the flashing of the first set of fiducials and the second set of fiducials.

Example 8 is the method of example(s) 7, wherein causing the modification comprises: causing the first controller to modify a first period, a first frequency, or a first offset associated with the first set of fiducials to misalign the flashing of the first set of fiducials and the second set of fiducials.

Example 9 is the method of example(s) 8, wherein causing the modification further comprises: causing the second controller to modify a second period, a second frequency, or a second offset associated with the second set of fiducials to misalign the flashing of the first set of fiducials and the second set of fiducials.

Example 10 is the method of example(s) 7, wherein causing the modification comprises: causing the first controller to modify the flashing of the first set of fiducials to be encoded with a first coding.

Example 11 is the method of example(s) 10, wherein causing the modification further comprises: causing the second controller to modify the flashing of the second set of fiducials to be encoded with a second coding.

Example 12 is the method of example(s) 7, further comprising: performing controller tracking for the first controller by: causing the headset camera to capture an image of the set of images having an exposure below a threshold, wherein the image is associated with an exposure interval defined by an exposure start time, an exposure end time, and an exposure duration; determining a fiducial interval defined by a fiducial start time and a fiducial end time during which the first set of fiducials of the first controller are to flash multiple times at a fiducial frequency and a fiducial period, wherein the fiducial interval is determined such that the exposure interval at least partially overlaps with the fiducial interval; and causing the first set of fiducials to flash multiple times during the fiducial interval in accordance with the fiducial frequency and the fiducial period.

Example 13 is the method of example(s) 7, wherein the first controller comprises the first set of fiducials arranged in a known geometry and the second controller comprises the second set of fiducials arranged in the known geometry, and wherein the method further comprises: causing a first subset of the first set of fiducials to flash at the first controller; and causing a second subset of the second set of fiducials to flash at the second controller, wherein the first subset and the second subset are asymmetric with respect to each other.

Example 14 is a method of operating a wearable system comprising a headset and a controller having a display, the method comprising: causing the controller to display a set of fiducials on the display in accordance with a set of pixel locations; capturing a set of images using a headset camera of the headset; identifying the set of fiducials in the set of images; and determining a position and/or orientation of the controller with respect to the headset based on the identified set of fiducials in the set of images.

Example 15 is the method of example(s) 14, further comprising: causing the set of fiducials to flash in accordance with a period and a frequency.

Example 16 is the method of example(s) 15, further comprising: causing the controller to modify the period, the frequency, or the set of pixel locations.

Example 17 is the method of example(s) 14, further comprising: identifying a second set of fiducials belonging to a second controller in the set of images; and causing the controller to modify the period, the frequency, or the set of pixel locations in response to identifying the second set of fiducials.

Example 18 is the method of example(s) 17, further comprising: identifying a first geometry of the second set of fiducials; and causing the controller to display the set of fiducials in a second geometry that is different than the first geometry.

Example 19 is the method of example(s) 14, further comprising: synchronizing the displaying of the set of fiducials with at least one exposure interval of the headset camera.

Example 20 is the method of example(s) 19, wherein the at least one exposure interval comprises a first exposure interval during a headset tracking frame and a second exposure interval during a controller tracking frame, wherein the headset tracking frame comprises: causing the headset camera to capture a first exposure image of the set of images having an exposure above a threshold, wherein the first exposure image is associated with the first exposure interval defined by a first exposure start time, a first exposure end time, and a first exposure duration; and wherein the controller tracking frame comprises: causing the headset camera to capture a second exposure image of the set of images having an exposure below the threshold, wherein the second exposure image is associated with the second exposure interval defined by a second exposure start time, a second exposure end time, and a second exposure duration, wherein the second exposure duration is less than the first exposure duration; and determining a fiducial interval defined by a fiducial start time and a fiducial end time during which the set of fiducials are to flash multiple times at a fiducial frequency and a fiducial period, wherein the fiducial interval is determined such that the second exposure interval at least partially overlaps with the fiducial interval.

Example 21 is the method of example(s) 14, further comprising: causing the controller to display one or more buttons configured to receive user input on the display in accordance with a second set of pixel locations.

Example 22 is the method of example(s) 14, wherein the controller comprises a mobile device.

Example 23 is a modular controller for use in a wearable system, the modular controller comprising one or more of a set of components comprising: a visual inertial odometry (VIO) module; a constellation module; a main printed circuit board (PCB); a battery; a wireless communications engine; a user input including at least one of: (i) a trigger, (ii) a bumper, or (iii) a touchpad; a haptics engine; and/or a user indicator; wherein one or more of the set of components can be independently removed or added while maintaining at least some functionality of the modular controller.

Example 24 is the modular controller of example(s) 23, wherein the modular controller is powered and communicates by a universal serial bus (USB) connection.

Example 25 is the modular controller of example(s) 23, wherein the modular controller comprises a minimum size of 84 mm long, 64 mm wide, and 18 mm thick.

Example 26 is the modular controller of example(s) 23, wherein the modular controller comprises a minimum size of a 64 mm diameter and 18 mm thick.

Example 27 is the modular controller of example(s) 23, wherein the modular controller comprises a minimum size of a 50 mm diameter and 15 mm thick.

Example 28 is the modular controller of example(s) 23, wherein the modular controller is integrated into a drone that is controllable by an application on the wearable system, and wherein the wearable system is configured to identify a set of fiducials of the constellation module to localize the drone.

Example 29 is a method of operating a wearable system having a headset and a controller, the method comprising: causing a set of fiducials of the controller to flash, the set of fiducials being arranged in a known geometry that includes multiple groups of fiducials that are rotationally symmetric with respect to each other, wherein a quantity of each of the multiple groups of fiducials is equal to a predetermined number, wherein the predetermined number is at least three; causing a headset camera of the headset to capture an image; identifying a set of objects in the image that correspond to fiducials; and associating the set of objects with the set of fiducials based on the known geometry by: repeatedly selecting subsets of the set of objects, wherein each of the subsets has a quantity equal to the predetermined number, and calculating poses for the controller by associating the subsets with the multiple groups of fiducials; calculating statistics for the associated subsets based on a compatibility of poses for the multiple groups of fiducials; and finding a correct association between the set of objects and the set of fiducials based on the calculated statistics.

Example 30 is the method of example(s) 29, wherein calculating the poses comprises: inputting the subsets of the set of objects into a perspective-3-point algorithm configured to output the poses for the controller.

Example 31 is the method of example(s) 29, wherein the known geometry comprises a first gap between a first pair of adjacent fiducials of the set of fiducials that is larger than other gaps between other pairs of adjacent fiducials of the set of fiducials.

Example 32 is the method of example(s) 29, wherein the set of objects correspond to the set of fiducials and/or one or more light sources projected in the image.

Example 33 is the method of example(s) 29, wherein calculating the statistics for the associated subsets comprises: determining a number of the set of objects that align with the set of fiducials for each of the poses.

Example 34 is the method of example(s) 29, further comprising: identifying a second set of fiducials belonging to a second controller in the image; and causing the controller to modify a period, a frequency, or an offset of flashing of the set of fiducials to misalign the set of fiducials from the second set of fiducials in response to identifying the second set of fiducials.

Example 35 is a method of operating a wearable system having a headset and a controller, the method comprising: causing a set of fiducials of the controller to flash, the set of fiducials being arranged in a known geometry; causing a headset camera of the headset to capture an image; identifying a set of objects in the image that correspond to fiducials; capturing a rotation measurement using a controller inertial measurement unit of the controller; and associating the set of objects with the set of fiducials based on the known geometry by: repeatedly selecting subsets of the set of objects and calculating poses for the controller by associating the subsets with multiple groups of fiducials; calculating statistics for the associated subsets based on a compatibility of poses for the multiple groups of fiducials and based on the rotation measurement; and finding a correct association between the set of objects and the set of fiducials based on the calculated statistics.

Example 36 is the method of example(s) 35, wherein calculating the poses comprises: inputting the subsets of the set of objects into a perspective-2-point algorithm configured to output the poses for the controller.

Example 37 is the method of example(s) 36, wherein the perspective-2-point algorithm comprises a gravity-based perspective-2-point algorithm.

Example 38 is the method of example(s) 35, wherein the set of objects correspond to the set of fiducials and/or one or more light sources projected in the image.

Example 39 is the method of example(s) 35, wherein calculating the statistics for the associated subsets comprises: determining a number of the set of objects that align with the set of fiducials for each of the poses.

Example 40 is the method of example(s) 35, further comprising: identifying a second set of fiducials belonging to a second controller in the image; and causing the controller to modify a period, a frequency, or an offset of flashing of the set of fiducials to misalign the set of fiducials from the second set of fiducials in response to identifying the second set of fiducials.

Example 41 is the method of example(s) 35, wherein the wearable system comprises: a headset comprising: the headset camera; and a headset inertial measurement unit; and a controller comprising: the set of fiducials arranged in the known geometry; one or more controller cameras; and the controller inertial measurement unit; wherein the wearable system is configured to determine a position or orientation of the headset or the controller based on data captured by the headset camera, the one or more controller cameras, the headset inertial measurement unit, or the controller inertial measurement unit.

Example 42 is a method of operating a wearable system having a headset and a controller, the method comprising: causing a set of fiducials of the controller to flash, the set of fiducials being arranged in a known geometry; causing a headset camera of the headset to capture an image; identifying a set of objects in the image that correspond to fiducials; using hand tracking data to identify a position of a hand in the image; and associating the set of objects with the set of fiducials by: determining a region of interest in the image based on the position of the hand in the image; excluding a first subset of the set of objects that are outside of the region of interest; and associating a second subset of the set of objects that are inside the region of interest with the set of fiducials, wherein the first subset and the second subset are mutually exclusive.

Example 43 is the method of example(s) 42, further comprising: using the hand tracking data to identify an orientation of the hand in the image; and determining the region of interest based on the orientation of the hand in the image.

Example 44 is the method of example(s) 43, wherein determining the region of interest based on the orientation of the hand in the image comprises skewing the region of interest in a direction in which the controller is being held according to the orientation.

Example 45 is a method of operating a wearable system having a headset and a controller, the method comprising: causing a set of fiducials of the controller to flash, the set of fiducials being arranged in a known geometry; causing a headset camera of the headset to capture an image; using hand tracking data to identify a position of a hand in the image; determining a region of interest in the image based on the position of the hand in the image; identifying a set of objects in the region of interest in the image that correspond to fiducials; and associating the set of objects in the region of interest with the set of fiducials.

Example 46 is the method of example(s) 45, further comprising: using the hand tracking data to identify an orientation of the hand in the image; and determining the region of interest based on the orientation of the hand in the image.

Example 47 is the method of example(s) 45, wherein determining the region of interest based on the orientation of the hand in the image comprises skewing the region of interest in a direction in which the controller is being held according to the orientation.

Example 48 is a method of operating a wearable system having a headset and a controller, the method comprising: maintaining a calibration profile that models a physical relationship between a first headset camera of the headset and a second headset camera of the headset; causing a set of fiducials of the controller to flash, the set of fiducials being arranged in a known geometry; causing the first headset camera to capture first images and the second headset camera to capture second images; identifying the set of fiducials in the first images and the second images; and performing one or both of: detecting a level of calibration of the calibration profile based on the identified set of fiducials in the first images and the second images and based on the known geometry; or modifying the calibration profile based on the identified set of fiducials in the first images and the second images and based on the known geometry.

Example 49 is the method of example(s) 48, wherein the calibration profile comprises a translation parameter corresponding to a relative distance between the first headset camera and the second headset camera.

Example 50 is the method of example(s) 49, wherein the calibration profile further comprises a rotation parameter corresponding to a relative angular orientation between the first headset camera and the second headset camera.

Example 51 is the method of example(s) 50, wherein each of the translation parameter and the rotation parameter comprises a single quantity, a one-dimensional matrix, a multi-dimensional matrix, an array, or a vector.

Example 52 is the method of example(s) 49, further comprising: determining a center point between the first headset camera and the second headset camera, wherein a first distance between the first headset camera and the center point and a second distance between the second headset camera and the center point are equal to the translation parameter.

Example 53 is the method of example(s) 48, wherein determining the level of calibration comprises: generating an epipolar line based on the first images; projecting the epipolar line onto the second images using the calibration profile; and determining the level of calibration based on a deviation of the set of fiducials from the epipolar line in the second images.

Example 54 is the method of example(s) 53, wherein the deviation corresponds to a calibration error between the first headset camera and the second headset camera, and wherein the method further comprises: adjusting the first headset camera and/or the second headset camera based on the deviation.

Example 55 is a wearable system configured to perform the method of any of example(s) 1-54.

Example 56 is a non-transitory computer-readable medium comprising instructions that, when executed by one or more processors, cause the one or more processors to perform operations of the method of any of example(s) 1-54.

BRIEF DESCRIPTION OF THE DRAWINGS

FIGS. 13A-13D illustrate disambiguation using misaligning flashing of fiducials;

FIGS. 19A-19B illustrate exemplary internal perspective views of a controller of a wearable system;

FIG. 27A illustrates a failure case of associating detections with fiducials to determine a pose of a controller;

FIG. 27B illustrates a success case of associating detections with fiducials to determine a pose of the controller;

FIG. 28 illustrates another example of associating fiducials of a controller with objects
in an image;

DETAILED DESCRIPTION OF THE INVENTION

Figure 1:
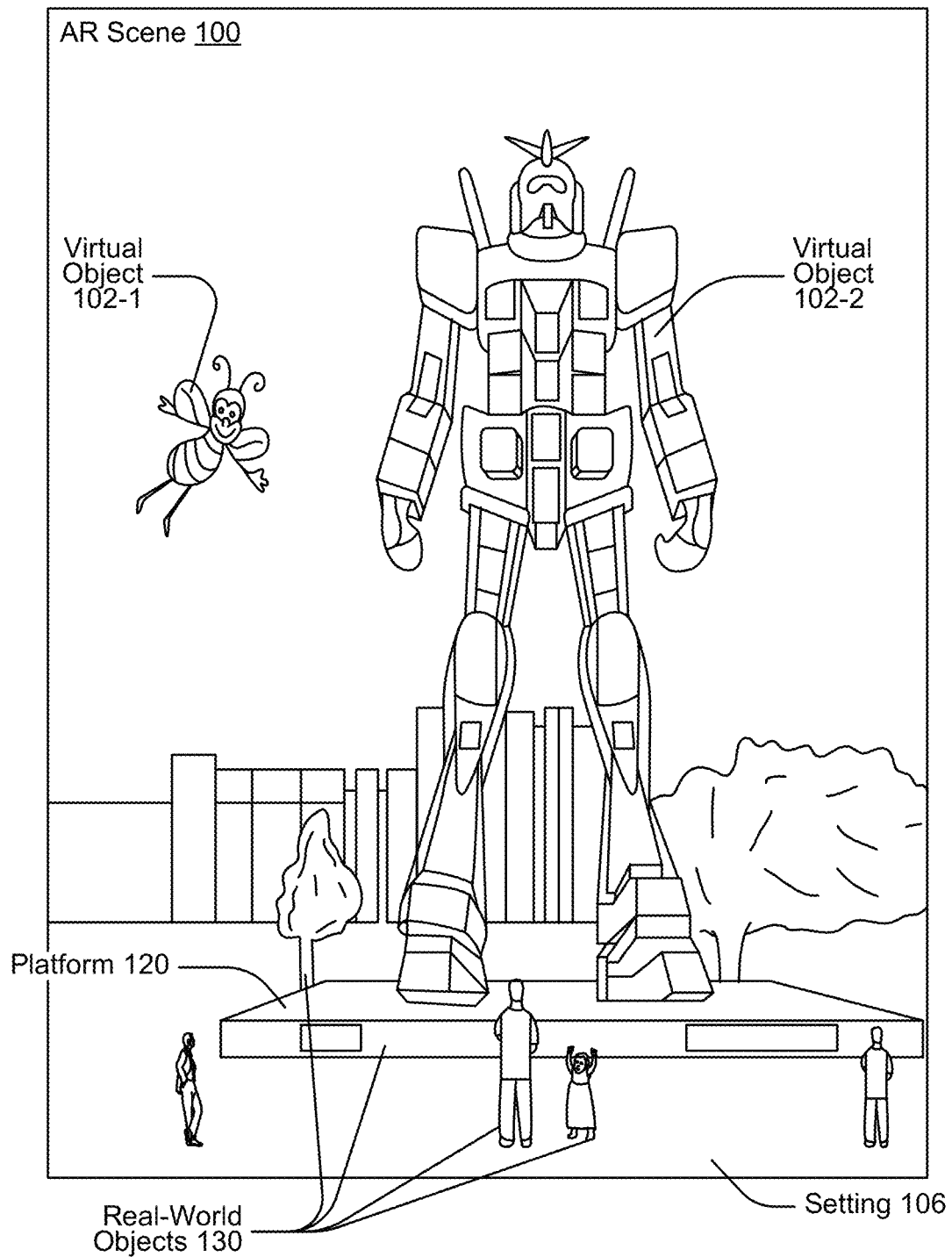
FIG. 1 illustrates an augmented reality scene as viewed through a wearable augmented reality device.

Some aspects of the present disclose relate to localization (e.g., position, orientation, and/or distance) of a handheld device, such as a controller, with respect to a wearable device, such as an augmented reality (AR), virtual reality (VR), or mixed reality (MR) headset. In some instances, six degrees of freedom (6DOF) pose tracking of the headset may be performed using one or more headset sensors, such as one or more headset inertial measurement units (IMUs) and one or more headset cameras in a technique referred to as "headset inside-out tracking". For each image captured by the headset cameras, features may be identified in the image and the pixel positions of the identified features may be compared to pixel positions of the same features in other images, allowing for the 6DOF pose of the headset to be calculated for each image.

Concurrently, 6DOF pose tracking of the controller may be performed using a combination of headset sensors and controller sensors or components, and using one or both of two separate techniques. The first technique is referred to as "controller inside-out tracking", which is 6DOF pose tracking of the controller based on images captured of the real-world environment by cameras on the controller. For each captured image, features may be identified and the pixel positions of the identified features may be compared to pixel positions of the same features in other images, allowing for the 6DOF pose of the controller to be calculated for each image. The second technique is referred to as "constellation tracking", which is 6DOF pose tracking of the controller based on images captured of fiducials (e.g., light-emitting diodes (LEDs)) affixed to the controller by cameras on the headset. The fiducials may be programmed to flash (i.e., emit light) while the headset camera is exposed so that each captured image contains the flashed fiducials, which may then be identified by an imaging processing routine. The pixel positions of the identified fiducials in the images may be determined, and the identified fiducials may be associated with the fiducial's known geometry so that the 6DOF pose of the controller may be determined.

During operation of the wearable system, one or both of these controller pose tracking techniques may be used. For example, if controller inside-out tracking is unavailable (e.g., images of the environment do not include a sufficient number of features due to, e.g., low light conditions), the wearable system may rely on constellation tracking. Conversely, if constellation tracking is unavailable (e.g., controller fiducials are not within the headset camera's field of view), the wearable system may rely on controller inside-out tracking. Furthermore, if both tracking techniques are available, the tracking data produced by the two techniques may be fused together.

In conventional VR or AR systems, 6DOF pose tracking of a peripheral device is achieved by incorporating a series of electromagnetic sensors and emitters that are strategically placed on the user's AR headset, remote device, and/or other ancillary devices (e.g., totems, haptic devices, gaming instruments, etc.). Typically, electromagnetic tracking systems include at least one electromagnetic field emitter and at least one electromagnetic field sensor. Because the emitted electromagnetic fields have a known distribution, the detected fields may be analyzed to determine a position and/or orientation of the peripheral device. Although such systems offer a simple solution to the localization problem, there is a need for additional solutions that offer higher accuracy localization. Embodiments of the present disclosure can replace or supplement electromagnetic tracking systems.

When employed in an AR system, the 6DOF pose tracking information of the handheld device may facilitate the operation of the AR system. For example, the AR system may generate virtual content representing or interacting with the controller that feels comfortable to the user. For example, during a game in which multiple users play with a virtual ball and a virtual bat, the AR system may generate virtual content for the virtual bat that is accurately positioned and oriented with the controller of the user that is holding the bat.

FIG. 1 illustrates an AR scene 100 as viewed through a wearable AR device, according to some embodiments of the present disclosure. The AR scene 100 is depicted wherein a user of an AR technology sees a real-world park-like setting 106 featuring various real-world objects 130 such as people, trees, buildings in the background, and a real-world concrete platform 120. In addition to these items, the user of the AR technology also perceives that they "see" various virtual objects 102 such as a robot statue 102-2 standing upon the real-world concrete platform 120, and a cartoon-like avatar character 102-1 flying by, which seems to be a personification of a bumble bee, even though these elements (character 102-1 and statue 102-2) do not exist in the real world. Due to the extreme complexity of the human visual perception and nervous system, it is challenging to produce a VR or AR technology that facilitates a comfortable, natural-feeling, rich presentation of virtual image elements amongst other virtual or real-world imagery elements.

Figure 2A:
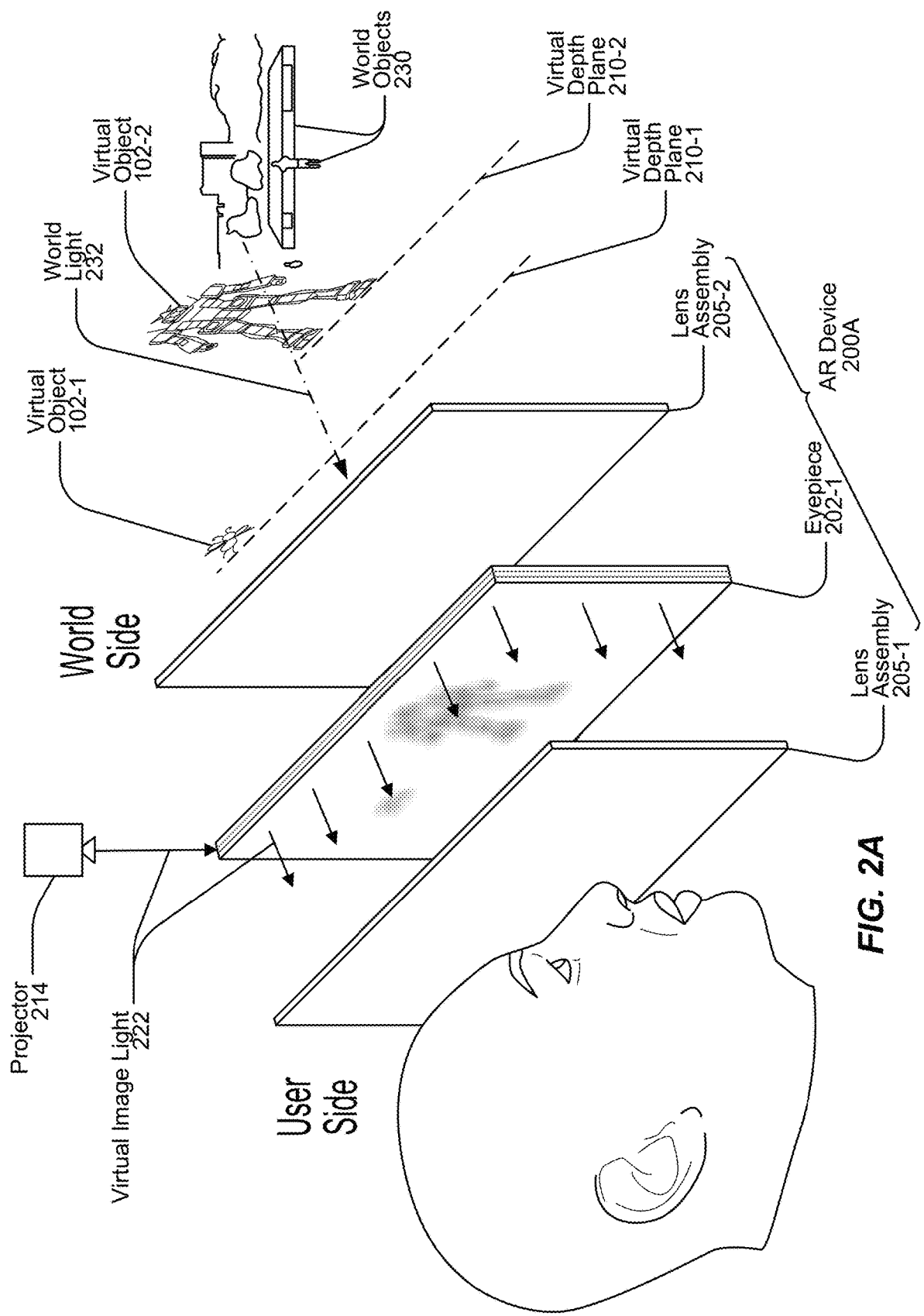
FIGS. 2A-2B illustrate an augmented reality device having fixed focal planes.

FIG. 2A illustrates an AR device 200A having a single fixed focal plane, according to some embodiments of the present disclosure. During operation, a projector 214 of the AR device 200A may project virtual image light 222 (i.e., light associated with virtual content) onto an eyepiece 202-1, which may cause a light field (i.e., an angular representation of virtual content) to be projected onto a retina of a user in a manner such that the user perceives the corresponding virtual content as being positioned at some location within an environment of the user. For example, the virtual image light 222 outcoupled by the eyepiece 202-1 may cause the user to perceive the character 102-1 as being positioned at a first virtual depth plane 210-1 and the statue 102-2 as being positioned at a second virtual depth plane 210-2. The user perceives the virtual content along with world light 232 corresponding to one or more world objects 230, such as the platform 120. In some embodiments, the AR device 200A includes a first lens assembly 205-1 positioned on the user side of the eyepiece 202-1 (the side of the eyepiece 202-1 closest to the eye of the user) and a second lens assembly 205-2 positioned on the world side of the eyepiece 202-1. Each of the lens assemblies 205-1, 205-2 may be configured to apply optical power to the light passing therethrough.

Figure 2B:
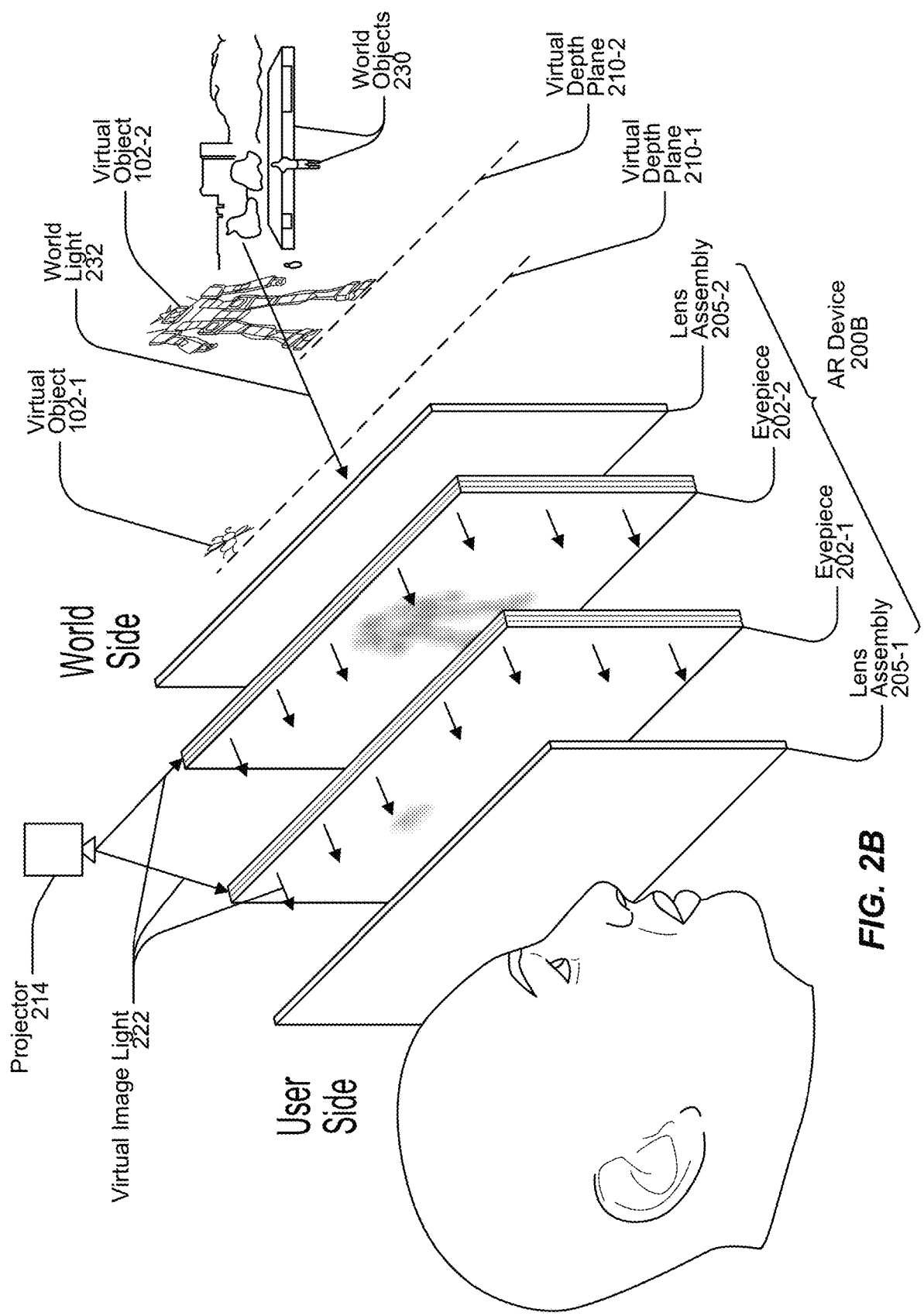

FIG. 2B illustrates an AR device 200B having two fixed focal planes, according to some embodiments of the present disclosure. During operation, the projector 214 may project the virtual image light 222 onto the first eyepiece 202-1 and a second eyepiece 202-2, which may cause a light field to be projected onto a retina of a user in a manner such that the user perceives the corresponding virtual content as being positioned at some location within an environment of the user. For example, the virtual image light 222 outcoupled by the first eyepiece 202-1 may cause the user to perceive the character 102-1 as being positioned at a first virtual depth plane 210-1 and the virtual image light 222 outcoupled by the second eyepiece 202-2 may cause the user to perceive the statue 102-2 as being positioned at a second virtual depth plane 210-2.

Figure 3:
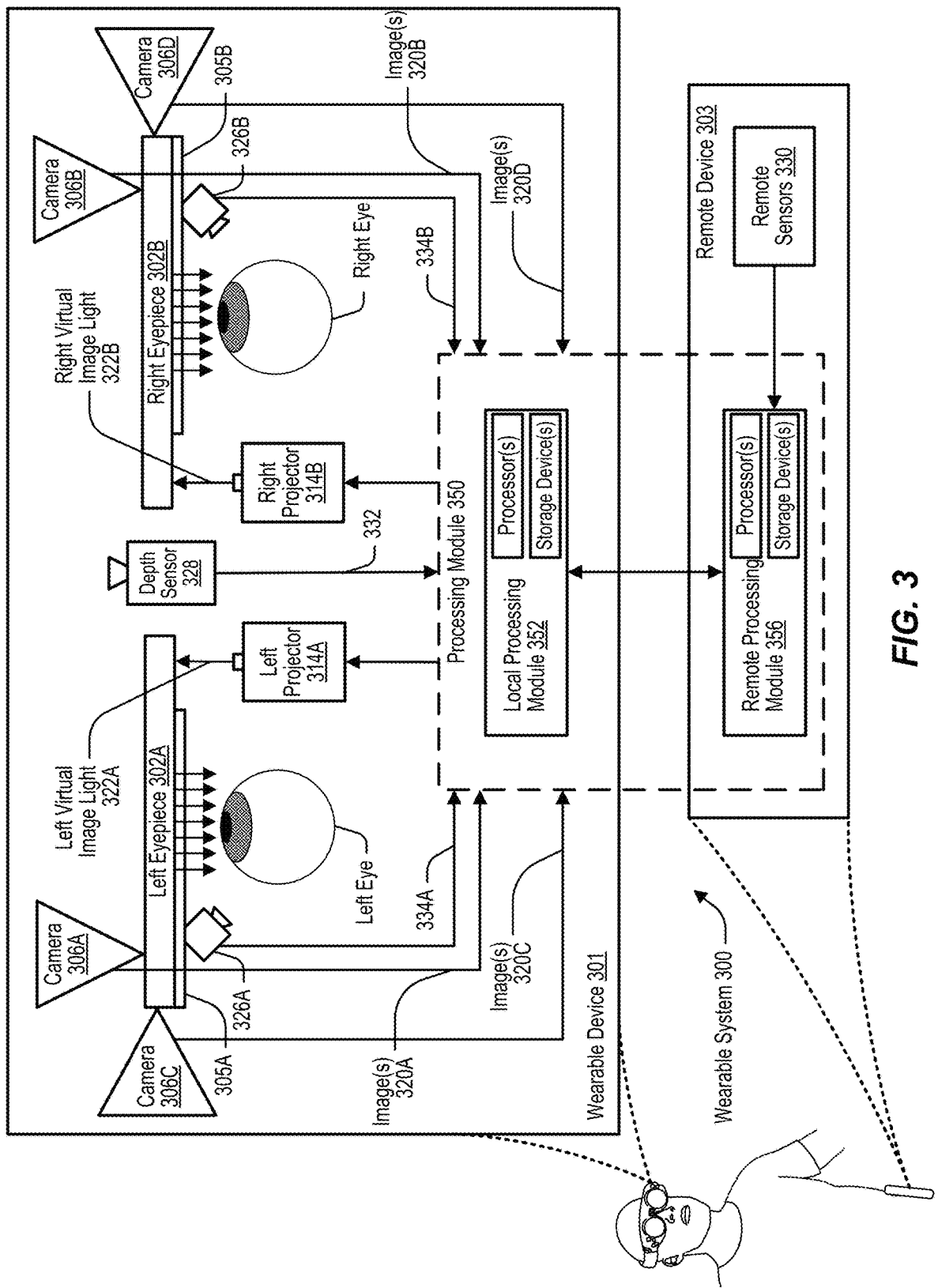
FIG. 3 illustrates a schematic view of an example wearable system.

FIG. 3 illustrates a schematic view of an example wearable system 300, according to some embodiments of the present disclosure. The wearable system 300 may include a wearable device 301 and at least one remote device 303 that is remote from the wearable device 301 (e.g., separate hardware but communicatively coupled). While the wearable device 301 is worn by a user (generally as a headset), the remote device 303 may be held by the user (e.g., as a handheld controller) or mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

The wearable device 301 may include a left eyepiece 302A and a left lens assembly 305A arranged in a side-by-side configuration and constituting a left optical stack. The left lens assembly 305A may include an accommodating lens on the user side of the left optical stack as well as a compensating lens on the world side of the left optical stack. Similarly, the wearable device 301 may include a right eyepiece 302B and a right lens assembly 305B arranged in a side-by-side configuration and constituting a right optical stack. The right lens assembly 305B may include an accommodating lens on the user side of the right optical stack as well as a compensating lens on the world side of the right optical stack.

In some embodiments, the wearable device 301 includes one or more sensors including, but not limited to: a left front-facing world camera 306A attached directly to or near the left eyepiece 302A, a right front-facing world camera 306B attached directly to or near the right eyepiece 302B, a left side-facing world camera 306C attached directly to or near the left eyepiece 302A, a right side-facing world camera 306D attached directly to or near the right eyepiece 302B, a left eye tracking camera 326A directed toward the left eye, a right eye tracking camera 326B directed toward the right eye, and a depth sensor 328 attached between eyepieces 302. The wearable device 301 may include one or more image projection devices such as a left projector 314A optically linked to the left eyepiece 302A and a right projector 314B optically linked to the right eyepiece 302B.

The wearable system 300 may include a processing module 350 for collecting, processing, and/or controlling data within the system. Components of the processing module 350 may be distributed between the wearable device 301 and the remote device 303. For example, the processing module 350 may include a local processing module 352 on the wearable portion of the wearable system 300 and a remote processing module 356 physically separate from and communicatively linked to the local processing module 352. Each of the local processing module 352 and the remote processing module 356 may include one or more processing units (e.g., central processing units (CPUs), graphics processing units (GPUs), etc.) and one or more storage devices, such as non-volatile memory (e.g., flash memory).

The processing module 350 may collect the data captured by various sensors of the wearable system 300, such as the cameras 306, the eye tracking cameras 326, the depth sensor 328, the remote sensors 330, ambient light sensors, microphones, inertial measurement units (IMUs), accelerometers, compasses, Global Navigation Satellite System (GNSS) units, radio devices, and/or gyroscopes. For example, the processing module 350 may receive image(s) 320 from the cameras 306. Specifically, the processing module 350 may receive left front image(s) 320A from left front-facing world camera 306A, right front image(s) 320B from right front-facing world camera 306B, left side image(s) 320C from left side-facing world camera 306C, and right side image(s) 320D from right side-facing world camera 306D. In some embodiments, the image(s) 320 may include a single image, a pair of images, a video comprising a stream of images, a video comprising a stream of paired images, and the like. The image(s) 320 may be periodically generated and sent to the processing module 350 while the wearable system 300 is powered on, or may be generated in response to an instruction sent by the processing module 350 to one or more of the cameras.

The cameras 306 may be configured in various positions and orientations along the outer surface of the wearable device 301 so as to capture images of the user's surrounding. In some instances, the cameras 306A, 306B may be positioned to capture images that substantially overlap with the FOVs of a user's left and right eyes, respectively. Accordingly, placement of the cameras 306 may be near a user's eyes but not so near as to obscure the user's FOV. Alternatively or additionally, the cameras 306A, 306B may be positioned so as to align with the incoupling locations of the virtual image light 322A, 322B, respectively. The cameras 306C, 306D may be positioned to capture images to the side of a user, e.g., in a user's peripheral vision or outside the user's peripheral vision. The image(s) 320C, 320D captured using the cameras 306C, 306D need not necessarily overlap with the image(s) 320A, 320B captured using the cameras 306A, 306B.

In some embodiments, the processing module 350 may receive ambient light information from an ambient light sensor. The ambient light information may indicate a brightness value or a range of spatially-resolved brightness values. The depth sensor 328 may capture a depth image 332 in a front-facing direction of the wearable device 301. Each value of the depth image 332 may correspond to a distance between the depth sensor 328 and the nearest detected object in a particular direction. As another example, the processing module 350 may receive eye tracking data 334 from the eye tracking cameras 326, which may include images of the left and right eyes. As another example, the processing module 350 may receive projected image brightness values from one or both of the projectors 314. The remote sensors 330 located within the remote device 303 may include any of the above-described sensors with similar functionality.

Virtual content is delivered to the user of the wearable system 300 using the projectors 314 and the eyepieces 302, along with other components in the optical stacks. For instance, the eyepieces 302A, 302B may comprise transparent or semi-transparent waveguides configured to direct and outcouple light generated by the projectors 314A, 314B, respectively. Specifically, the processing module 350 may cause left projector 314A to output left virtual image light 322A onto left eyepiece 302A, and may cause right projector 314B to output right virtual image light 322B onto right eyepiece 302B. In some embodiments, the projectors 314 may include micro-electromechanical system (MEMS) spatial light modulator (SLM) scanning devices. In some embodiments, each of the eyepieces 302A, 302B may comprise a plurality of waveguides corresponding to different colors. In some embodiments, the lens assemblies 305A, 305B may be coupled to and/or integrated with the eyepieces 302A, 302B. For example, the lens assemblies 305A, 305B may be incorporated into a multi-layer eyepiece and may form one or more layers that make up one of the eyepieces 302A, 302B.

Figure 4:
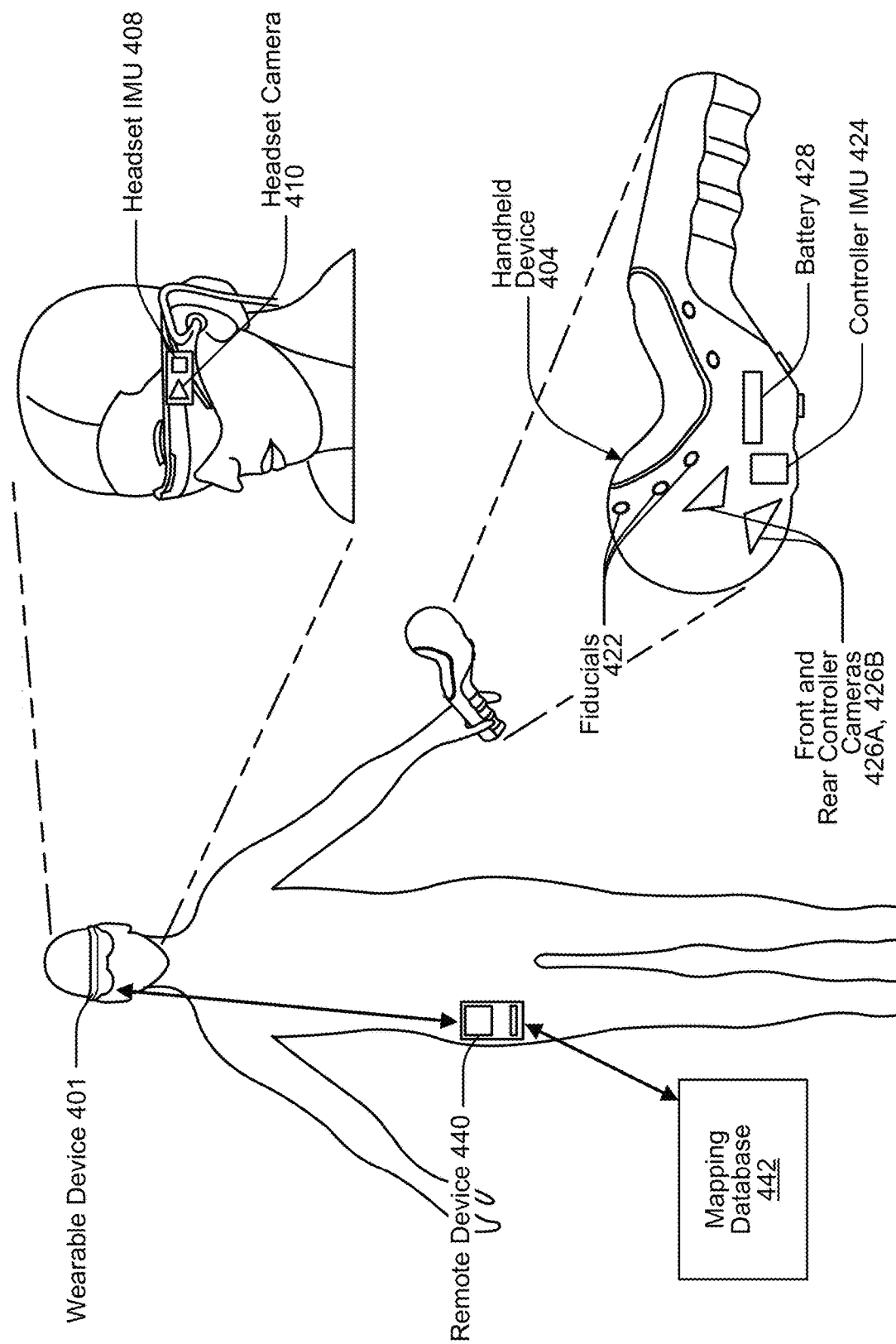
FIG. 4 illustrates an example of how a visual tracking system may be incorporated into an augmented reality system having a wearable device and a handheld device.

FIG. 4 illustrates an example of how a visual tracking system may be incorporated into an AR system having a wearable device 401 (e.g., a head set) and a handheld device 404 (e.g., a controller). In some embodiments, the handheld device 404 is a handheld controller that allows a user to provide an input to the AR system. For example, the handheld device 404 may be a totem to be used in a gaming scenario. The handheld device 404 may be a haptic device and may include one or more haptic surfaces utilizing a variety of sensor types. During operation of the AR system, a user may hold the handheld device 404 in his/her left or right hand by actively gripping the handheld device 404 and/or by securing an attachment mechanism (e.g., a wrap-around strap) to the user's hand.

The handheld device 404 may include one or more fiducials 422 positioned along one or more exterior surfaces of the handheld device 404 such that the fiducials may be within the field of view of an imaging device external to the handheld device 404. The fiducials 422 may have a known geometric relationship with respect to each other such that an imaging device may determine its position and/or orientation with respect to the handheld device 404 by capturing an image of one or more of the fiducials 422. The fiducials 422 may be dynamic, static, electrically powered, unpowered, and may, in some embodiments, be distinguishable from each other. For example, a first fiducial may be an LED having a first wavelength and a second fiducial may be an LED having a second wavelength. Alternatively or additionally, different fiducials may have different brightness and/or may pulsate at different frequencies (e.g., a first fiducial may pulsate at 100 Hz and a second fiducial may pulsate at 150 Hz).

The handheld device 404 may include one or more imaging devices (referred to herein as controller cameras 426) positioned in a manner such that the wearable device 401 and/or some feature in the surroundings of the handheld device 404 is within the field of view(s) of the imaging device(s) when the handheld device 404 is being held by a user. For example, a front controller camera 426A may be positioned such that its field of view is oriented away from the user towards one or more features in the surroundings of the handheld device 404, and a rear controller camera 426B may be positioned such that its field of view is oriented towards the wearable device 401. The controller cameras 426 may include one or more front-facing imaging devices and/or one or more rear-facing imaging devices to create a desired cumulative field of view. In some embodiments, the controller cameras 426 may capture still or moving images.

The handheld device 404 may include an IMU (referred to herein as a controller IMU 424) that is rigidly secured within the handheld device 404 such that rotational and linear movement of the handheld device 404 is similarly experienced by the controller IMU 424. In some instances, the controller IMU 424 may include one or more accelerometers (e.g., three), one or more gyroscopes (e.g., three), one or more magnetometers (e.g., three), and/or digital signal processing hardware and software to convert raw measurements into processed data. For example, the controller IMU 424 may include an accelerometer, a gyroscope, and a magnetometer for each of three axes. For each axis, the controller IMU 424 may output one or more of: linear position, linear velocity, linear acceleration, rotational position, rotational velocity, and/or rotational acceleration. Alternatively or additionally, the controller IMU 424 may output raw data from which any of the above-mentioned forms of processed data may be calculated.

The handheld device 404 may comprise a rechargeable and/or replaceable battery 428 or other power supply that powers the fiducials 422, the controller cameras 426, the controller IMU 424, and any other components of the handheld device 404. Although not illustrated in FIG. 4, the handheld device 404 may include circuitry for enabling wireless communication with the wearable device 401 and/or the remote device 440. For example, upon detecting or capturing data using the controller cameras 426 and the controller IMU 424, the handheld device 404 may transmit raw or processed data to the wearable device 401 and/or the remote device 440.

The wearable device 401 may include one or more imaging devices (referred to herein as headset cameras 410) positioned in a manner such that the handheld device 404 including the fiducials 422 are within the field of view(s) of the imaging device(s) when the handheld device 404 is being held by a user. For example, one or more headset cameras 410 may be positioned front-facing on the wearable device 401 above, below, and/or to the side of an optical see-through component of the wearable device 401. In one embodiment, two headset cameras 410 may be positioned on opposite sides of the optical see-through component of the wearable device 401. In some embodiments, the headset cameras 410 may capture still or moving images.

The wearable device 401 may include a headset IMU 408 that is rigidly secured within the wearable device 401 such that rotational and linear movement of the wearable device 401 is similarly experienced by the headset IMU 408. In some instances, the headset IMU 408 may include one or more accelerometers (e.g., three), one or more gyroscopes (e.g., three), one or more magnetometers (e.g., three), and/or digital signal processing hardware and software to convert raw measurements into processed data. For example, the headset IMU 408 may include an accelerometer, a gyroscope, and a magnetometer for each of three axes. For each axis, the headset IMU 408 may output one or more of: linear position, linear velocity, linear acceleration, rotational position, rotational velocity, and/or rotational acceleration. Alternatively or additionally, the headset IMU 408 may output raw data from which any of the above-mentioned forms of processed data may be calculated.

In some embodiments, the AR system may include a remote device 440, which may include a computing apparatus (e.g., one or more processors and an associated memory) for performing a localization of the handheld device 404 with respect to the wearable device 401. Alternatively or additionally, the computing apparatus may reside in the wearable device 401 itself, or even the handheld device 404. The computing apparatus may receive (via a wired and/or wireless connection) raw or processed data from each of the headset IMU 408, the headset camera 410, the controller IMU 424, and the controller cameras 426, and may compute a geospatial position of the handheld device 404 (with respect to the geospatial position of the wearable device 401) and an orientation of handheld device 404 (with respect to the orientation of the wearable device 401). The computing apparatus may in turn comprise a mapping database 442 (e.g., passable world model, coordinate space, etc.) to detect pose, to determine the coordinates of real objects and virtual objects, and may even connect to cloud resources and the passable world model, in one or more embodiments. In some embodiments, images captured using the headset camera 410 and/or the controller cameras 426 may be used to build a passable world model. For example, features may be detected in the captured images, and the collected data (for example sparse points) may be used for building the passable world model or environmental maps otherwise.

Figure 5:
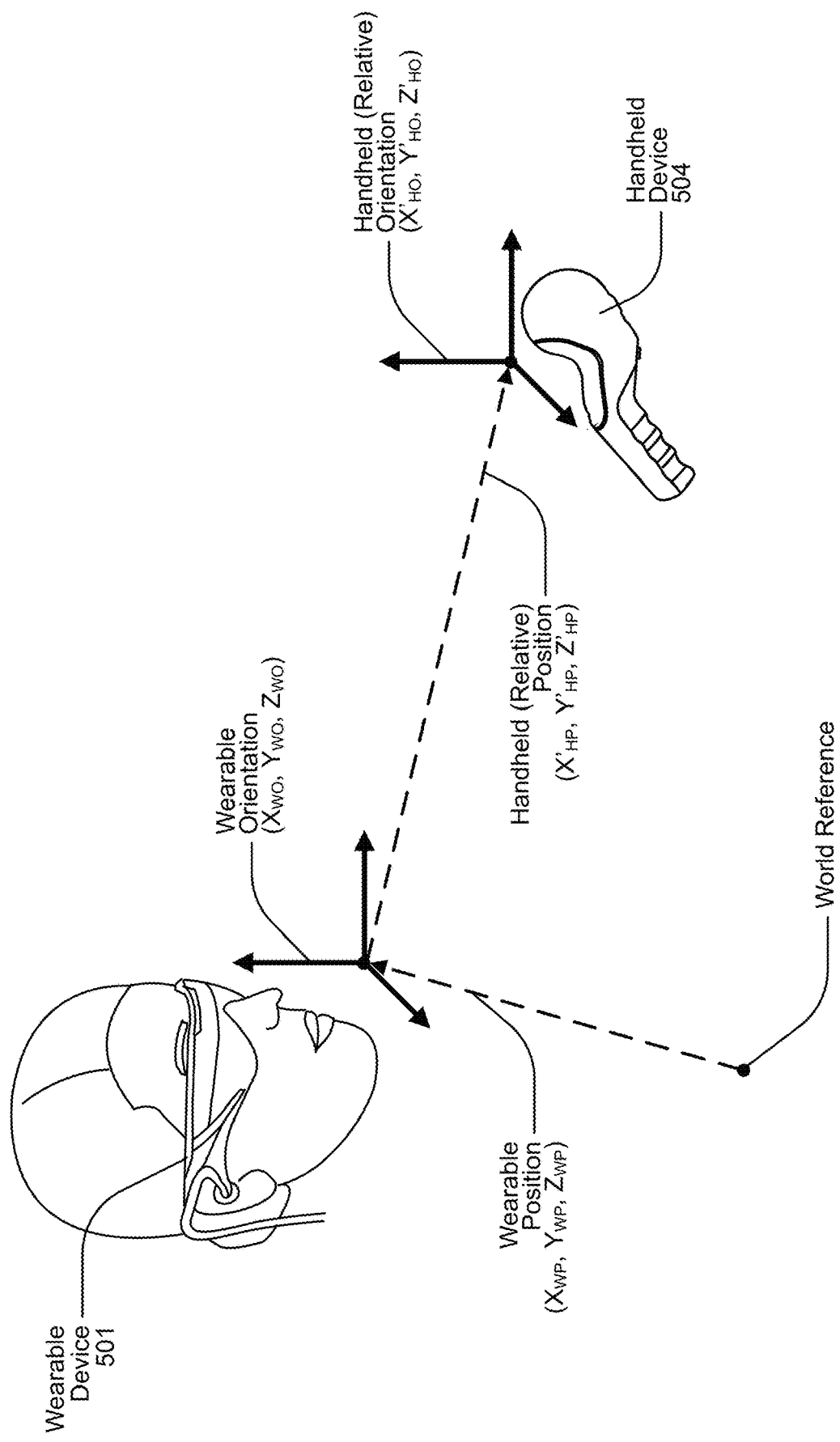
FIG. 5 illustrates a diagram of a localization task, as performed by an augmented reality system.

FIG. 5 illustrates a diagram of the localization task, as performed by an AR system, in which the position and the orientation of a handheld device 504 are determined with respect to a wearable device 501. In the illustrated diagram, the wearable device 501 has a geospatial position ("wearable position") defined as $(X_{WP}, Y_{WP}, Z_{WP})$ with respect to a world reference and an orientation ("wearable orientation") defined as $(X_{WO}, Y_{WO}, Z_{WO})$ with respect to a world reference. In some instances, the geospatial position of the wearable device 501 is expressed in longitude, latitude, and elevation values and the orientation of the wearable device 501 is expressed in pitch angle, yaw angle, and roll angle values.

As illustrated, the handheld device 504 has a geospatial position ("handheld position") defined as $(X'_{HP}, Y'_{HP}, Z'_{HP})$ with respect to the geospatial position of the wearable device 501 $(X_{WP}, Y_{WP}, Z_{WP})$ and an orientation ("handheld orientation") defined as $(X'_{HO}, Y'_{HO}, Z'_{HO})$ with respect to the orientation of the wearable device 501 $(X_{WO}, Y_{WO}, Z_{WO})$. In some instances, the geospatial position of the handheld device 504 is expressed in X, Y, and Z Cartesian values and the orientation of the handheld device 504 is expressed in pitch angle, yaw angle, and roll angle values. As one specific example, when the handheld device 504 is being held by a user, the geospatial position of the handheld device 504 may be equal to (0.7 m, −0.5 m, 0.1 m) and the orientation of the handheld device 504 may be equal to (10.2°, −46.2°, 15.2°).

Figure 6:
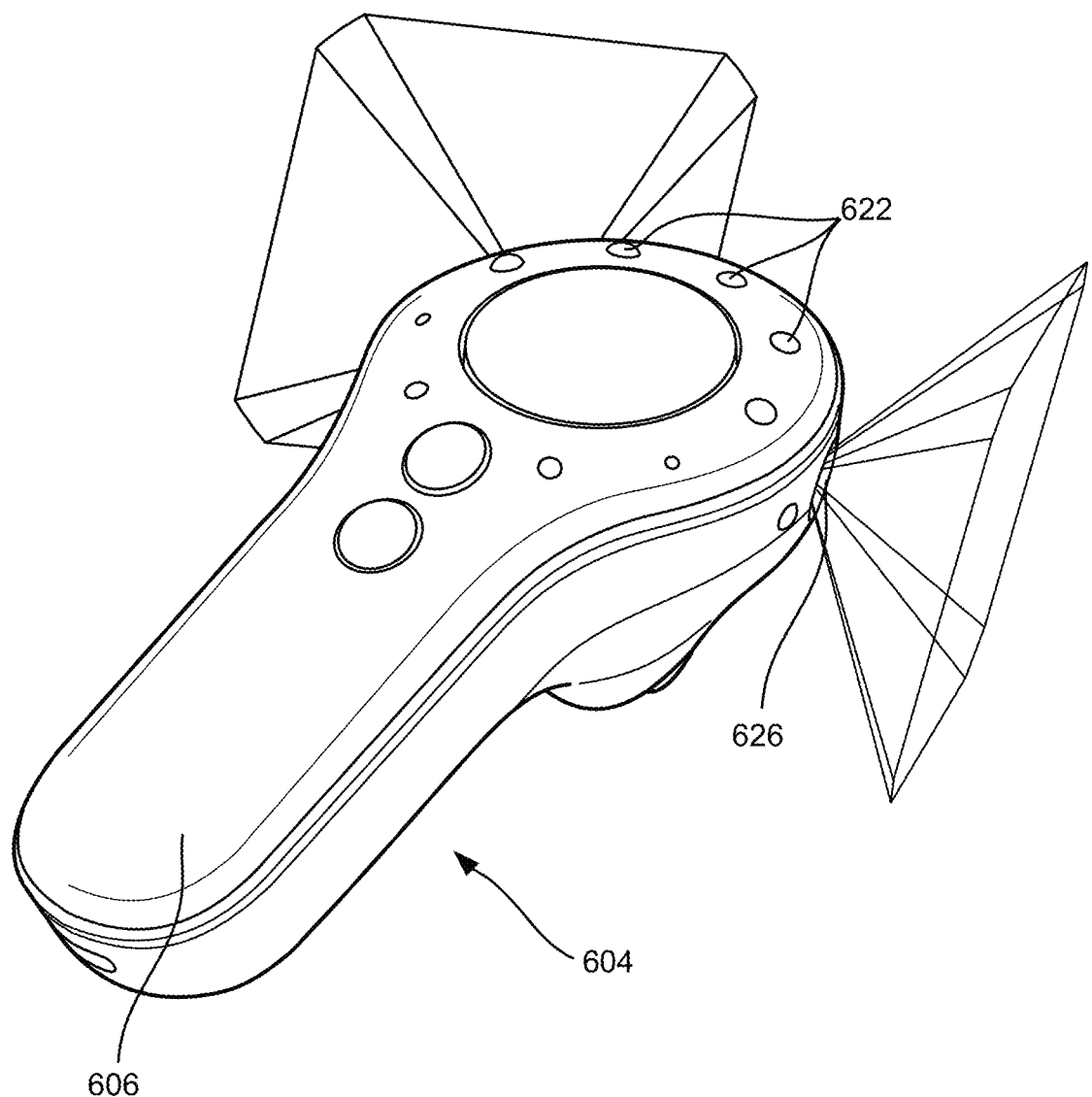
FIG. 6 illustrates a perspective view of a controller of an augmented system.

FIG. 6 illustrates a perspective view of a controller 604 of an AR system. In some embodiments, the controller 604 includes fiducials 622 positioned along one or more exterior surfaces of the controller 604 such that the fiducials may be within the field of view of an imaging device external to the controller 604. For instance, the controller 604 may include nine fiducials positioned on a top surface 606 of the controller 604 and two fiducials positioned on opposite sides of the controller 604. The two fiducials on the sides of the controller 604 may be positioned proximate to the controller cameras 626. In other examples, the controller 604 may include more or fewer fiducials 622. The fiducials 622 may have a known relationship with respect to each other such that an imaging device may determine its position and/or orientation with respect to the controller 604 by capturing an image of one or more of fiducials 622. As illustrated, the fiducials 622 on the top surface 606 are arranged in a circle, but other configurations are possible.

In some instances, 6DOF pose tracking of the headset (e.g., wearable devices 401, 501, 601) can be performed using images captured by cameras of the headset in combination with the headset IMU. This technique is referred to as headset inside-out tracking. For each captured image, features may be identified and the pixel positions of the identified features may be compared to pixel positions of the same features in other images, allowing for the 6DOF pose of the headset to be calculated for each image.

In some instances, 6DOF pose tracking of the controller 604, which can be an example of the handheld devices 404 and 504, can be performed using one or both of two separate techniques. The first technique is (1) controller inside-out tracking, which is 6DOF pose tracking of the controller 604 based on images captured of the real-world environment by controller cameras 626 on the controller 604. Similar to headset inside-out tracking, for each captured image, features may be identified and the pixel positions of the identified features may be compared to pixel positions of the same features in other images, allowing for the 6DOF pose of the controller 604 to be calculated for each image. The second technique is (2) constellation tracking, which is 6DOF pose tracking of the controller 604 based on images captured of fiducials 622 (e.g., LEDs) affixed to the controller 604 by cameras on the headset. The 6DOF pose of the controller 604 can be calculated from an image of the controller 604 captured by a headset camera. The image may be any single frame in which at least three of the fiducials 622 are visible. During operation of the wearable system, one or both of these techniques may be used. For example, if controller inside-out tracking is unavailable (e.g., images of the environment do not include a sufficient number of features due to, e.g., low light conditions), the wearable system may rely on constellation tracking. Conversely, if constellation tracking is unavailable (e.g., controller fiducials are not within the headset camera's field of view), the wearable system may rely on controller inside-out tracking. Furthermore, if both tracking techniques are available, the tracking data produced by the two techniques may be fused together.

Since headset-captured images are used for both headset inside-out tracking and constellation tracking, an issue can arise where the fiducials 622 are visible in the images that are to be used for headset tracking, as the flashed fiducials can appear as identifiable features during headset inside-out tracking. To resolve this, different images may be used for headset inside-out tracking (or simply "headset tracking") and constellation tracking, and the fiducials 622 may be controlled to flash while images for constellation tracking are being captured. Furthermore, the flashing "on" time can be shortened during the constellation tracking to prevent image blur, reduce power consumption, and to allow for easy identification of the fiducials 622. The camera's exposure interval is also shortened during constellation tracking to reduce power consumption. To ensure that the images for constellation tracking include the flashed fiducials, the fiducials 622 may be controlled to flash multiple times surrounding the camera's exposure interval, e.g., a fiducial interval may be calculated to be centered with the camera's exposure interval.

The fiducials 622 may be dynamic, static, electrically powered, unpowered, and may, in some embodiments, be distinguishable from each other. For example, a first fiducial may be an LED having a first wavelength and a second fiducial may be an LED having a second wavelength. Alternatively or additionally, different fiducials may have different brightness and/or may pulsate at different frequencies (e.g., a first fiducial may pulsate at 100 Hz and a second fiducial may pulsate at 150 Hz). The fiducials 622 may flash normally at a first frequency, but may flash at a second frequency when inside-out tracking is lost. For example, the fiducials 622 may normally flash at 2 Hz, but may flash at 30 Hz when inside-out tracking is lost.

The controller 604 includes the controller cameras 626 positioned in a manner such that the headset and/or some feature in the surroundings of the controller 604 is within the field of view(s) of the controller cameras 626 when the controller 604 is being held by a user. For example, the controller 604 may include a front controller camera that is positioned such that its field of view is oriented away from the user towards one or more features in the surroundings of the controller 604, and a rear controller camera that is positioned such that its field of view is oriented towards the headset. Controller cameras 626 may include one or more front-facing imaging devices and/or one or more rear-facing imaging devices to create a desired cumulative field of view. In some embodiments, controller cameras 626 may capture still or moving images.

Figure 7A:
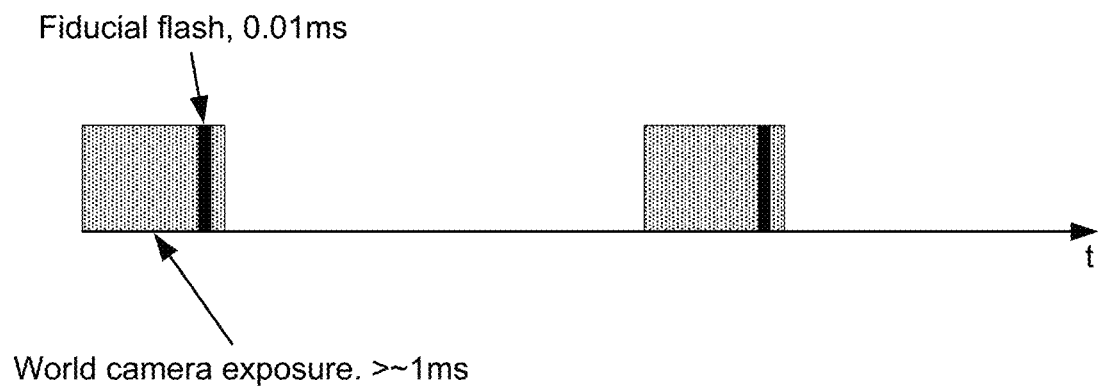
FIGS. 7A-7B illustrate examples of intervals for camera exposure and fiducial flash in different light conditions.

FIG. 7A illustrates an example of intervals for camera exposure and fiducial flash in a nominal mode. The nominal mode may be used for lighting conditions in which the camera exposure for a world camera (e.g., one or more cameras of the headset) remains relatively large (e.g., approximately 1 ms or larger). The flashing of the fiducials can be synchronized with the world camera exposure so that the flashing occurs during the world camera exposure to ensure that the flashing of the fiducials is captured by the world camera. As illustrated, the world camera exposure may be greater than 1 ms and the fiducial flash may be 0.01 ms, but other timings are also possible. The fiducial flash can occur at a known offset to the world camera exposure. For instance, the fiducial flash may occur towards a beginning of the world camera exposure, centered with the world camera exposure, or towards an end of the world camera exposure (e.g., as illustrated in FIG. 7A). So, as the world camera exposure is turned on at a predetermined interval, the fiducials can flash at the same predetermined interval so that the flashing always occurs during the world camera exposure, allowing for the controller to be continually tracked.

Figure 7B:
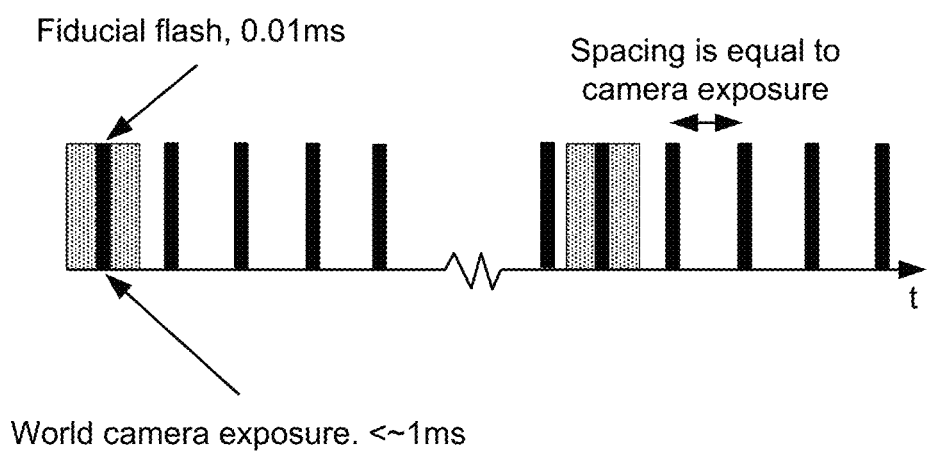

FIG. 7B illustrates an example of intervals for camera exposure and fiducial flash in a high ambient light mode. The high ambient light mode may be used for lighting conditions in which the camera exposure for the world camera is small (e.g., less than 1 ms) due to bright ambient light. It may be difficult to synchronize fiducial pulses with a short camera exposure, so rather than synchronizing the flashing and the world camera exposure, the fiducials can flash at a rate where the period is equal to the world camera exposure time. As a result, the world camera is guaranteed to capture the flashing of the fiducials. For instance, if the world camera exposure is 0.5 ms, the fiducials can flash for 0.01 ms every 0.5 ms so that the flashing is guaranteed to occur during the world camera exposure to ensure that the flashing of the fiducials is captured by the world camera. The fiducial flash is illustrated as occurring in the middle of the world camera exposure, but the fiducial flash may alternatively occur towards a beginning of the world camera exposure or towards an end of the world camera exposure.

Figure 8:
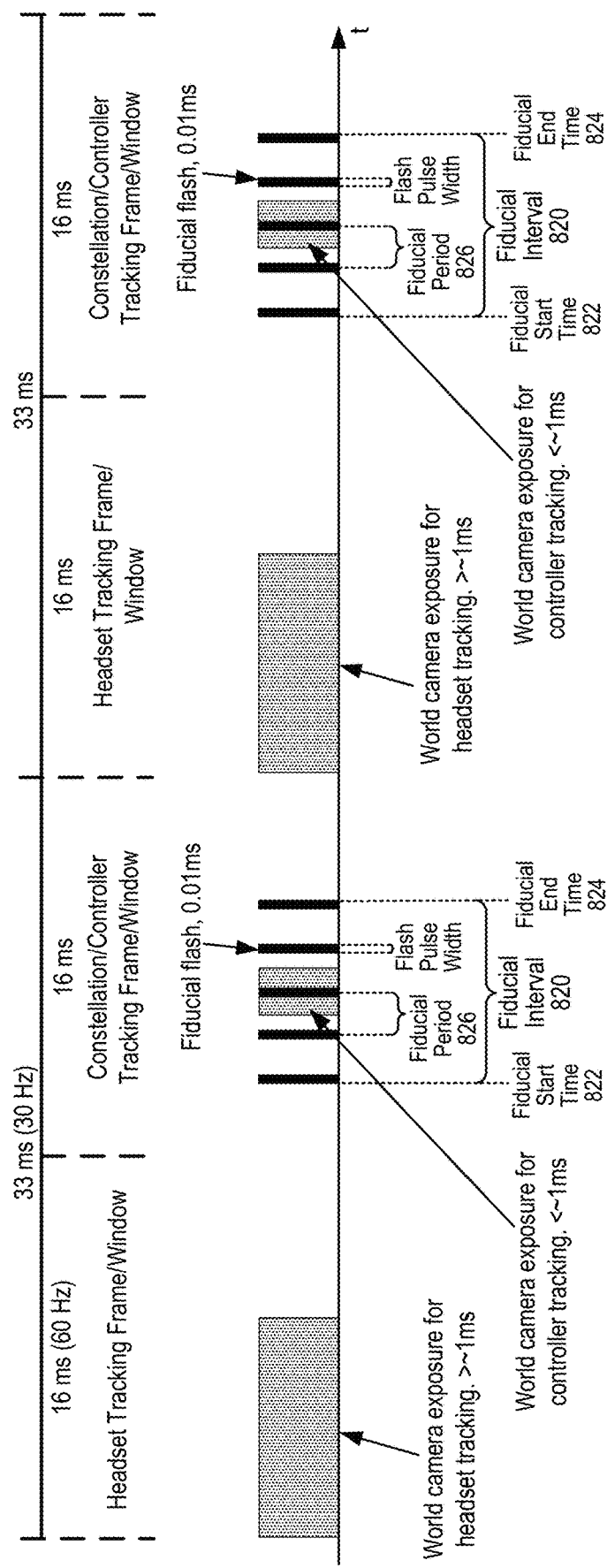
FIG. 8 illustrates an example of intervals for camera exposure and fiducial flash for headset tracking and constellation tracking.

FIG. 8 illustrates an example of intervals for camera exposure and fiducial flash for headset tracking and constellation tracking. To track the headset and the controller, the wearable system can alternate between headset tracking frames and constellation tracking frames. Each frame may be ~16 ms (16.6 ms at 60 Hz), so the length of the pair of a headset tracking frame and a constellation tracking frame may be 33 ms. The process may begin with a headset tracking frame in which the headset captures images of the world to determine pose of the headset. The world camera exposure of the headset camera can be at least 1 ms. As illustrated, the world camera exposure for headset tracking is illustrated as lasting for the 16 ms duration of the headset tracking frame. The fiducials of the controller do not flash during the headset tracking frame since the headset camera is not locating the controller with respect to the headset during headset tracking.

After the headset tracking frame, the constellation tracking frame can occur in which the headset captures images of the fiducials of the controller to determine a pose of the controller with respect to the headset. The world camera exposure of the headset camera can be less than 1 ms. As illustrated, the world camera exposure for headset tracking is illustrated as lasting for only a portion of the 16 ms duration of the constellation tracking frame. Since the world camera exposure is less than 1 ms, the fiducials can flash at a period equal to the duration of the world camera exposure to ensure that the headset camera captures an image of the flashing fiducials during the constellation tracking frame. After the constellation tracking frame, the wearable system can return to headset tracking with another headset tracking frame. The alternation between the headset tracking frames and the constellation tracking frames can continue until the wearable system is powered off.

As shown in FIG. 8, for each of the constellation tracking frames, the wearable system may determine a fiducial interval 820 defined by a fiducial start time 822 and a fiducial end time 824 during which a set of fiducials of the controller are to flash multiple times at a fiducial frequency (having an associated fiducial period 826). The duration of each of the flashes, referred to as the flash pulse width, may be adjustable by the wearable system in some examples. The wearable system may determine the fiducial interval such that the world camera exposure interval during each constellation tracking frame at least partially overlaps with the fiducial interval.

Figure 9:
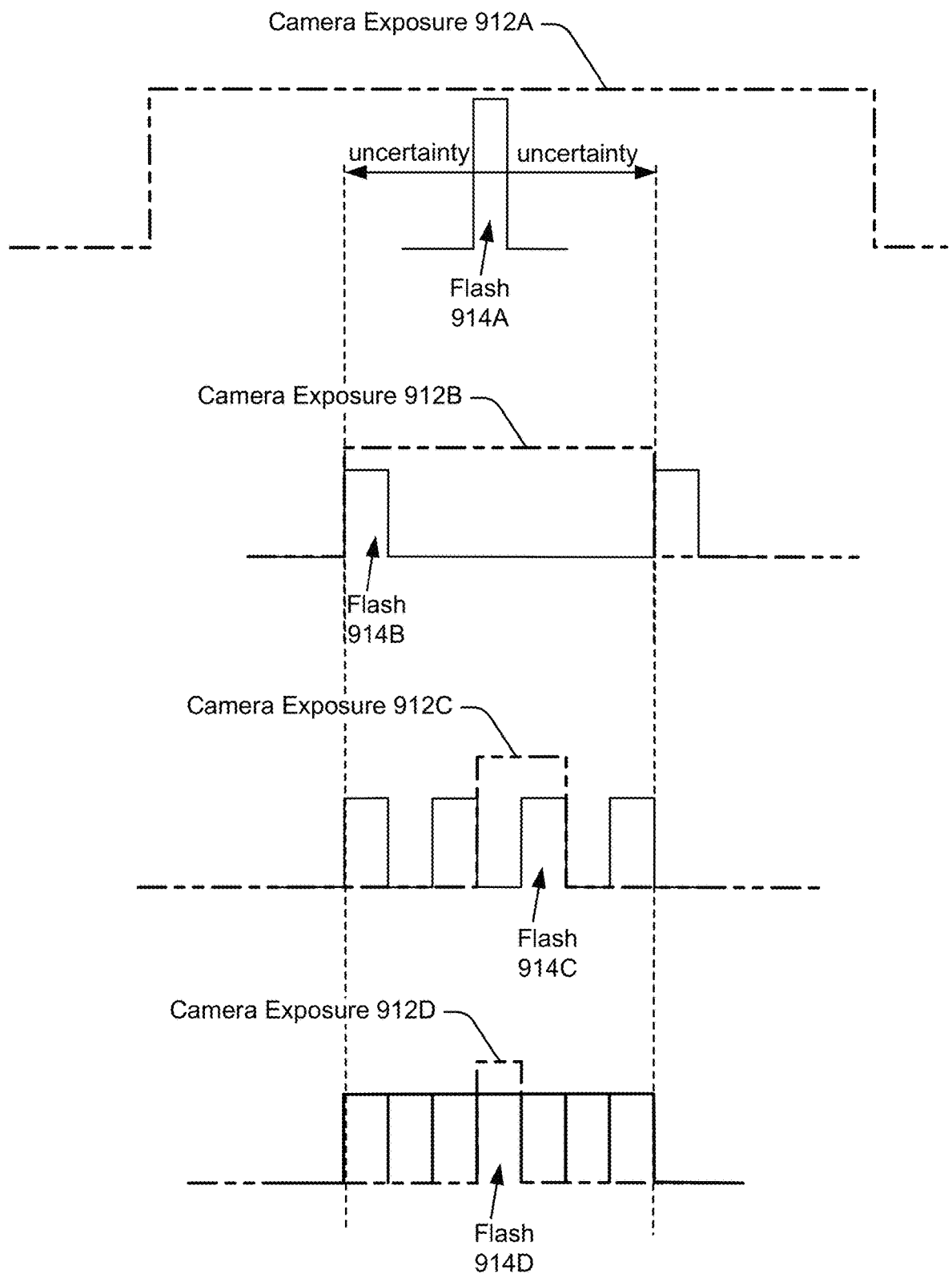
FIG. 9 illustrates example syncing of camera exposure and fiducial flash intervals for bright light conditions.

FIG. 9 illustrates example syncing of camera exposure and fiducial flash intervals for bright light conditions. The headset camera and the fiducials of the controller can be synced over Bluetooth so that the fiducial flash happens during the duration of the camera exposure. So, the headset may send a signal to the controller indicating the times or interval at which the world camera exposure is going to be turned on so that the controller can cause the fiducials to flash at the same times or during the interval. However, Bluetooth communication may add uncertainty in the time syncing along with other factors such as internal clock drifts in the headset and the controller. In some examples, the uncertainty may be over 200 µs.

In normal and low light conditions (e.g., indoors), the world camera exposure is significantly greater than the sync uncertainty and the fiducial pulse width, as illustrated by camera exposure 912A and flash 914A. So, a sync algorithm can use Bluetooth to sync the camera exposure 912A and the flash 914A by centering the flash 914A within the camera exposure 912A. However, in bright light environments (e.g., sunny outdoor ambient), the camera exposure and sync error intervals become close in value and syncing fails. The fiducial pulse may be increased to equal the uncertainty interval to fix the failure, but at the cost of the fiducial appearing brighter on the image because the total integration time of the fiducial pulse increases. Instead, the syncing can be fixed while maintaining equivalent fiducial brightness in the camera image by generating a fiducial flash train with the same pulse width and a period equal to the camera exposure. So, the flash train width may be equal to the uncertainty window.

Camera exposures 912B-912D and respective flashes 914B-914D illustrate fiducial flashes having a fiducial period (i.e., the period between successive fiducial flashes) equal to the duration of the world camera exposure (i.e., the "exposure duration"), with the exposure duration of camera exposure 912C being shorter than the exposure duration of camera exposure 912B, and the exposure duration of camera exposure 912D being shorter than the exposure duration of camera exposure 912C. Flash 914B occurs towards a beginning of camera exposure 912B, flash 914C occurs towards and end of camera exposure 912C, and flash 914D is centered with camera exposure 912D. In any case, the total integrated fiducial pulse may be effectively the same as in environments with normal brightness.

Figure 10:
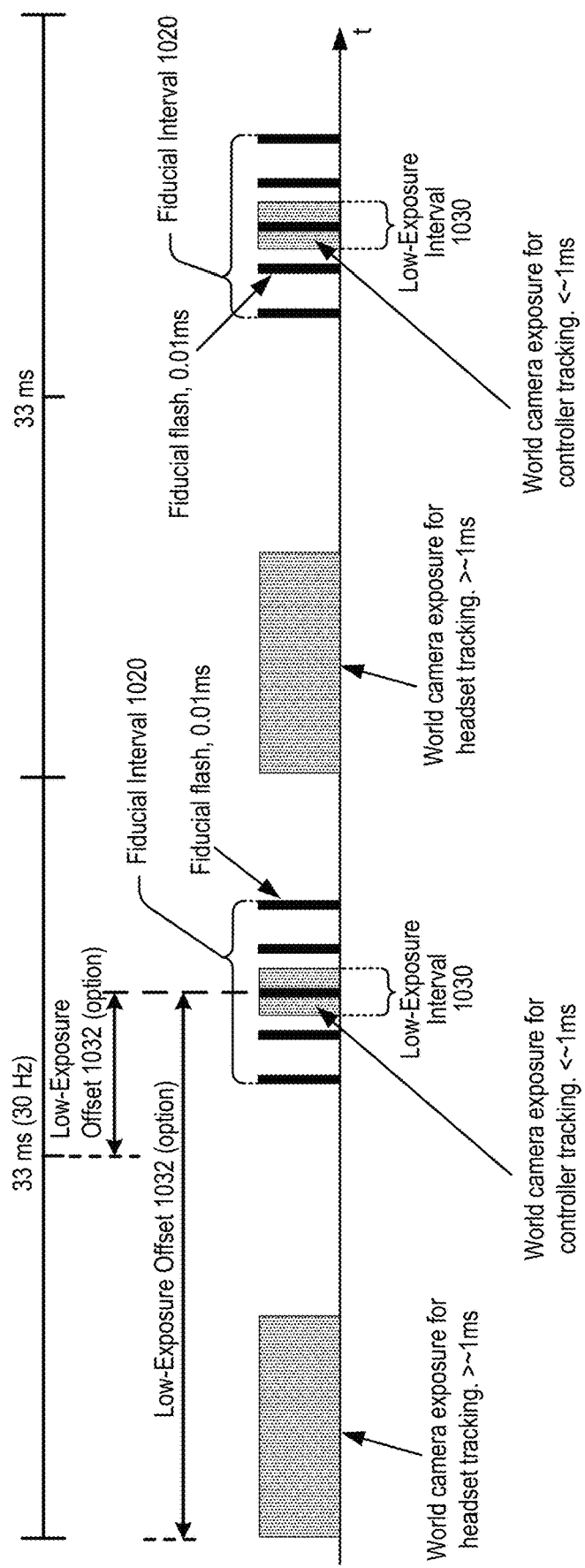
FIG. 10 illustrates an example of synchronizing fiducial flashes with a low-exposure interval.

FIG. 10 illustrates an example of synchronizing fiducial flashes with a low-exposure interval 1030. The low-exposure interval 1030 is the time interval in which the world camera exposure of a headset camera is turned on for constellation tracking in bright light conditions. To synchronize the fiducial flash(es) with the low-exposure interval 1030, the headset determines a low-exposure offset 1032. The low-exposure offset 1032 may be a time between a reference time and the start, end, or middle of the low-exposure interval 1030. As illustrated in FIG. 10, a first exemplary low-exposure offset 1032 is the time between a beginning of world camera exposure during a headset tracking frame and the middle of the low-exposure interval 1030 during the constellation tracking frame that occurs immediately following the headset tracking frame. A second exemplary low-exposure offset 1032 is the time between a beginning of the constellation tracking frame and the middle of the low-exposure interval 1030 during the constellation tracking frame.

The headset can transmit an indication of the low-exposure offset 1032 and the exposure duration of the low-exposure interval 1030 to the controller so that the controller can determine a fiducial interval 1020 during which the multiple fiducial flashes are to occur. The fiducial interval 1020 may be centered with the low-exposure interval 1030 to increase a likelihood that at least one fiducial flash overlaps with the low-exposure interval 1030. As illustrated in FIG. 10, if five fiducial flashes occur during a constellation tracking frame, the fiducial interval 1020 can be such that a middle of the third fiducial flash is aligned with the middle of the low-exposure interval 1030 based on the low-exposure offset 1032.

Figure 11:
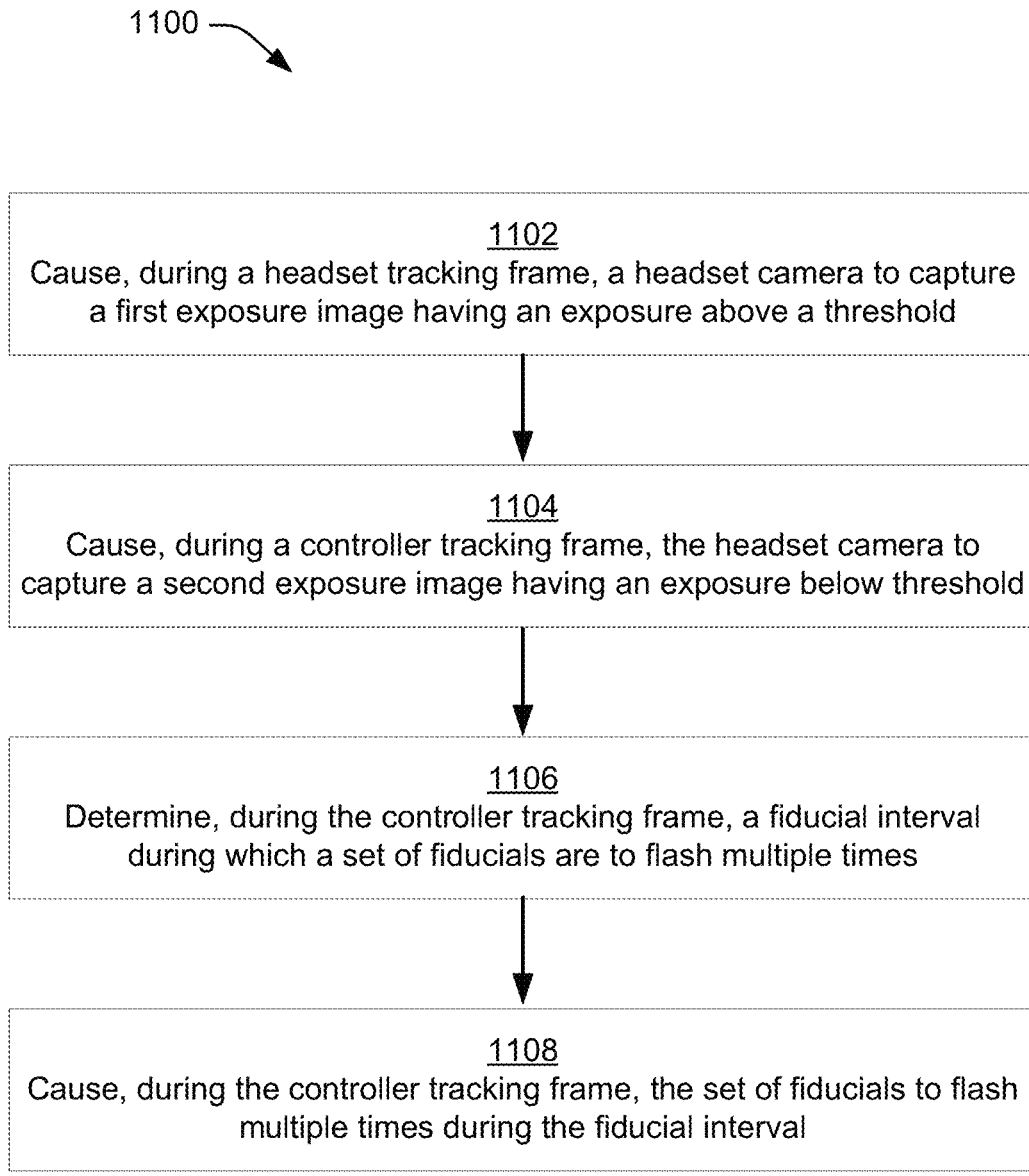
FIG. 11 illustrates an example method of headset camera exposure and fiducial flash synchronization, according to some embodiments of the present invention.

FIG. 11 illustrates an example method 1100 of headset camera exposure and fiducial flash synchronization, according to some embodiments of the present invention. One or more steps of method 1100 may be performed in a different order than the illustrated embodiment, and one or more steps of method 1100 may be omitted during performance of method 1100. Furthermore, two or more steps of method 1100 may be performed simultaneously or concurrently with each other.

At step 1102, a headset camera is caused to capture a first exposure image having an exposure above a threshold during a headset tracking frame. The first exposure image is captured during a headset tracking frame. The wearable system can alternate between performing headset tracking and controller tracking. A headset camera of the headset repeatedly captures images during headset tracking frames and controller tracking frames. The threshold may be 1 ms, so the first exposure image may be associated with an exposure greater than 1 ms. The first exposure image is associated with a first exposure interval defined by a first exposure start time, a first exposure end time, and a first exposure duration.

At step 1104, the headset camera is caused to capture a second exposure image have an exposure below the threshold during a controller tracking frame. The second exposure image is captured during a controller tracking frame. Since the threshold may be 1 ms, the second exposure image may be associated with an exposure less than 1 ms. The second exposure image is associated with a second exposure interval defined by a second exposure start time, a second exposure end time, and a second exposure duration. The second exposure duration is less than the first exposure duration.

At step 1106, a fiducial interval is determined during the controller tracking frame. The fiducial interval is an interval during which a set of fiducials are to flash multiple times. The fiducial interval is defined by a fiducial start time and a fiducial end time during which the set of fiducials are to flash at a fiducial frequency and a fiducial period. The fiducial interval is determined such that the second exposure interval at least partially overlaps with the fiducial interval.

At step 1108, the set of fiducials are caused to flash multiple times during the fiducial interval during the controller tracking frame. The set of fiducials flash in accordance with the fiducial frequency and the fiducial period. Accordingly, the set of fiducials can be captured in the second exposure image during the controller tracking frame. In addition, a pose of the controller can be determined based on the set of fiducials captured in the second exposure image.

During constellation tracking, an issue can arise if fiducials that are flashing from multiple controllers are visible in the same headset image. For example, it may be difficult for the wearable system to determine which fiducials belong to which controller, which can cause the constellation tracking to be ineffective if not resolved. The two controllers may both be held by the user of the wearable system or by two different users of two different wearable systems.

In some instances, the wearable system may perform several steps to execute one or more of several multiple controller disambiguation techniques. FIGS. 12-15 illustrate exemplary techniques for multiple controller disambiguation. Optionally, prior to performing any of these techniques, a set of preliminary steps may be performed. For instance, the wearable system may capture an image using a headset camera, identify a set of fiducials in the image, and determine that at least one of the identified set of fiducials belong to a first controller and at least one of the identified set of fiducials belong to a second controller. The wearable system may determine that the set of fiducials belong to a first controller and a second controller based on a determined configuration of the fiducials in the image, a number of fiducials in the image, or by other techniques.

Figure 12A:
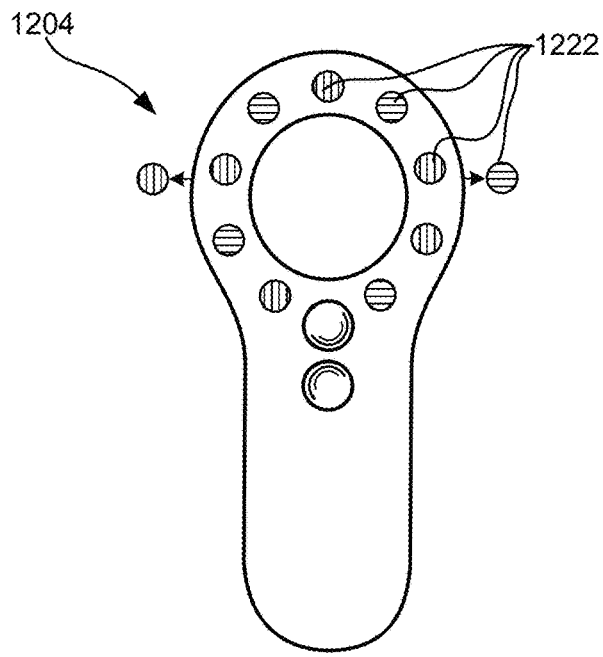
FIGS. 12A-12C illustrate disambiguation using independently controlled groups of fiducials.
Figure 12B:
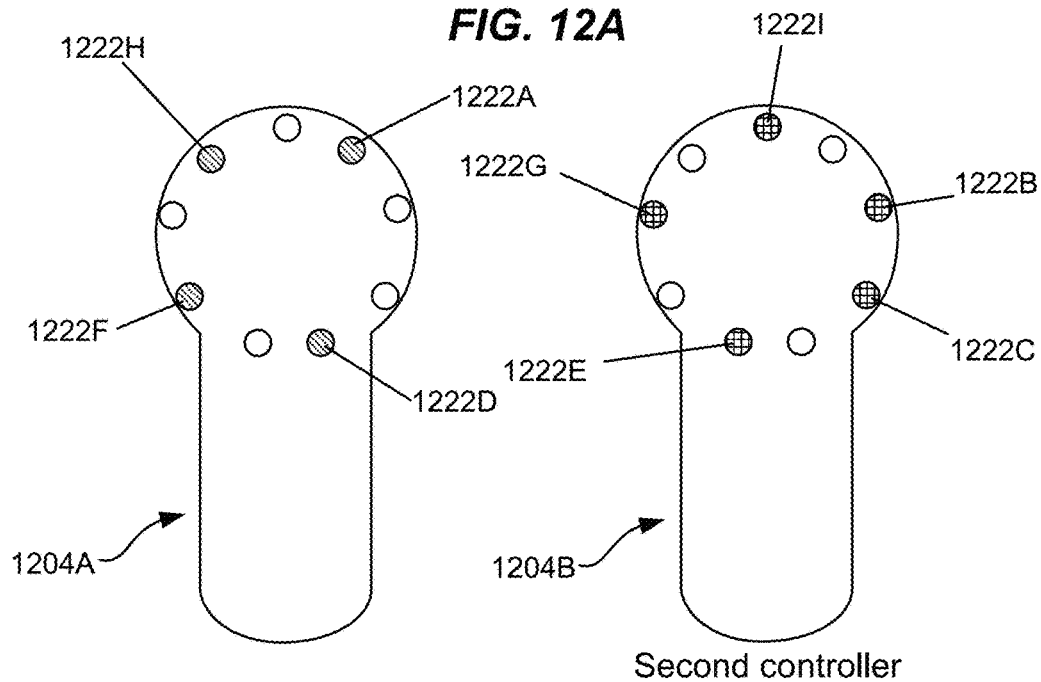
Figure 12C:
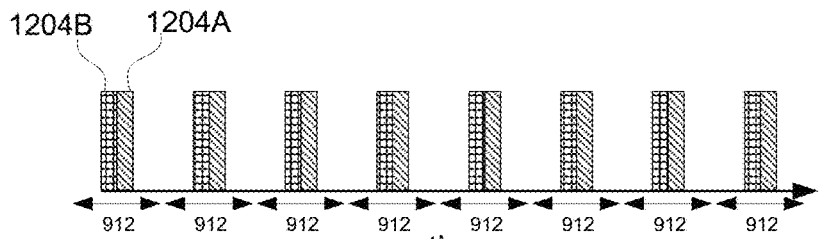

FIGS. 12A-12C illustrate disambiguation using independently controlled groups of fiducials. In FIG. 12A a controller 1204 is illustrated as having eleven fiducials 1222, nine of which are positioned on a top surface of the controller 1204 and two are positioned on opposing sides of the controller 1204. The fiducials 1222 may be LEDs arranged into multiple groups that can be controlled independently. The groups can be asymmetric such that one group cannot appear the same as the other for any translation, rotation, or inversion of the pattern. The groups serve an important function in disambiguating multiple devices that can be seen by a single wearable device.

FIG. 12B illustrates the groups of fiducials for two controllers. For example, a first controller 1204A may be associated with a first group of fiducials 1222 and a second controller 1204B may be associated with a second group of fiducials 1222. The first group includes fiducial 1222A, fiducial 1222D, fiducial 1222F, and fiducial 1222H, whereas the second group includes fiducial 1222B, fiducial 1222C, fiducial 1222E, fiducial 1222G, and fiducial 1222I. Accordingly, the first group is asymmetric to the second group. In some examples, the two groups of fiducials may include at least one fiducial in common, and in other examples the two groups of fiducials may be mutually exclusive.

To disambiguate the first controller 1204A and the second controller 1204B, the wearable system can cause the first group of fiducials 1222 to flash at the first controller 1204A and cause the second group of fiducials 1222 to flash at the second controller 1204B, as shown in FIG. 12C. The headset can capture an image of the flashing of the first group and the second group and detect which group(s) of fiducials are depicted in the image. Even if both groups flash at the same time (as shown in FIG. 12C) and are captured in the image, the wearable system can differentiate between the first controller 1204A and the second controller 1204B based on the patterns of the groups of fiducials. The wearable system may store or access a mapping between the controllers 1204A-1204B and the groups of fiducials to determine which controller corresponds with a particular group of fiducials detected in an image. Each instance of the fiducials 1222 of the first controller 1204A and the second controller 1204B flashing in FIG. 12C corresponds with one image capture. That is, the world camera exposure 912 of the headset camera can occur during each of the flashes.

FIGS. 13A-13D illustrate disambiguation using misaligning flashing of fiducials. In FIG. 13A, a first controller 1304A and a second controller 1304B are illustrated as each having fiducials 1322 positioned on a top surface. Rather than separating the fiducials 1322 into a unique group for each of the controllers 1304A-1304B, the controllers 1304A-1304B may be caused to flash at different periods, frequencies, or offsets with respect to each other. For instance, as illustrated in FIG. 13B, the flashing of the fiducials 1322A of the first controller 1304A may be caused to occur at an offset with respect to the flashing of the fiducials 1322B of the second controller 1304B such that no pair of fiducials from different controllers flash concurrently. In one example, the offset may be 2 ms and the wearable system may cause the fiducials 1322B of the second controller 1304B to flash at 0 ms, 4 ms, and 8 ms, the wearable system can cause the fiducials 1322A of the first controller 1304A to flash at 2 ms, 6 ms, and 10 ms. Each instance of the fiducials 1322A-1322B of the first controller 1304A and the second controller 1304B flashing in FIG. 13B corresponds with one image capture. That is, the world camera exposure 912 of the headset camera can occur during each of the flashes.

FIG. 13C illustrates a modification of a period or frequency of the flashing of the fiducials 1322A of the first controller 1304A with respect to the flashing of the fiducials 1322B of the second controller 1304B. As an example, the wearable system may cause the fiducials 1322 of the second controller 1304B to flash every 4 ms (e.g., at 0 ms, 4 ms, and 8 ms), but the wearable system may cause the fiducials 1322 of the first controller 1304A to flash every 6 ms (e.g., at 0 ms, 6 ms, and 12 ms). In addition, FIG. 13D illustrates a modification of an offset and a period of the flashing of the fiducials 1322A of the first controller 1304A with respect to the flashing of the fiducials 1322B of the second controller 1304B, which is effectively a combination of FIGS. 13B-13C. In some instances, the period, frequency, or offset of the second controller 1304B may be modified in addition or alternate to the modification(s) of the first controller 1304A. In any case, by knowing the pattern at which a controller's fiducials flash and at what time an image of a controller is captured, the wearable system can distinguish between multiple controllers that may depicted in the image. Each instance of the fiducials 1322A-1322B of the first controller 1304A and the second controller 1304B flashing in FIGS. 13B-13D corresponds with one image capture. That is, the world camera exposure 912 of the headset camera can occur during each of the flashes.

Figure 14A:
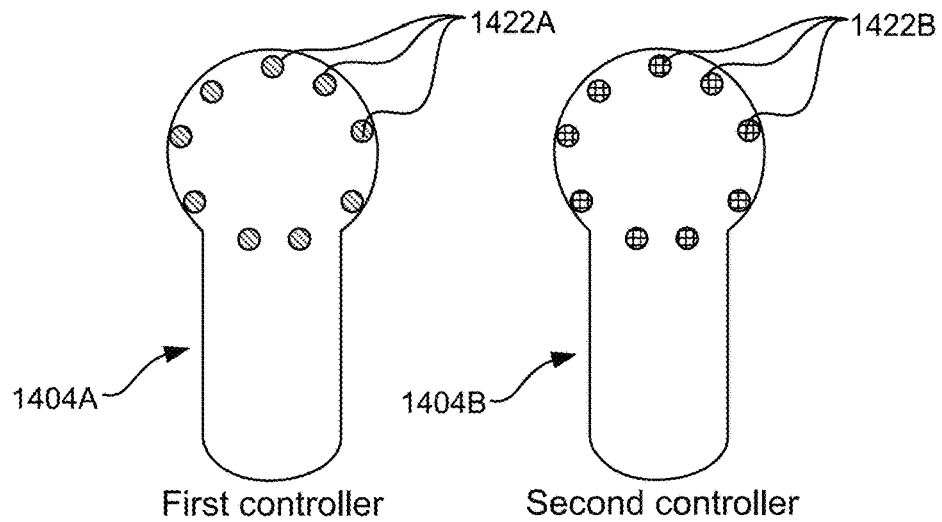
FIGS. 14A-14C illustrate disambiguation using flash coding of controller fiducials.
Figure 14B:
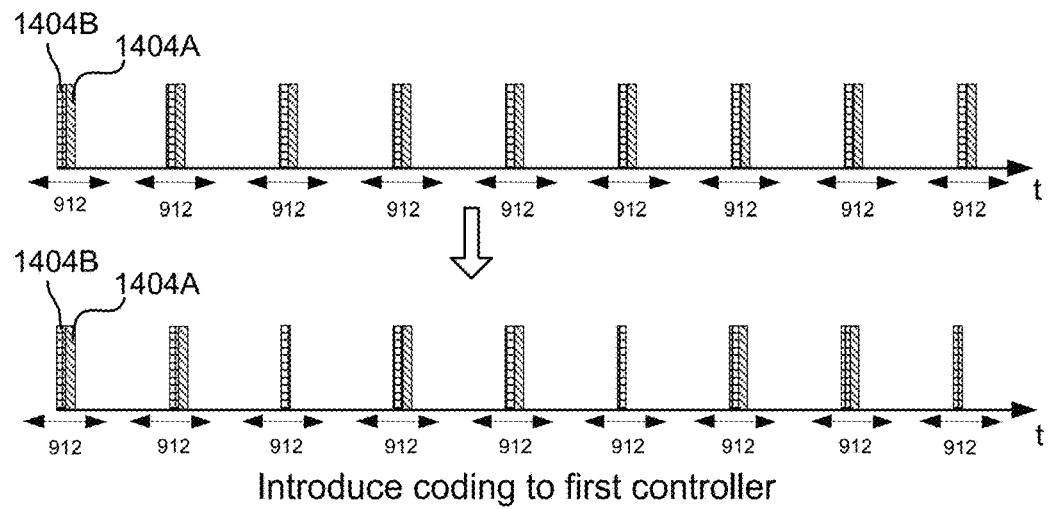
Figure 14C:
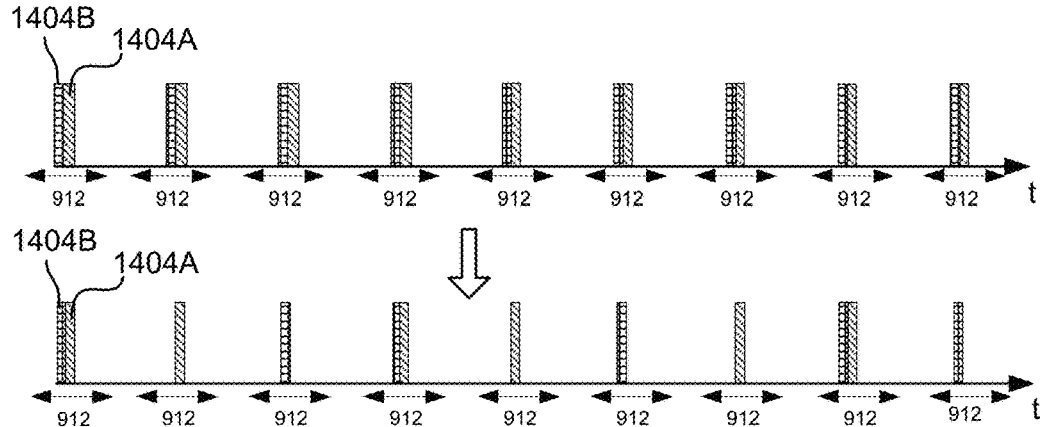

FIGS. 14A-14C illustrate disambiguation using flash coding of controller fiducials. In FIG. 14A, a first controller 1404A and a second controller 1404B are illustrated as each having fiducials 1422 positioned on a top surface. The wearable system can introduce a random code to the flashes so that the fiducials 1422 of each of the controllers 1404A-1404B can be uniquely identified. Each controller can have a unique coding. That is, the flashing of the first controller 1404A can be encoded with a first coding and the flashing of the second controller 1404B can be encoded with a second coding. In some examples, a coding may indicate which flashes are omitted during a flashing sequence, causing the flashing to no longer be periodic. The coding may be associated with a binary pattern (e.g., 110110110).

The coding may only be applied to one of the controllers 1404A, as illustrated in FIG. 14B for the first controller 1404A, the coding having a binary pattern of 110110110. So, while the flashing of the fiducials 1422B of the second controller 1404B is periodic, the flashing of the fiducials 1422A of the first controller 1404A is not. As illustrated, the first controller 1404A and the second controller 1404B flash simultaneously for two time periods, and then the second controller 1404B flashes during a third time period in which the first controller 1404A does not flash.

FIG. 14C illustrates introducing coding to each of the controllers 1404A-1404B. If each flashing period corresponds to 1 ms, the first coding (having binary pattern 110110110) for the first controller 1404A causes the fiducials 1422A to flash at 0 ms, 1 ms, 3 ms, 4, ms, 6 ms, and 7 ms. The second coding (having binary pattern 101101011) for the second controller 1404B can cause the fiducials 1422B to flash at 0 ms, 2 ms, 3 ms, 5 ms, 7 ms, and 8 ms. Regardless of whether coding is introduced to one or both of the controllers 1404A-1404B, by knowing the pattern at which a controller's fiducials flash and at what time an image of a controller is captured, the wearable system can distinguish between multiple controllers that may depicted in the image. In some examples, one or both of the first coding or the second coding may be a random code. Each instance of the fiducials 1422A-1422B of the first controller 1404A and the second controller 1404B flashing in FIGS. 14B-14C corresponds with one image capture. That is, the world camera exposure 912 of the headset camera can occur during each of the flashes.

Figure 15A:
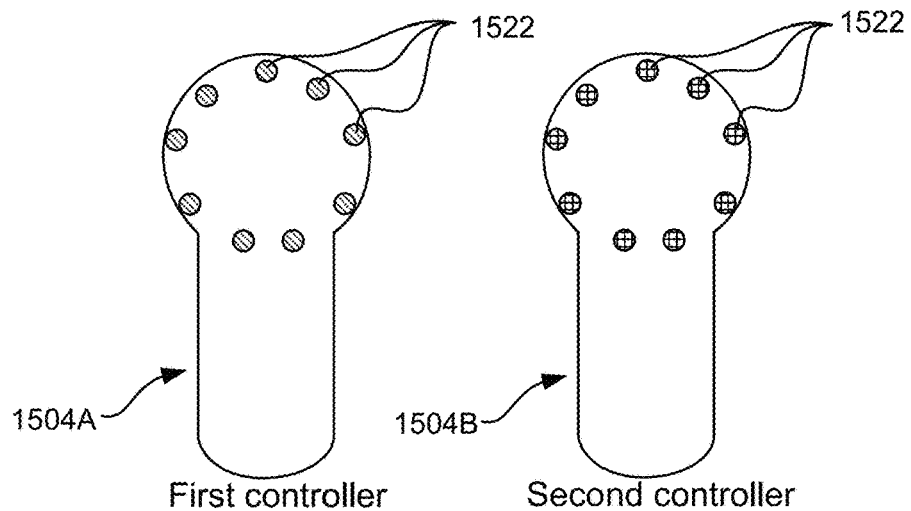
FIGS. 15A-15C illustrate disambiguation using independently controlled groups of fiducials and flash coding.
Figure 15B:
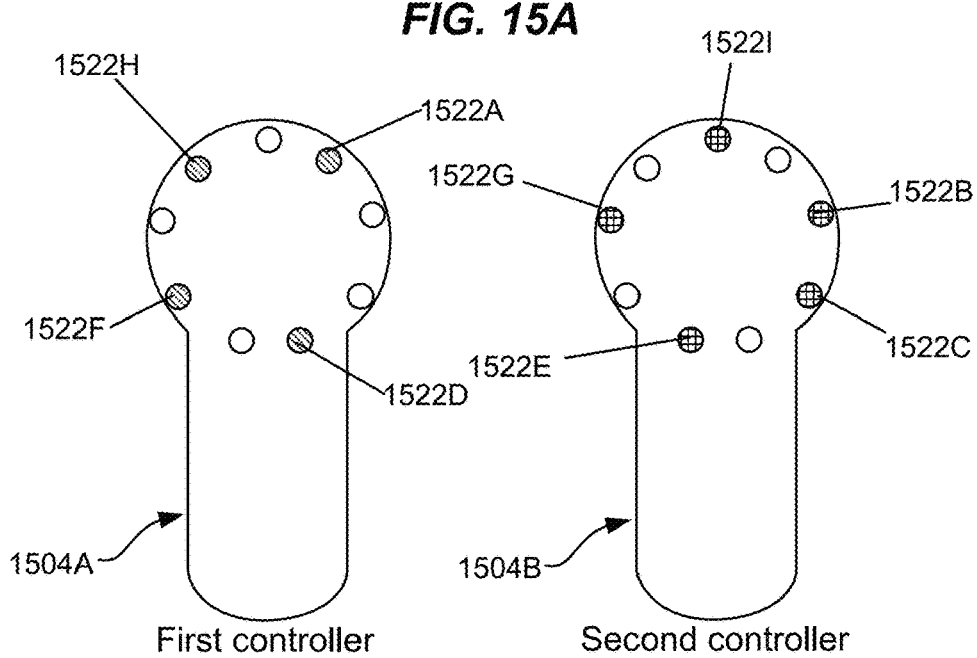
Figure 15C:
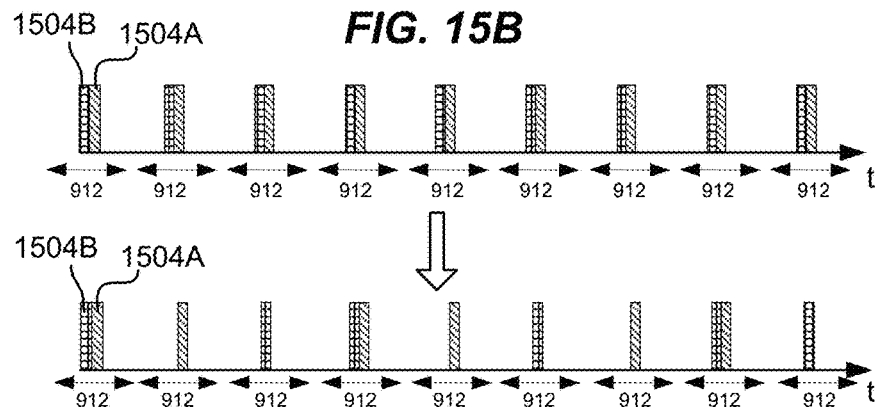

FIGS. 15A-15C illustrate disambiguation using independently controlled groups of fiducials and flash coding. In FIG. 15A, a first controller 1504A and a second controller 1504B are illustrated as each having fiducials 1522 positioned on a top surface. The fiducials 1522 may be arranged into multiple groups that can be controlled independently, as described in FIG. 12B. The groups can be asymmetric such that one group cannot appear the same as the other for any translation, rotation, or inversion of the pattern. The groups serve an important function in disambiguating multiple devices that can be seen by a single wearable device.

FIG. 15B illustrates the groups of fiducials for two controllers. For example, the first controller 1504A may be associated with a first group of fiducials 1522 and a second controller 1504B may be associated with a second group of fiducials 1522. The first group includes fiducial 1522A, fiducial 1522D, fiducial 1522F, and fiducial 1522H, whereas the second group includes fiducial 1522B, fiducial 1522C, fiducial 1522E, fiducial 1522G, and fiducial 1522I. Accordingly, the first group is asymmetric to the second group. In addition to the two groups, the fiducials 1522 of the controllers 1504A-1504B can also be encoded with different flash codings, as described in FIGS. 14B-14C and as shown in FIG. 15C. Accordingly, the combination of the groups and the different flash codings can enable the wearable system to distinguish between the controllers 1504A-1504B. Each instance of the fiducials 1522 of the first controller 1504A and the second controller 1504B flashing in FIG. 15C corresponds with one image capture. That is, the world camera exposure 912 of the headset camera can occur during each of the flashes.

Figure 16:
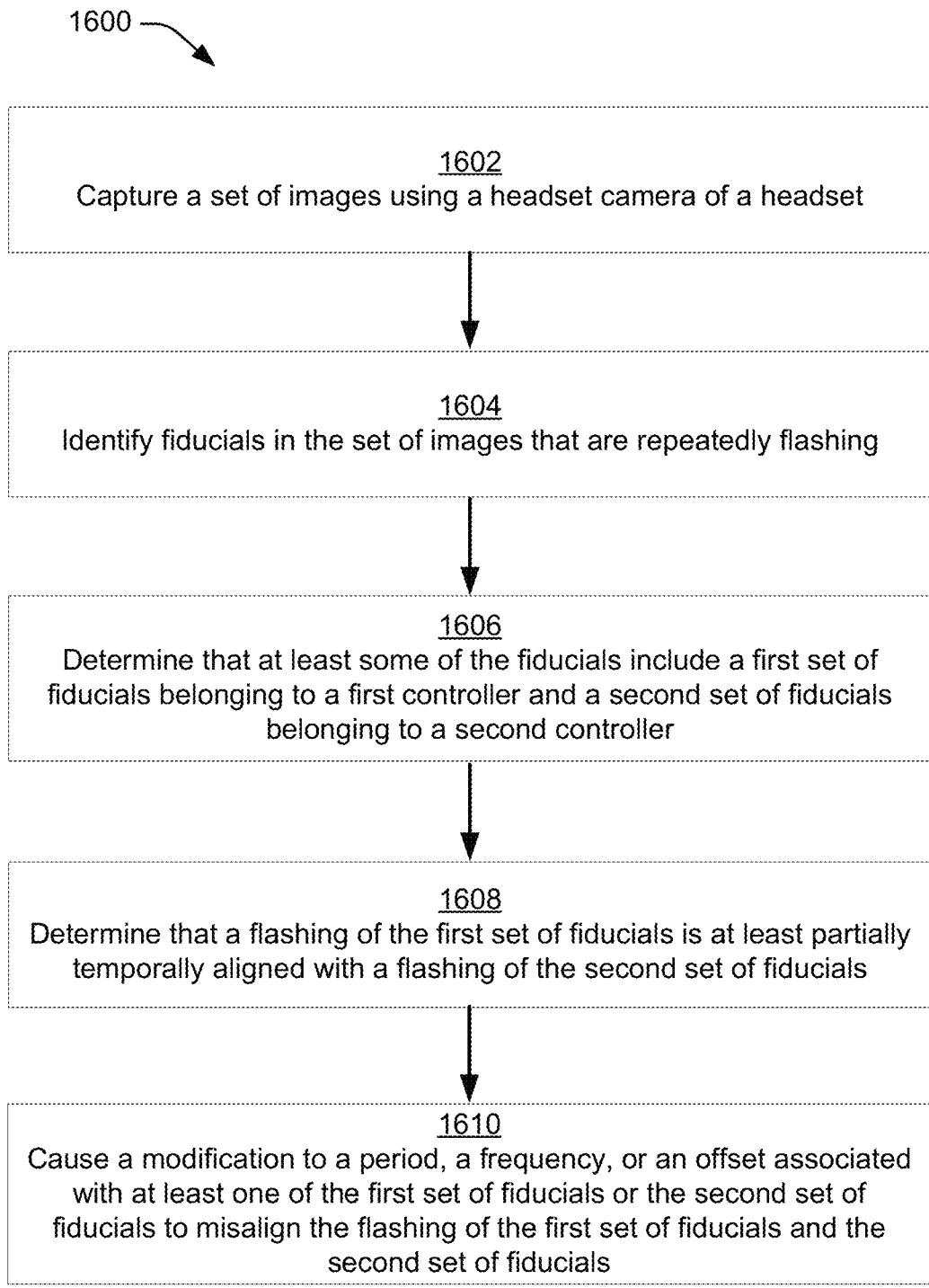
FIG. 16 illustrates an example method of fiducial flash disambiguation of a controller, according to some embodiments of the present invention.

FIG. 16 illustrates an example method 1600 of fiducial flash disambiguation of a controller (e.g., controller 604), according to some embodiments of the present invention. One or more steps of method 1600 may be performed in a different order than the illustrated embodiment, and one or more steps of method 1600 may be omitted during performance of method 1600. Furthermore, two or more steps of method 1600 may be performed simultaneously or concurrently with each other.

At step 1602, a set of images is captured using a headset camera of a headset. The images may show one or more controllers that are in a field of view of the headset camera.

At step 1604, fiducials are identified in the set of images that are repeatedly flashing. The fiducials can flash during a fiducial interval at a fiducial frequency and a fiducial period based on an exposure of the headset camera. The identified fiducials can belong to the one or more controllers.

At step 1606, at least some of the fiducials are determined to include a first set of fiducials belonging to a first controller and a second set of fiducials belonging to a second controller. Based on a number or positioning of the fiducials, the wearable system can determine that some fiducials belong to the first controller and some belong to the second controller.

At step 1608, a flashing of the first set of fiducials is determined to be at least partially temporally aligned with a flashing of the second set of fiducials. The wearable system may determine that the fiducial interval for the first set of fiducials is the same as the fiducial interval for the second set of fiducials, so they are temporally aligned. Or, the wearable system may determine that the first set of fiducials and the second set of fiducials both appear in each image of the set of images, and are thus temporally aligned. The wearable system may not be able to accurately track a pose of the first controller and the second controller if the fiducials are flashing at a same frequency and period.

At step 1610, a modification is caused to a period, a frequency, or an offset associated with at least one of the first set of fiducials or the second set of fiducials so that the flashing of the first set of fiducials is misaligned from the flashing of the second set of fiducials. The wearable system may cause a first subset of the first set of fiducials to flash at the first controller and a second subset of the second set of fiducials to flash at the second controller. The first subset can be asymmetric to the second subset. Additionally or alternatively, the flashing of the first set of fiducials and/or the second set of fiducials may be caused to be encoded with a coding.

Figure 17:
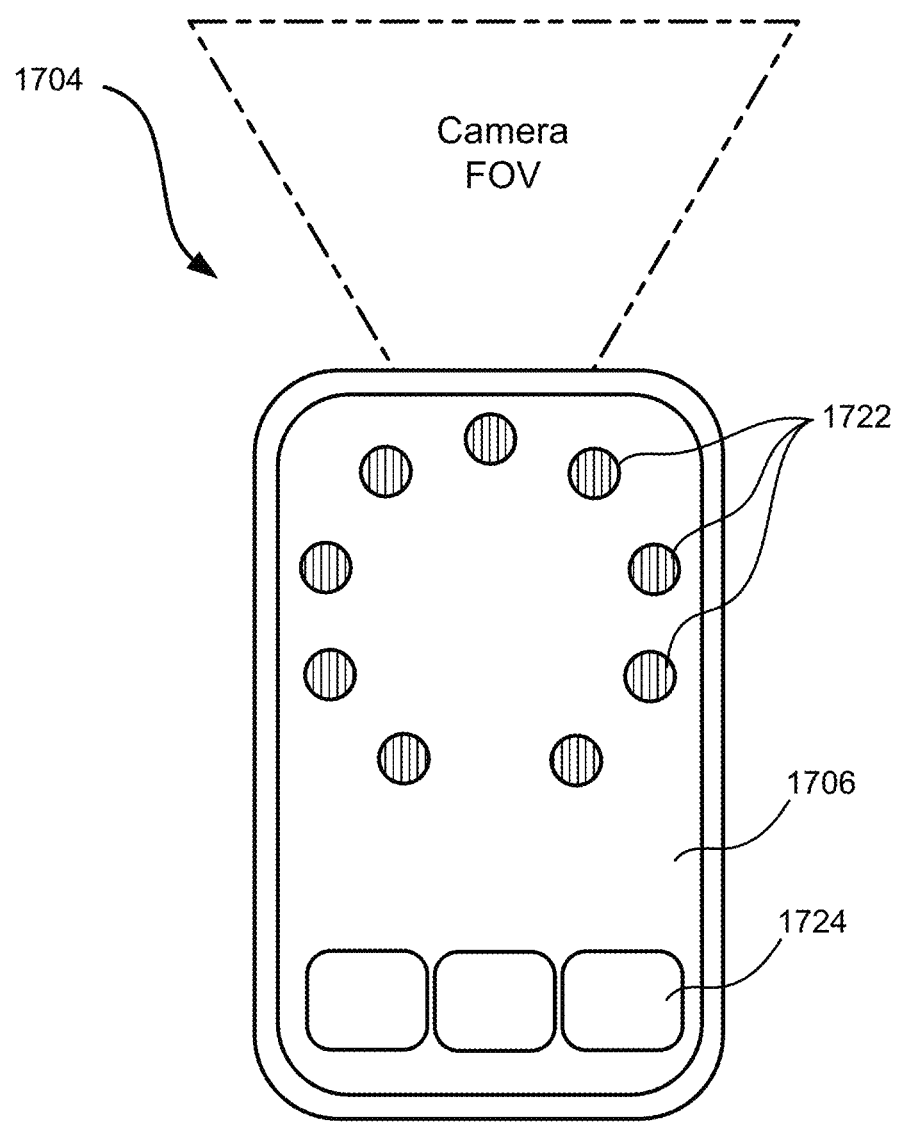
FIG. 17 illustrates an example of a mobile device that may be used as a handheld device of a wearable system.

FIG. 17 illustrates an example of a mobile device that may be used as a handheld device of a wearable system. The mobile device may be a cell phone, a tablet, or other device having a display. Alternatively, in some examples, a sticker pattern placed on a surface of known concavity may be suitable. Similar to the handheld device 404 in FIG. 4, the mobile device 1704 includes a camera and an IMU. A cell phone already has cameras and an IMU. In some examples, software such as ARCore and ARKit can use the camera and IMU of the mobile device 1704 for SLAM tracking. The mobile device 1704 also includes a user interface 1706 that can display fiducials 1722 in accordance with a set of pixel locations of a display of the mobile device 1704 for 6DOF pose tracking of the mobile device 1704. The user interface 1706 can also display buttons 1724 in accordance with other pixel locations that can receive user input, which, along with the camera, IMU, and fiducials 1722, provides all of the function of a controller.

Displaying the fiducials 1722 on the user interface 1706 can allow each mobile device to have a unique configuration of fiducials. That is, the fiducials 1722 are not constrained to be in a circle, so the user interface 1706 can display the fiducials 1722 in a unique pattern that can be used to distinguish the mobile device 1704 from other controllers. For instance, the fiducials 1722 may be displayed in a square shape on the user interface 1706 and another mobile device may display fiducials in a star shape.

To use the mobile device 1704 as a controller, the fiducials 1722 may be displayed as a bright dot on a dark digital screen (e.g., user interface 1706) or sticker background. The headset of the wearable system can capture an image that includes the mobile device 1704 and process the image using an algorithm that detects the pattern of the fiducials 1722 to identify the mobile device 1704 as a controller. The fiducials 1722 may be an always-on display to limit the dynamics to slow motion in the FOV. The wearable system may cause the fiducials 1722 to flash in accordance with a period and a frequency. In some embodiments, an always-on display may be suitable for tasks such as writing on a virtual whiteboard.

In some embodiments, the wearable system may cause the mobile device 1704 to modify the period, frequency, or the set of pixel locations at which the fiducials 1722 are displayed. For instance, the fiducials 1722 may be displayed for shorter, known periods of time that are coordinated with the headset cameras, which allows for tracking with faster dynamics since motion blur may be limited. Or, if the wearable system determines that images of the mobile device 1704 also depict another controller, the wearable system may cause the mobile device 1704 to modify the period, frequency, or set of pixel locations to distinguish the fiducials 1722 of the mobile device 1704 from fiducials of the other controller. The wearable system may synchronize the displaying of the fiducials 1722 with exposure intervals of the headset camera so that the fiducials 1722 are visible in images captured by the headset camera. The exposure intervals may be determined as described in FIGS. 8-11. The IMU of the mobile device 1704 may further be used to refine the determined position and orientation of the mobile device 1704 and can extend tracking slightly beyond when all of the fiducials 1722 are visible in the camera FOV. The camera(s) of the mobile device 1704 may be used to perform visual inertial odometry (VIO) to provide tracking outside the FOV of the headset cameras and increase the dynamic range of the tracking.

Figure 18:
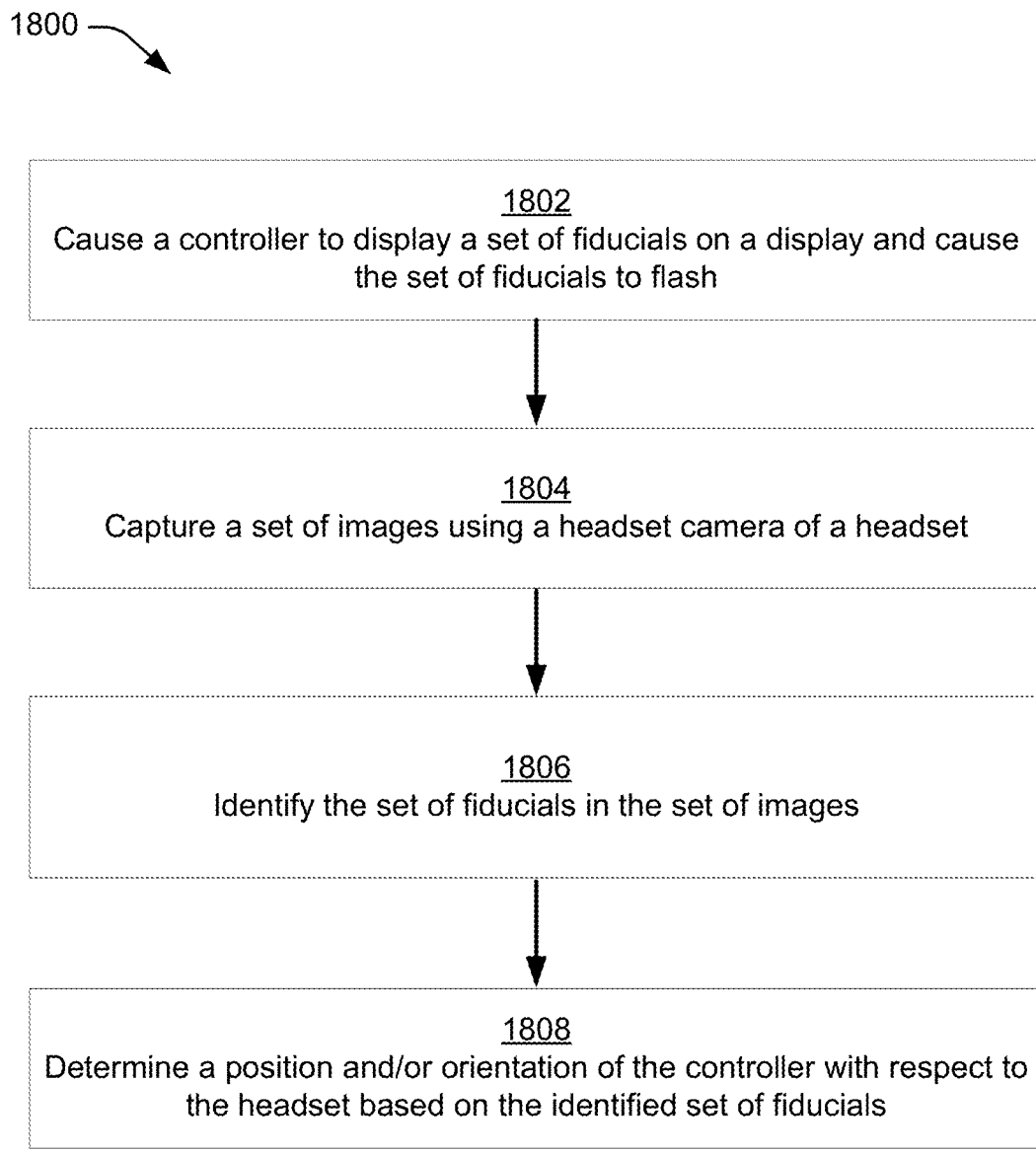
FIG. 18 illustrates an example method using a device as a controller and displaying fiducials on a display of the device, according to some embodiments of the present invention.

FIG. 18 illustrates an example method 1800 using a device as a controller and displaying fiducials on a display of the device, according to some embodiments of the present invention. One or more steps of method 1800 may be performed in a different order than the illustrated embodiment, and one or more steps of method 1800 may be omitted during performance of method 1800. Furthermore, two or more steps of method 1800 may be performed simultaneously or concurrently with each other.

At step 1802, a controller is caused to display a set of fiducials on a display. The set of fiducials is displayed in accordance with a set of pixel locations. The controller can also display one or more buttons configured to receive user input on the display in accordance with another set of pixel locations.

At step 1804, set of images is captured using a headset camera of a headset. The images can show the controller if the controller is in the field of view of the headset camera.

At step 1806, the set of fiducials is identified in the set of images. Fiducials of another controller depicted in the set of images may also be identified.

At step 1808, a position and/or an orientation of the controller with respect to the headset is determined based on the identified set of fiducials. Knowing the position and orientation of the headset, the wearable system can use the identified fiducials to determine a pose of the controller. In addition, the wearable system may modify a period, frequency, or the set of pixel locations to disambiguate the set of fiducials from fiducials of another controller.

FIGS. 19A-19B illustrate exemplary internal perspective views of a controller of a wearable system. An optical 6DOF platform of the controller 1904 can include a VIO sensor module 1912, a constellation module 1914, a main printed circuit board (PCB) 1916, a wireless communication engine 1918, a battery 1920, and a haptics engine 1922. Other components, such as a trigger, bumper, touchpad, and input buttons may additionally be included. The VIO sensor module 1912 can include one or more cameras and an IMU on a rigid submount. The constellation module 1914 can include a fiducial array (e.g., LEDs). The main PCB 1916 includes a via in pad (VIP) and LED drive electronics for the controller 1904. The wireless communication engine 1918 includes components for communicating with a headset or other devices of a wearable system. The battery 1920 provides power to the controller 1904 and the haptics engine 1922 provides vibration and other sensory outputs in response to inputs received by the controller 1904.

In some instances, only the constellation module 1914, the main PCB 1916, and an input button may be needed to provide for 6DOF tracking. The other components may be optional depending on the application. So, the controller 1904 may be modular. The module(s) can be used to control and/or track an external device-one example of which is a drone. Another example, (e.g., for pure tracking) may be to attach one of these modules (or a complete controller) to a firearm for military or law enforcement training, so the direction in which a rifle is pointing can be tracked and/or "shown" to a user through the headset. Such embodiments may be useful in combat or training.

Figure 20A:
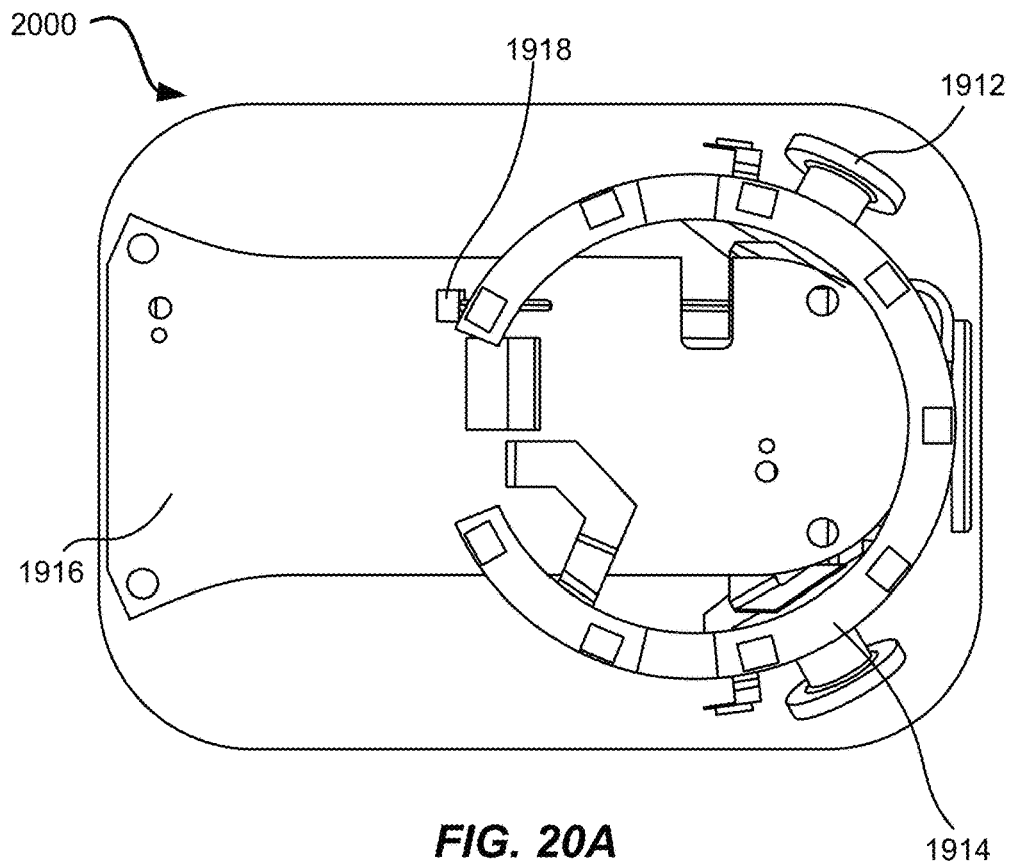
FIGS. 20A-20B illustrate perspective views of an exemplary module for maximum reuse.
Figure 20B:
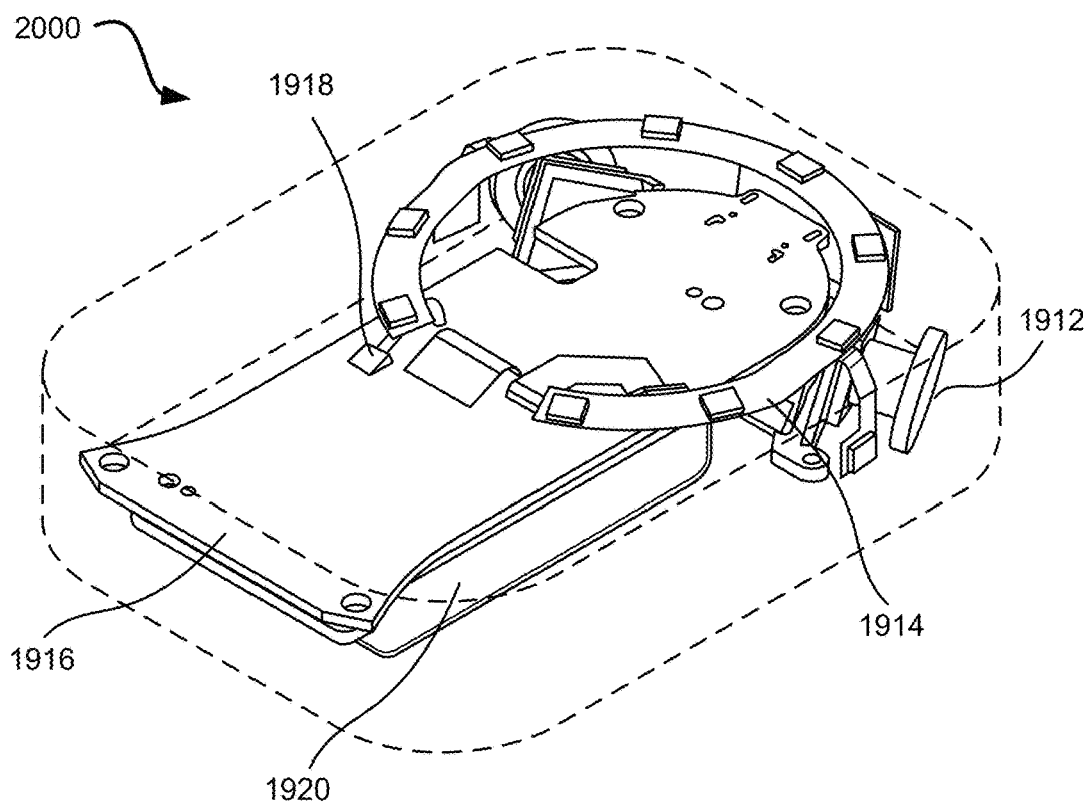

FIGS. 20A-20B illustrate perspective views of an exemplary module for maximum reuse. The module 2000 includes the VIO sensor module 1912, the constellation module 1914, the main PCB 1916, the wireless communication engine 1918, and the battery 1920. The module 2000 may also include input buttons and a LED user indicator. But, the module 2000 may lack other user inputs such as a touchpad and trigger. In addition, the module 2000 may lack a haptics engine. In one example, the module 2000 may have an approximate size of 84 mm long, 64 mm wide, and 18 mm thick and may be powered and communicate over a universal serial bus (USB).

Figure 21A:
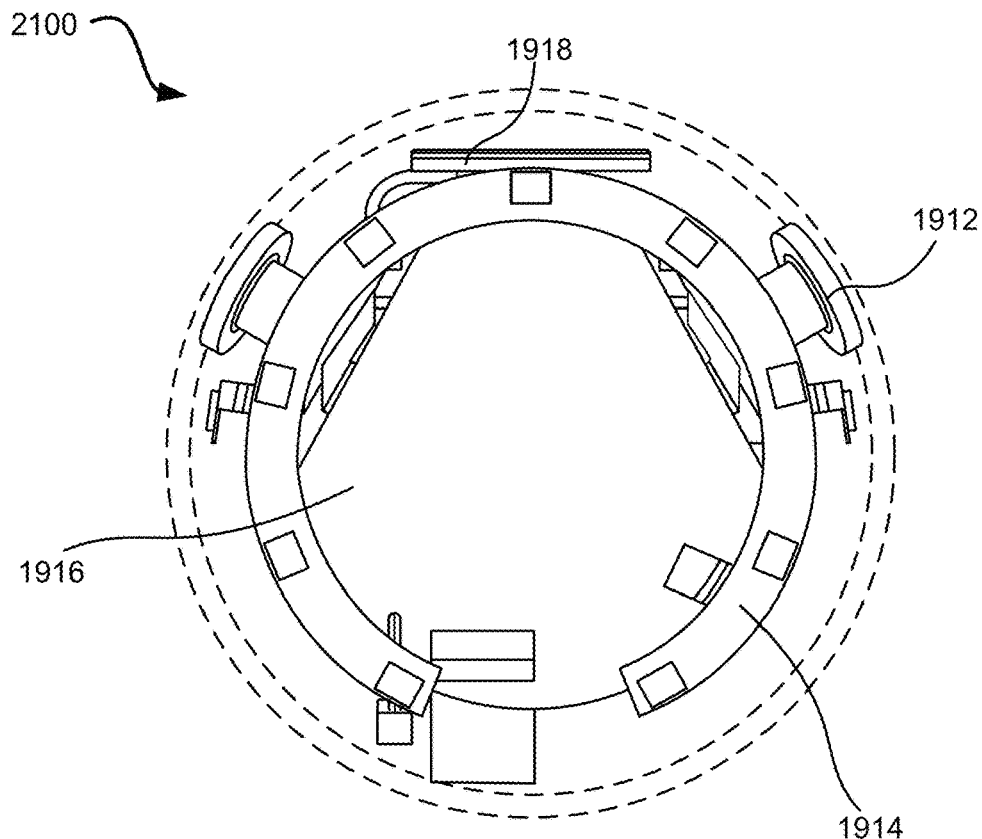
FIGS. 21A-21B illustrate perspective views of an exemplary hybrid module.
Figure 21B:
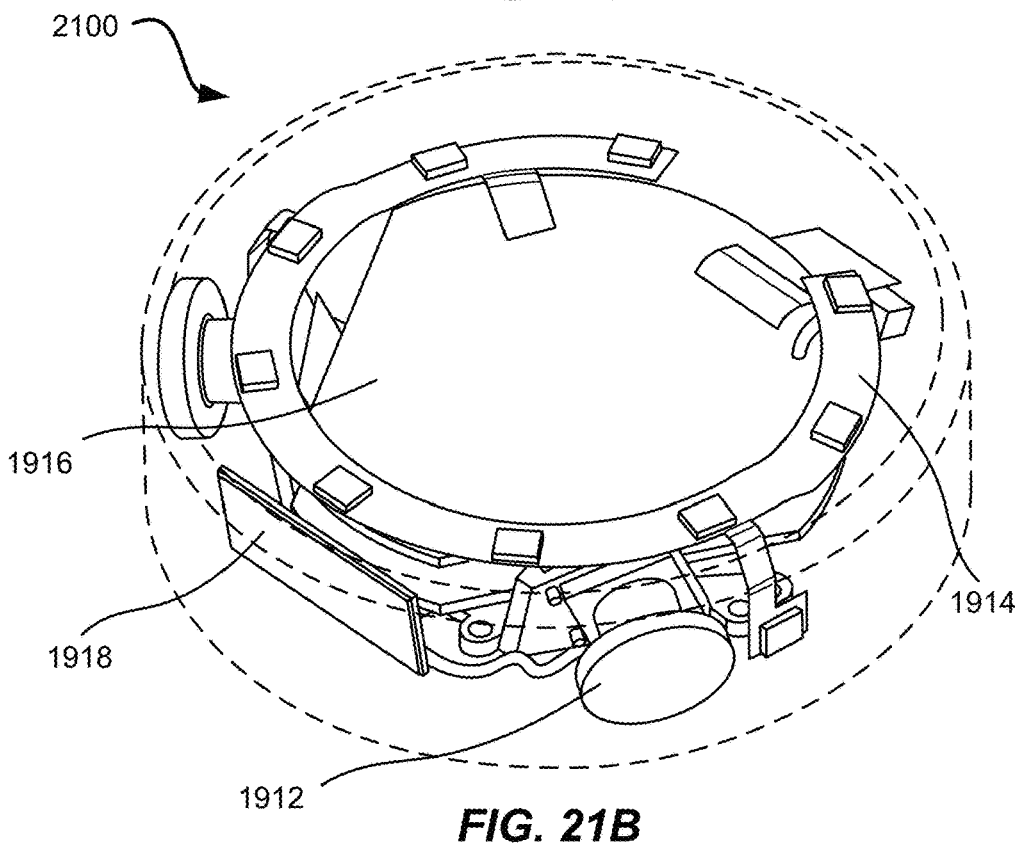

FIGS. 21A-21B illustrate perspective views of an exemplary hybrid module. The hybrid module 2100 includes the VIO sensor module 1912, the constellation module 1914, the main PCB 1916 and the wireless communication engine 1918. The hybrid module 2100 may also include input buttons and a LED user indication. But, the hybrid module 2100 may lack other user inputs such as a touchpad and trigger. In addition, the hybrid module 2100 may lack a battery and a haptics engine. So, the hybrid module 2100 may be powered by a USB connection. In one example, the approximate size for the hybrid module 2100 may be 64 mm in diameter and 18 mm thick.

Figure 22A:
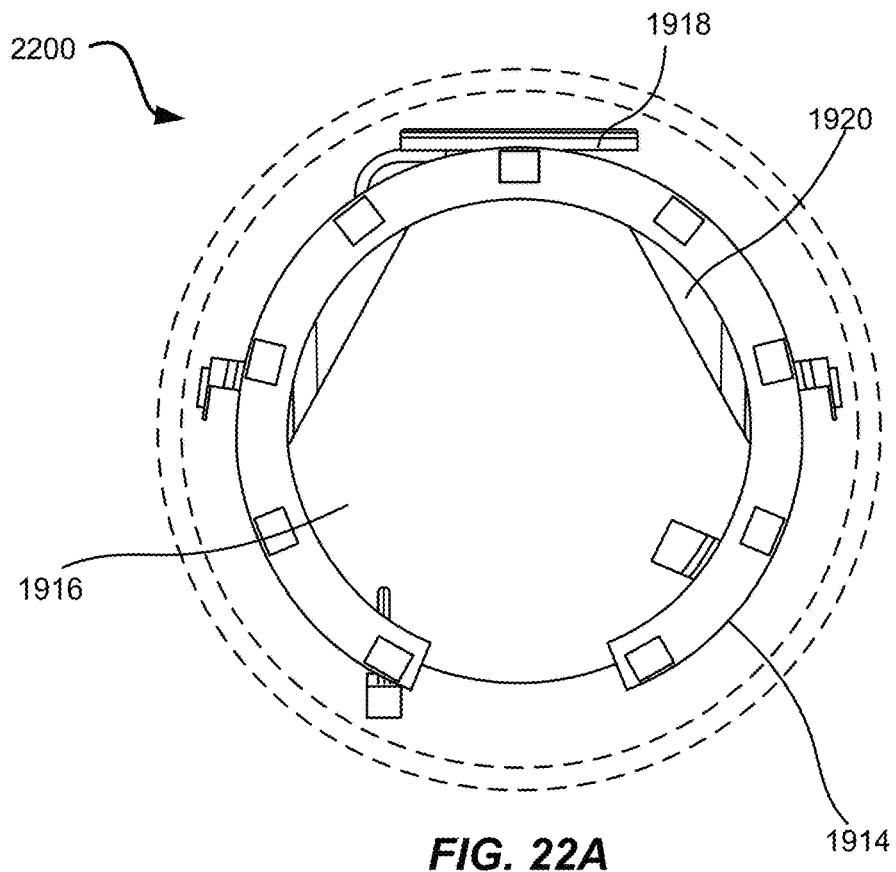
FIGS. 22A-22B illustrate perspective views of another exemplary module.
Figure 22B:
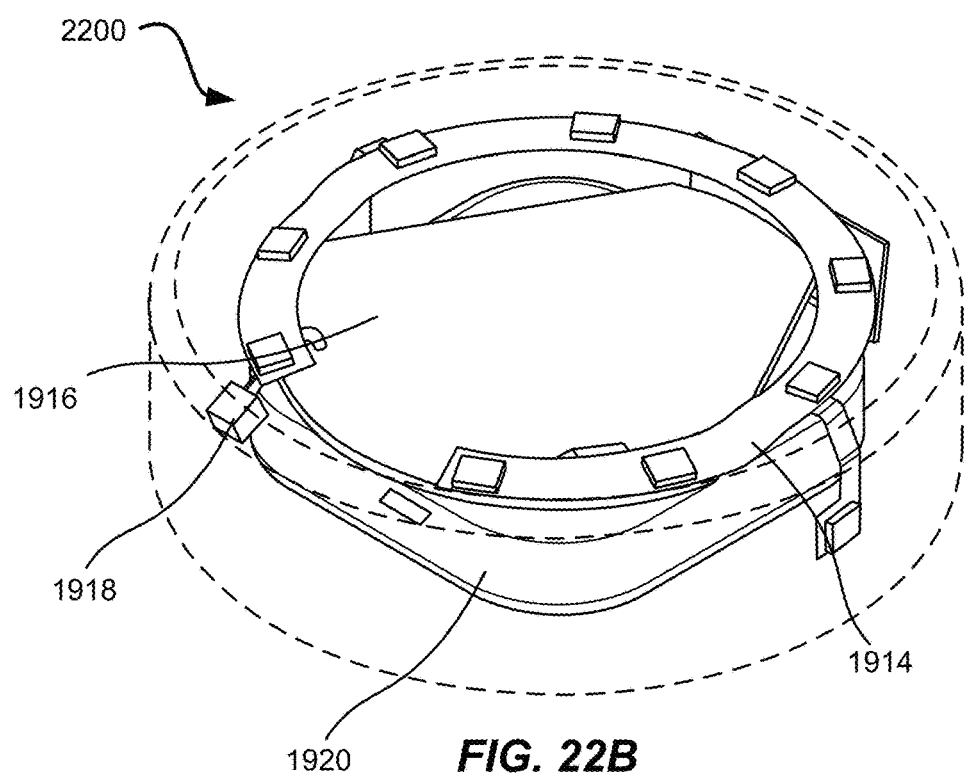

FIGS. 22A-22B illustrate perspective views of another exemplary module. The module 2200 includes the constellation module 1914, the main PCB 1916, the wireless communication engine 1918, and the battery 1920. The module 2200 may also include input buttons and a LED user indication. But, the module 2200 may lack other user inputs such as a touchpad and trigger. In addition, the module 2200 may lack a VIO sensor module and a haptics engine. So, the module 2200 may only work for constellation tracking when in the headset camera's FOV and may be limited to tracking at 30 frames per second, which may extend the battery life of the module 2200. In one example, the approximate size for the module 2200 may be 64 mm in diameter and 18 mm thick.

Other modules are also possible. For instance, a smallest possible module may include the VIO sensor module, the constellation module, the main PCB, an input button, and a user indication. So, the smallest module may lack a wireless communication engine, a battery, other user inputs, and a haptics engine. As a result, the module may be powered and communicate via a USB. In one example, the approximate size for the module may be 50 mm in diameter and 15 mm thick.

Figure 23A:
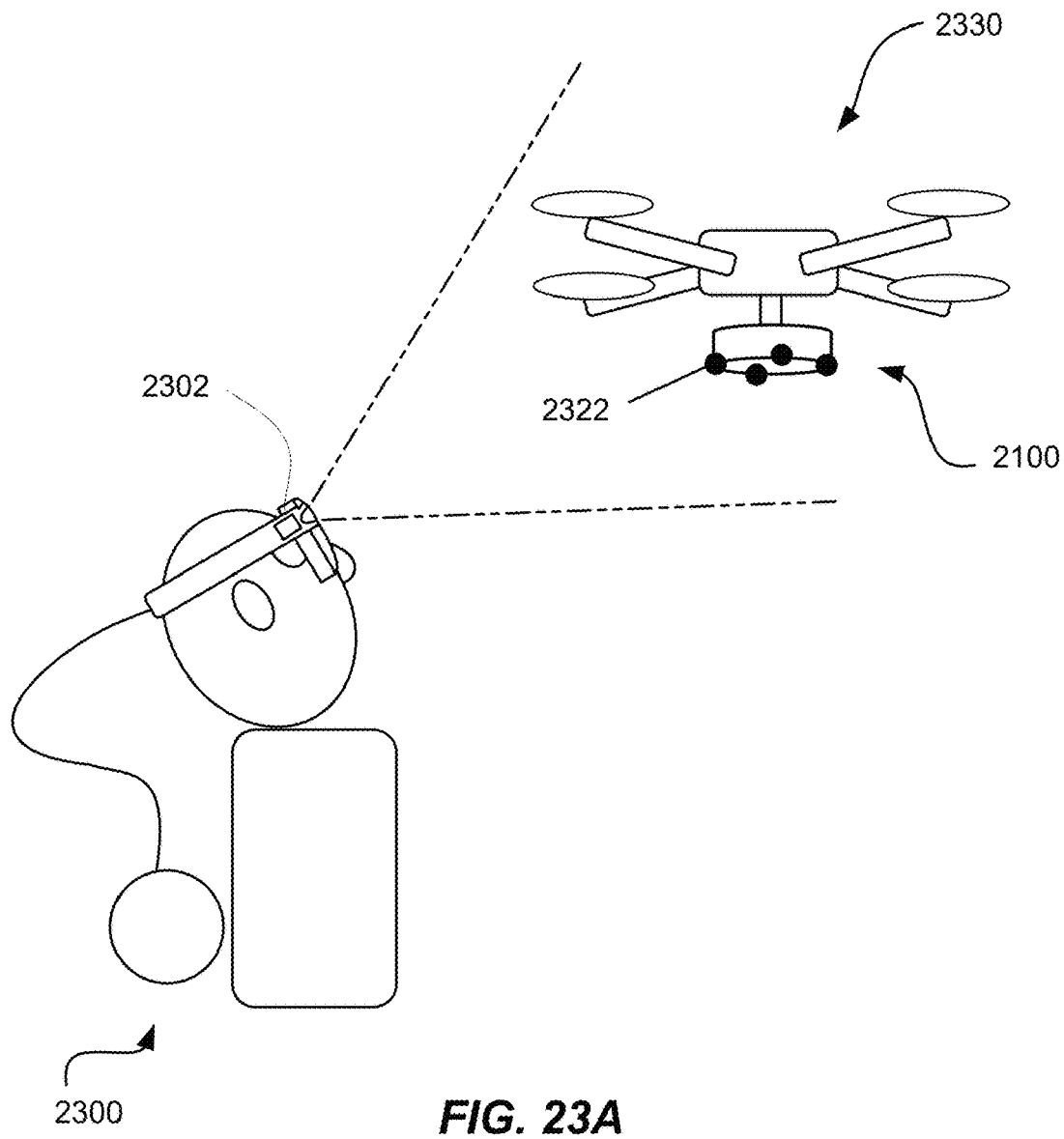
FIGS. 23A-23B illustrate a modular controller being applied to a drone.
Figure 23B:
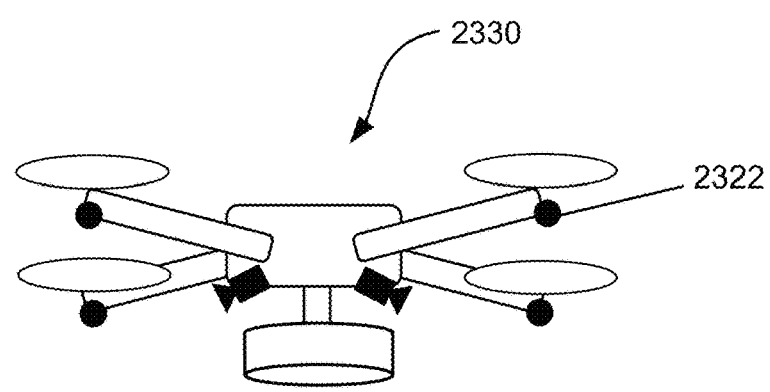

The modular features of the controller may allow the controller to be applied to drone and unmanned aerial vehicle (UAV) applications, as illustrated in FIGS. 23A-23B. A module, such as hybrid module 2100 in FIGS. 21A-21B can be connected to a drone 2330. Alternatively, the hardware of the hybrid module 2100 may be integrated into the drone 2330 to allow a larger baseline between constellation fiducials 2322. For instance, as shown in FIG. 23B, the fiducials 2322 may be spaced farther apart from each other if they are incorporated into the drone 2330 than if they are part of the hybrid module 2100 connected to the drone 2330, as shown in FIG. 23A.

The drone 2330 may be controlled by an application on the wearable system 2300. Accordingly, when a user's device (e.g., headset 2302) sees the fiducials 2322 on the drone 2330, the drone 2330 is localized precisely. The drone 2330 can then fly out of the user's line of sight and rely on VIO for navigation and communicating location and altitude to the user. When the drone 2330 returns to line of sight, it is localized precisely once again, and any error in the path can be refined. Drones with a controller module may be useful for packaging and item delivery applications, reconnaissance mapping applications, and remote inspections of construction sites or other dangerous areas. In some instances, a drone can have other sensors attached, including GPS, radar, etc.

Figures 24, 25:
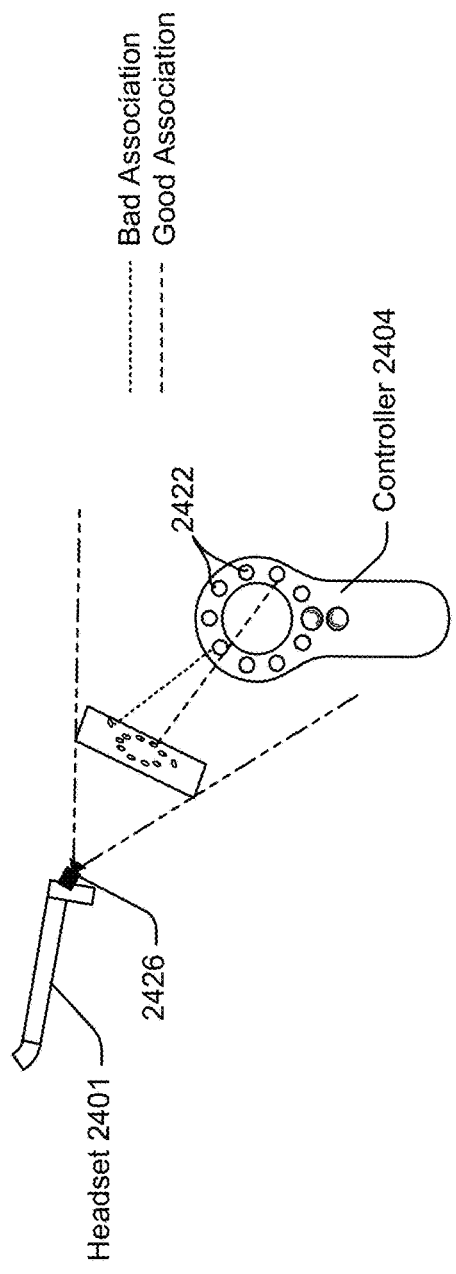
FIG. 24 illustrates a headset sensing a constellation of passive or active fiducials included in a controller of a wearable system.
FIG. 25 illustrates a table showing the iterations needed to test all perspective 3 point combinations.

FIG. 24 illustrates a headset 2401 of a wearable system including an image sensor 2426 capable of sensing a constellation of passive or active fiducials included in a controller 2404 of the wearable system. The constellation may be fiducials 2422. The headset 2401 can also include an algorithm that detects the fiducials. However, the algorithm may be affected by a high percentage of outlier detections. For instance, the algorithm may detect other lights in proximity to the controller 2404 and mistakenly associate the lights with the controller 2404 (as illustrated by the bad association in FIG. 24). A good association is when the algorithm detects only the fiducials 2422 of the controller 2404 for tracking.

To associate fiducials of a controller, the headset 2401 may aim to find associations between an array of fiducials and its corresponding detections, where the number of detections is usually bigger than the number of fiducials. This association problem can be solved in a brute-force manner by employing a voting matrix and a minimal pose estimator called perspective 3 point (P3P), iteratively voting for correct reprojections after a trial of correspondences. This problem scales with the factorial of the number of fiducials and detections:

$$N = 4 \cdot \binom{n_D}{3} \cdot \frac{n_L!}{(n_L - 3)!} \quad (1)$$

where $n_D$ is the number of detections caused by projected light sources and $n_L$ is the number of active fiducials of the controller.

FIG. 25 illustrates a table showing the iterations needed to test all P3P combinations. The columns represent the number of detections and the rows represent the number of fiducials. The scaling of this problem has big impact on the bandwidth of the algorithms that rely on this sensing modality.

Figure 26A:
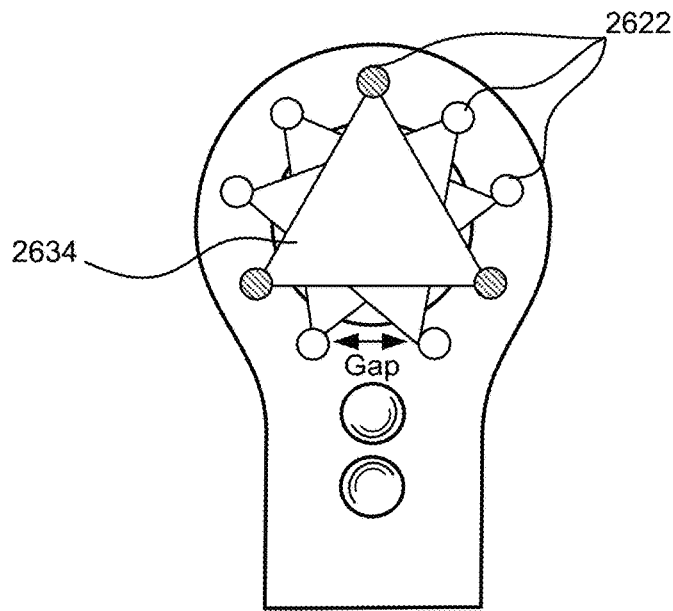
FIG. 26A illustrates an example set of fiducials arranged in multiple symmetric groups for fiducial association.

FIG. 26A illustrates an example set of fiducials arranged in multiple symmetric groups for fiducial association. Since the constellation is rotationally symmetric up to a gap, enough detections of the constellation can be found to calculate a median distance between fiducials. Due to the rotational symmetry, eqn. 1 can be simplified to:

$$N = 4 \cdot \binom{n_D}{3} \cdot 3. \quad (2)$$

A group 2634 can include three fiducials that can be matched with any three detections. The wearable system can calculate a pose using the P3P algorithm. Then, the remaining fiducials can be projected using the pose and inliers can be counted by comparing them to a fixed reprojection tolerance. The group of associations with the largest amount of inliers may be selected, making the association correct up to the rotation symmetry axis (e.g., the gap). The wearable system can project the pattern onto a planar surface and rotate the pattern around the symmetry axis to find the best match. In other words, the gap in the constellation can be found.

This process may work by having rotation symmetry not perfect at the gap, i.e., the gap is smaller or bigger than the median neighboring marker distance.

Figure 26B:
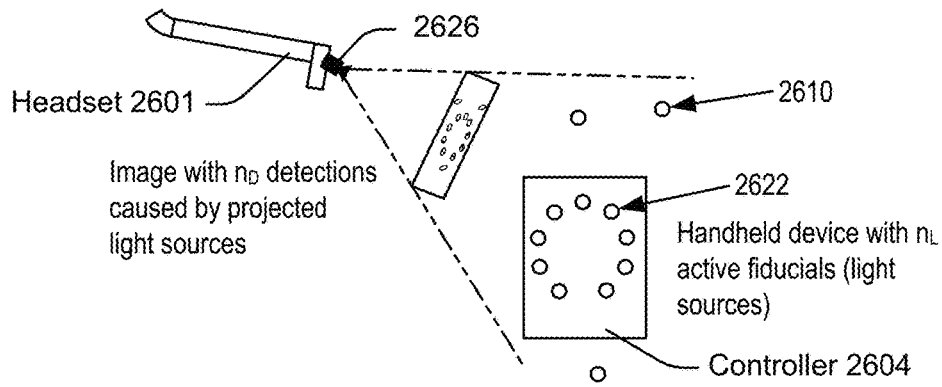
FIG. 26B illustrates a wearable system including a headset with an imaging device that captures an image of a controller.

FIG. 26B illustrates a wearable system including a headset 2601 with an imaging device 2626 that captures an image of a controller 2604 having fiducials 2622, a number of which are active (i.e., emitting light). The image may be analyzed to identify a number of detections, which may correspond to groups of pixels having a particular range of values believed to correspond to active fiducials. In some instances, one or more of the detections may be caused by interfering light sources 2610 that project light to the imaging device 2626. Such light sources 2610 may be from interior or exterior lighting sources, and may be direct or reflected light (e.g., light reflected off of one or more surfaces before reaching the imaging device 2626). Accordingly, the image may include detections corresponding to fiducials 2622 of the controller 2604 as well as detections caused by other light sources, and as such the wearable system may need to determine which detections are associated with the fiducials 2622 of the controller 2604 so that the controller 2604 can be accurately tracked.

Figure 26C:
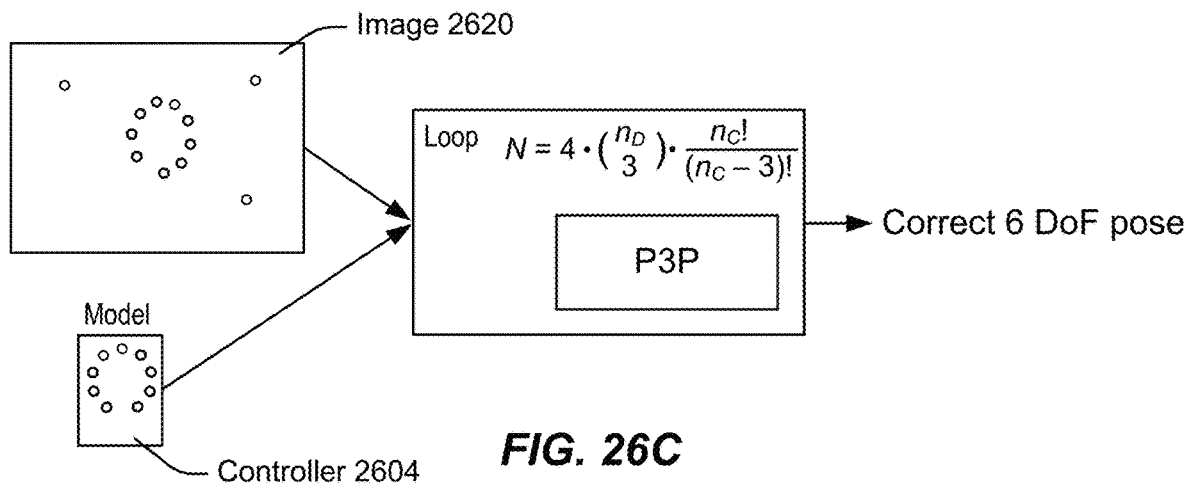
FIG. 26C illustrates a general association problem using a perspective 3 point algorithm.

FIG. 26C illustrates a general association problem using the P3P algorithm. The algorithm can receive an image 2620 captured by the imaging device 2626 of the headset 2601 and a model of the constellation of the controller 2604 that is being tracked. The output of the algorithm can be the 6DOF pose of the controller 2604.

FIG. 27A illustrates a failure case of associating detections with fiducials to determine a pose of a controller 2704. A wearable system receives an image 2720A of a field of view of a headset camera and identifies a set of objects 2724A-2724C in the image 2720A. The set of objects 2724A-2724C may include fiducial projections and/or detections of other light source projections. The wearable system selects a subset of the set of objects in the image 2720A. The subset can include a predetermined number (e.g., at least three) objects. The wearable system can also select a subset of the set of objects from a model 2742A of the controller 2704 that includes fiducials. So, the selected objects 2724A-2724C in the image 2720A may be two-dimensional points and the selected objects in the model 2742A may be three-dimensional points. In FIG. 27A, the predetermined number in the subsets is three.

The subsets of the objects can be input into the P3P algorithm, which outputs a 6DOF pose of the controller 2704. The pose for the controller 2704 is calculated by associating the subsets with groups of fiducials that are rotationally symmetric with respect to each other and each includes the predetermined number of fiducials. The wearable system may calculate statistics for the associated subsets based on a compatibility of poses for groups of fiducials. The statistics may include, for example, an error associated with fitting a group of fiducials with a subset of objects. In some examples, the wearable system can project the pose onto the image 2720A and validate an alignment of the subset of objects 2724A-2724C against the remaining points in the image 2720A. The wearable system can determine a number of the set of objects 2724A-2724C that align with the set of fiducials for a pose. FIG. 27A may be a failure case because only three objects are determined to match the pose calculated by the algorithm. Objects 2724A-2724C match the pose because they are the objects originally selected in the image 2720A. But, only object 2724C corresponds to a fiducial 2722 of the controller 2704, so six fiducials of the projected pose do not match. As a result, the wearable system may select a different subset of the set of objects and calculate a new pose to improve the association of the pose with the fiducials.

FIG. 27B illustrates a success case of associating detections with fiducials to determine a pose of the controller 2704. A wearable system receives an image 2720B of a field of view of a headset camera and identifies a set of objects 2724D-2724F in the image 2720B. The set of objects 2724D-2724F may include fiducial projections and/or detections of other light source projections. In FIG. 27B, the objects 2724D-2724F each correspond to a fiducial of the controller 2704. The wearable system selects a subset of the set of objects 2724D-2724F in the image 2720B. The subset can include a predetermined number (e.g., at least three) objects. The wearable system can also select a subset of the set of objects from a model 2742B of a controller 2704 that includes fiducials. So, the selected objects 2724D-2724F in the image 2720B may be two-dimensional points and the selected objects in the model 2742B may be three-dimensional points. In FIG. 27B, the predetermined number in the subsets is three.

The subsets of the objects can be input into the P3P algorithm, which outputs a 6DOF pose of the controller 2704. The pose for the controller 2704 is calculated by associating the subsets with groups of fiducials that are rotationally symmetric with respect to each other and each includes the predetermined number of fiducials. The wearable system may calculate statistics for the associated subsets based on a compatibility of poses for groups of fiducials. To do this, the wearable system can project the pose into the image 2720B and validate an alignment of the subset of objects against the remaining points in the image 2720B. The wearable system can determine a number of the set of objects 2724D-2724FC that align with the set of fiducials for a pose. FIG. 27B may be a success case because all nine of the fiducials of the controller 2704 are determined to match the pose calculated by the algorithm. So, the wearable system may determine that the association between the set of objects and the set of fiducials is correct based on the statistics, and thus that the calculated pose is accurate for the controller 2704.

FIG. 28 illustrates another example of associating fiducials of a controller with objects in an image. The wearable system can create a circular fiducial pattern such that distances between triplets of fiducials 2822 are the same. This means that the triangles built by each triplet is the same up to rotation around the circle center. A gap between two of the adjacent fiducials is larger than gaps between other pairs of adjacent fiducials. $n_L/3$ triangles can be built from the triplets of fiducials 2822.

The wearable system attempts to associate objects detected in an image with the fiducials 2822 of the controller. To do this, the wearable system selects a subset of objects depicted in the image that form a triplet. The subset of objects is input into a P3P algorithm that calculates a pose by:

$$N = 4 \cdot \binom{n_D}{3} \cdot \frac{n_L}{3} * \left(\frac{n_L}{3-1}\right). \tag{3}$$

The pose can be rotated around the center of the triplet to determine how all possible other triangles fit the set of objects. This process can be repeated for multiple subsets of objects and multiple poses. Whichever pose matches the most fiducials can be determined to be the pose of the controller. Referring to FIG. 28, a first pose 2844A may be determined to match all but one fiducial, a second pose 2844B may be determined not to match multiple fiducials, and a third pose 2844C may be determined to match all fiducials. Boxes 2846A-2846B illustrate the misalignment of the fiducials in the first pose 2844A and the second pose 2844B, respectively. The wearable system can determine that since the third pose 2844C matches the most fiducials, it is the most accurate pose of the controller.

Figure 29:
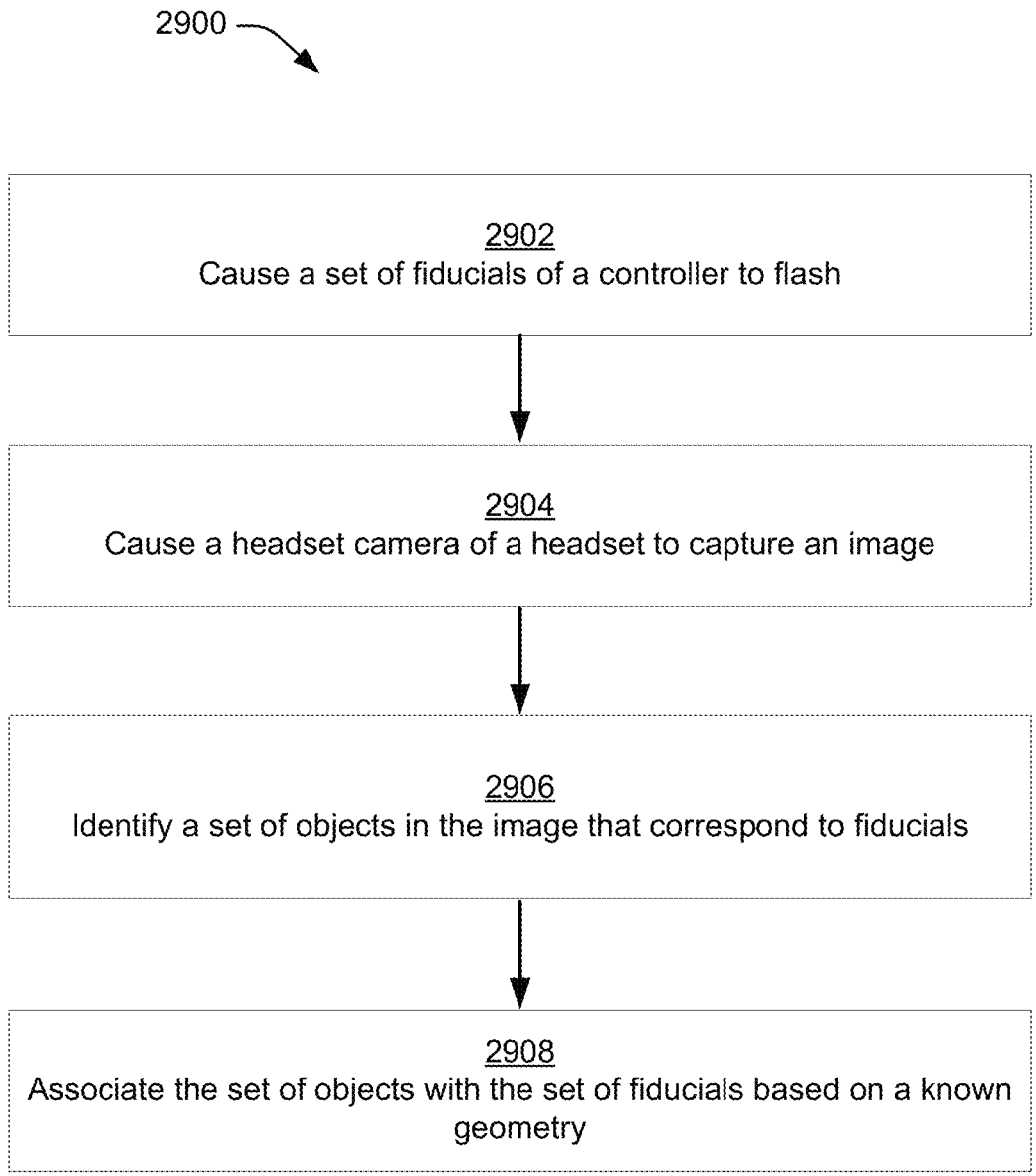
FIG. 29 illustrates an example method of fiducial association using rotational symmetry, according to some embodiments of the present invention.

FIG. 29 illustrates an example method 2900 of fiducial association using rotational symmetry, according to some embodiments of the present invention. One or more steps of method 2900 may be performed in a different order than the illustrated embodiment, and one or more steps of method 2900 may be omitted during performance of method 2900. Furthermore, two or more steps of method 2900 may be performed simultaneously or concurrently with each other.

At step 2902, a set of fiducials of a controller is caused to flash. The fiducials are arranged in a known geometry (e.g., a circle) that includes multiple groups of fiducials that are rotationally symmetric with respect to each other. A quantity of each of the multiple groups of fiducials can be equal to a predetermined number (e.g., at least three).

At step 2904, a headset camera of a headset is caused to capture an image. The image can show the controller if the controller is in a field of view of the headset camera when the image is captured.

At step 2906, a set of objects in the image is identified that corresponds to fiducials. The set of objects can correspond to the set of fiducials of the controller and/or one or more light sources projected in the image.

At step 2908, the set of objects is associated with the set of fiducials based on the known geometry. Subsets of the set of objects can be repeatedly selected and poses for the controller can be calculated by associating the subsets with the multiple groups of fiducials. Each of the subsets can have a quantity equal to the predetermined number. Statistics can be calculated for the associated subsets based on a compatibility of poses for the multiple groups of fiducials and a correct association between the set of objects and the set of fiducials can be found based on the statistics. The subsets of the set of objects can be input into a P3P algorithm configured to output the poses for the controller.

Figures 30A, 30B:
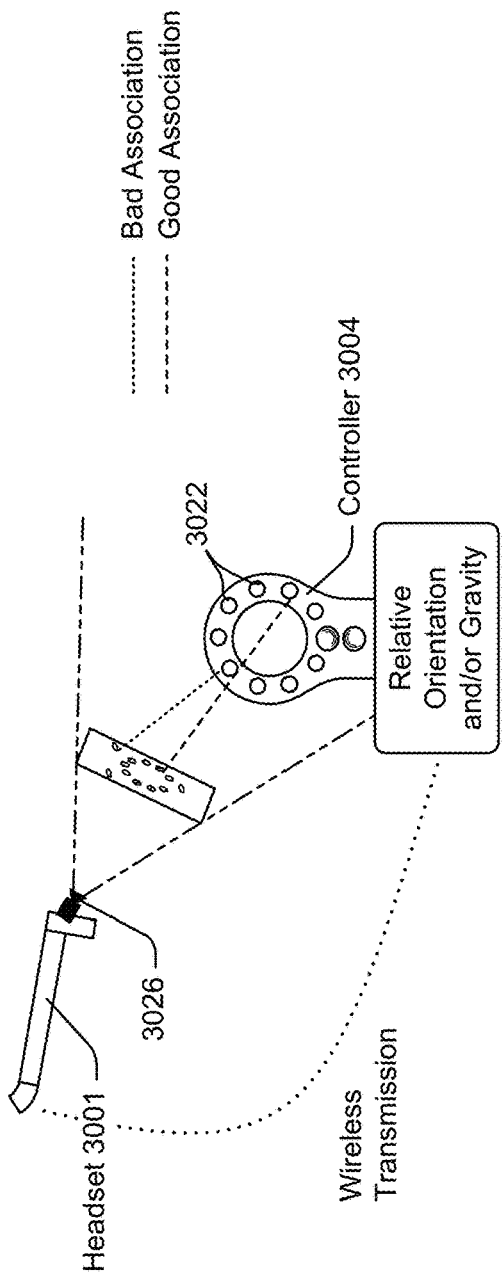
FIG. 30A illustrates another headset sensing a constellation of passive or active fiducials included in a controller of a wearable system.
FIG. 30B illustrates a table showing the iterations needed to test all perspective 2 point combinations.

FIG. 30A illustrates a headset 3001 of a wearable system including an image sensor 3026 capable of sensing a constellation of passive or active fiducials included in a controller 3004 of the wearable system. The constellation may be fiducials 3022. The headset 3001 may perform an algorithm that detects the fiducials. However, the algorithm may be affected by a high percentage of outlier detections. For instance, the algorithm may detect other lights in proximity to the controller 3004 and mistakenly associate the lights with the controller 3004 (as illustrated by the bad association in FIG. 30A). A good association is when the algorithm detects only the fiducials 3022 of the controller 3004 for tracking.

To associate fiducials of a controller, the headset 3001 may aim to find associations between an array of fidcuials and its corresponding detections, where the number of detections is usually bigger than the number of fiducials. This association problem can be solved in a brute-force manner by employing a voting matrix and a minimal pose estimator called P3P, iteratively voting for correct reprojections after a trial of correspondences. This problem scales with the factorial of the number of fiducials and detections, as illustrated by Eqn. 1.

FIG. 30B illustrates a table showing the iterations needed to test all P2P combinations. If the controller 3004 includes an IMU capable of determining a rotation measurement of the controller 3004 with respect to the headset 3001, a P2P algorithm may be used instead of a P3P algorithm. The P2P algorithm may be a standard P2P algorithm or a gravity-based P2P algorithm. The columns represent the number of detections and the rows represent the number of fiducials. As shown by comparing the table of FIG. 30B with the table of FIG. 25, the number of iterations needed to test all combination can be greatly reduced by utilizing the IMU measurements made by the controller 3004.

Figure 31A:
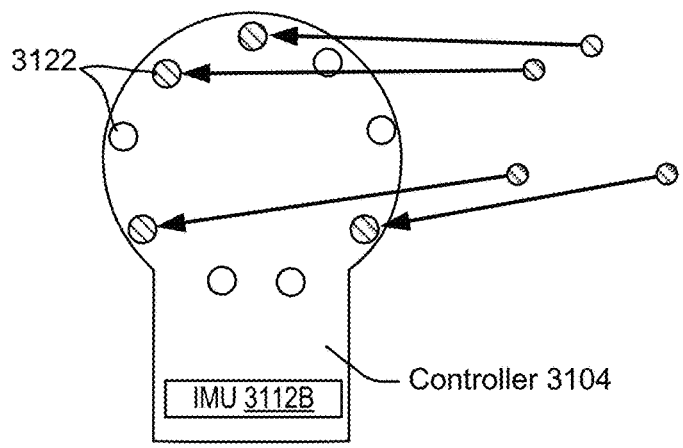
FIG. 31A illustrates an example of projected fiducials of a controller.

FIG. 31A illustrates an example of projected fiducials of a controller 3104. Because the controller 3104 includes an IMU 3112B, the fiducials 3122 are projected with a known orientation. So, Eqn. 1 can be simplified to:

$$N = 4 \cdot \binom{n_D}{2} \cdot \frac{n_L!}{(n_L - 2)!} \quad (4)$$

Figure 31B:
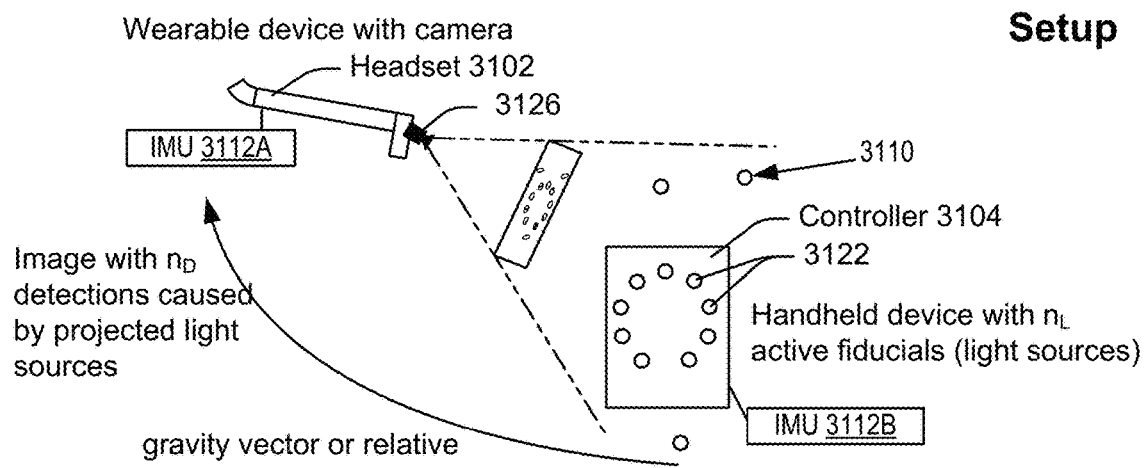
FIG. 31B illustrates a wearable system including a headset with an inertial measurement unit and an imaging device that captures an image of a controller.

FIG. 31B illustrates a wearable system including a headset 3102 with an IMU 3112A and an imaging device 3126 that captures an image of a controller 3104 having fiducials 3122, a number of which are active (i.e., emitting light). The image may be analyzed to identify a number of detections/, which may correspond to groups of pixels having a particular range of values believed to correspond to active fiducials. In some instances, one or more of the detections may be caused by interfering light sources 3110 that project light to the imaging device 3126. Such light sources 3110 may be from interior or exterior lighting sources, and may be direct or reflected light (e.g., light reflected off of one or more surfaces before reaching the imaging device 3126). Accordingly, the image may include detections corresponding to fiducials 3122 of the controller 3104 as well as detections caused by other light sources, and as such the wearable system may need to determine which detections are associated with the fiducials 3122 of the controller 3104 so that the controller 3104 can be accurately tracked. The headset 3101 can include the IMU 3112A and the controller 3104 can include an IMU 3112B so that a rotation of the controller 3104 with respect to the headset 3101 can be determined.

Figure 31C:
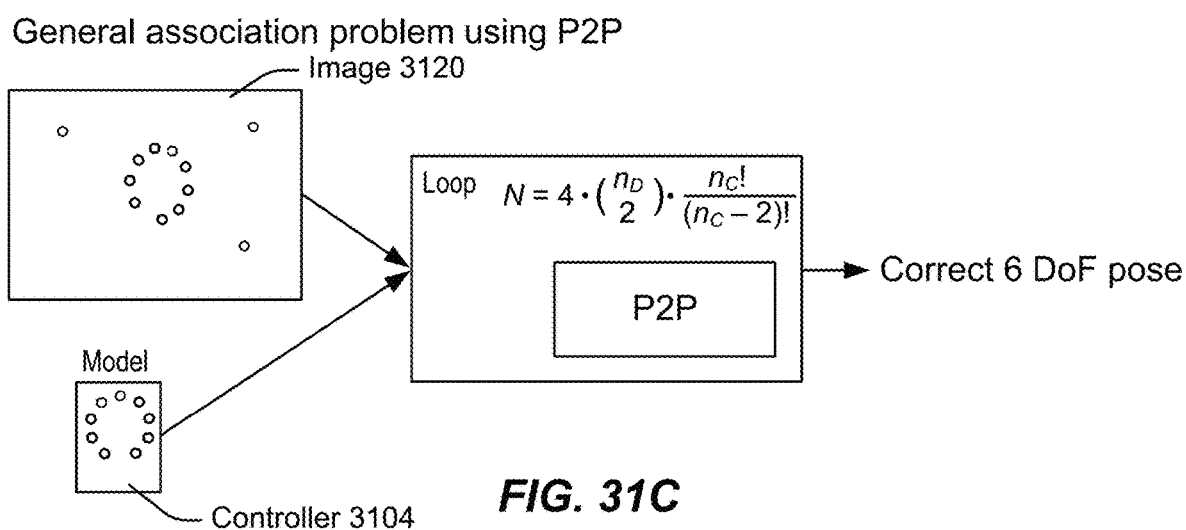
FIG. 31C illustrates a general association problem using a perspective 2 point algorithm.

FIG. 31C illustrates a general association problem using the P2P algorithm. The algorithm can receive an image 3120 captured by the imaging device 3126 of the headset 3102 and a model of the constellation of the controller 3104 that is being tracked. The output of the algorithm can be the 6DOF pose of the controller 3104.

Figure 32A:
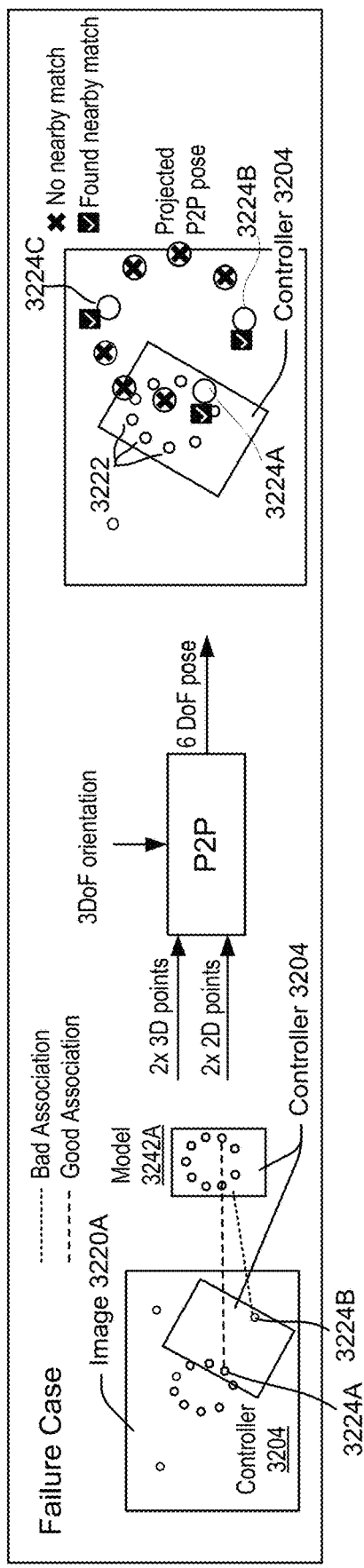
FIG. 32A illustrates a failure case of associating detections with fiducials to determine a pose of a controller.

FIG. 32A illustrates a failure case of associating detections with fiducials to determine a pose of a controller 3204. A wearable system receives an image 3220A of a field of view of a headset camera and identifies a set of objects 3224A-3224B in the image 3220A. The set of objects 3224A-3224B may include fiducial projections and/or detections of other light source projections. Object 3224A is a fiducial of the controller 3204 and object 3224B is a detection of another light source projection. The wearable system selects a subset of the set of objects in the image 3220A. The subset can include a predetermined number (e.g., at least two) objects. The wearable system can also select a subset of the set of objects from a model 3242A of a controller 3204 that includes fiducials. So, the selected objects in the image 3220A may be two-dimensional points and the selected objects in the model 3242A may be three-dimensional points. In FIG. 32A, the predetermined number in the subsets is three.

The subsets of the objects, along with a rotational measurement (e.g., 3DOF orientation) of the controller 3204 determined from an IMU, can be input into the P3P algorithm, which outputs a 6DOF pose of the controller 3204. The pose for the controller 3204 is calculated by associating the subsets with fiducials based on a known geometry of the arrangement of the fiducials. The wearable system may repeatedly select subsets of sets of objects and calculate poses for the controller 3204 by associating the subsets with groups of fiducials. The wearable system calculates statistics for the associated subsets based on a compatibility of poses for the groups of fiducials and based on the rotational measurement. The statistics may include, for example, an error associated with fitting a group of fiducials with a subset of objects. In some examples, the wearable system can project the pose into the image 3220A and validate an alignment of the subset of objects 3224A-3224B against the remaining points in the image 3220A. The wearable system can determine a number of the set of objects that align with the set of fiducials for a pose. FIG. 32A may be a failure case because only three fiducials of the controller 3204 are determined to match the pose calculated by the algorithm. Objects 3224A-3224C are determined to match the pose, while six other objects are determined not to match. So, the wearable system may select a different subset of the set of objects and calculate a new pose to improve the association of the pose with the fiducials.

Figure 32B:
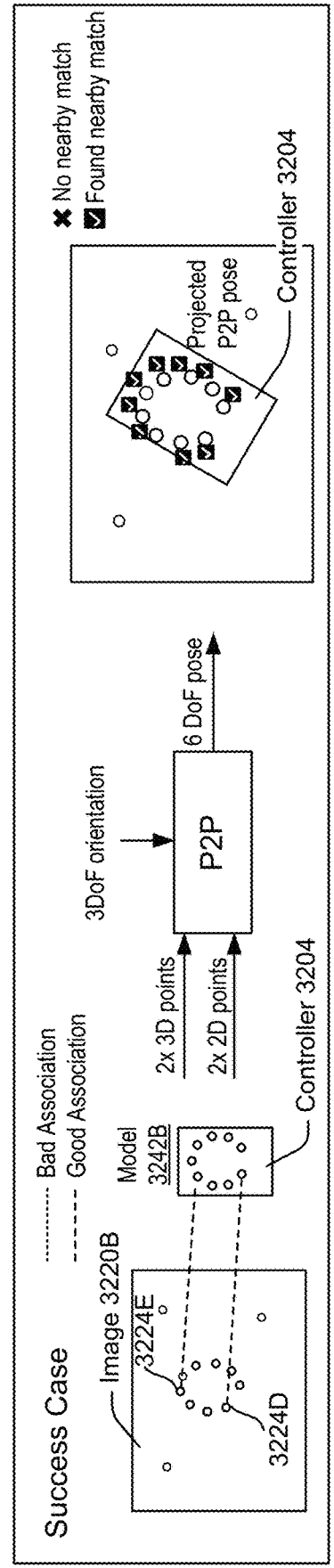
FIG. 32B illustrates a success case of associating detections with fiducials to determine a pose of a controller.

FIG. 32B illustrates a success case of associating detections with fiducials to determine a pose of the controller 3204. A wearable system receives an image 3220B of a field of view of a headset camera and identifies a set of objects 3224D-3224E in the image 3220B. The set of objects 3224D-3224E may include fiducial projections and/or detections of other light source projections. Objects 3224D-3224E each correspond to a fiducial of the controller 3204. The wearable system selects a subset of the set of objects in the image 3220B. The subset can include a predetermined number (e.g., at least two) objects. The wearable system can also select a subset of the set of objects from a model 3242B of a controller 3204 that includes fiducials. So, the selected objects in the image 3220B may be two-dimensional points and the selected objects in the model 3242B may be three-dimensional points. In FIG. 32B, the predetermined number in the subsets is three.

The subsets of the objects, along with a rotational measurement (e.g., 3DOF orientation) of the controller 3204 determined from an IMU, can be input into the P2P algorithm, which outputs a 6DOF pose of the controller 3204. The pose for the controller 3204 is calculated by associating the subsets with fiducials based on a known geometry of the arrangement of the fiducials. The wearable system may repeatedly select subsets of sets of objects and calculate poses for the controller 3204 by associating the subsets with groups of fiducials. The wearable system calculates statistics for the associated subsets based on a compatibility of poses for the groups of fiducials and based on the rotational measurement. To do this, the wearable system can project the pose into the image 3220A and validate an alignment of the subset of objects against the remaining points in the image 3220A. The wearable system can determine a number of the set of objects that align with the set of fiducials for a pose. FIG. 32B may be a success case because all nine of the fiducials of the controller 3204 are determined to match the pose calculated by the algorithm. So, the wearable system may determine that the association between the set of objects and the set of fiducials is correct based on the statistics, and thus that the calculated pose is accurate for the controller 3204.

Figure 33:
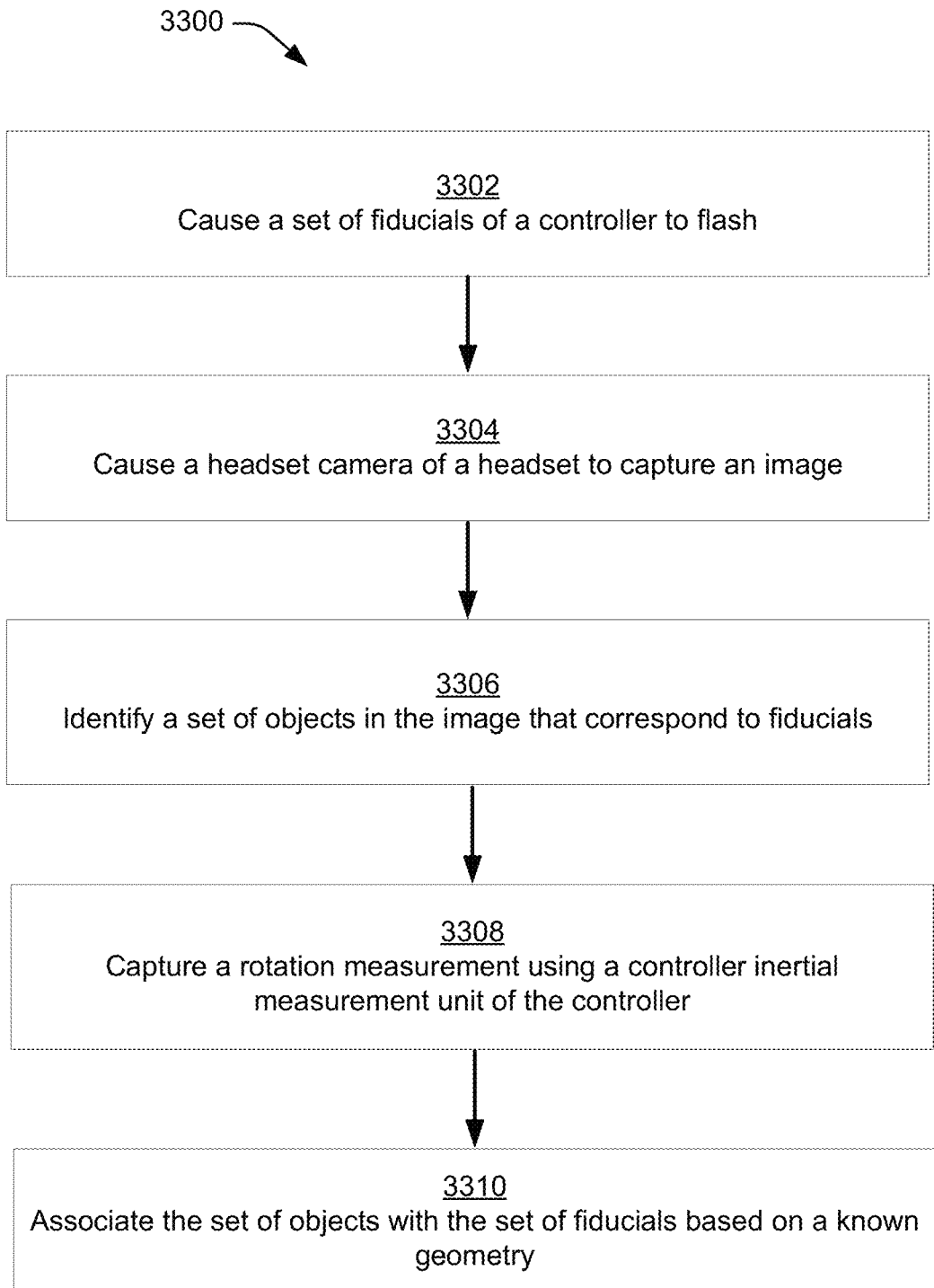
FIG. 33 illustrates an example method of fiducial association using inertial measurement unit measurements, according to some embodiments of the present invention.

FIG. 33 illustrates an example method 3300 of fiducial association using IMU measurements, according to some embodiments of the present invention. One or more steps of method 3300 may be performed in a different order than the illustrated embodiment, and one or more steps of method 3300 may be omitted during performance of method 3300. Furthermore, two or more steps of method 3300 may be performed simultaneously or concurrently with each other.

At step 3302, a set of fiducials of a controller is caused to flash. The set of fiducials are arranged in a known geometry. The set of fiducials can flash at a fiducial frequency and a fiducial period.

At step 3304, a headset camera of a headset is caused to capture an image. The image can show the controller if the controller is in a field of view of the headset camera when the image is captured.

At step 3306, a set of objects in the image is identified that corresponds to fiducials. The set of objects can correspond to the set of fiducials of the controller and/or one or more light sources projected in the image.

At step 3308, a rotation measurement is captured using a controller inertial measurement unit of the controller. The rotation measurement may correspond to a position and an orientation of the controller with respect to the headset.

At step 3310, the set of objects is associated with the set of fiducials based on the known geometry. Subsets of the set of objects can be repeatedly selected and poses for the controller can be calculated by associating the subsets with multiple groups of fiducials. Statistics can be calculated for the associated subsets based on a compatibility of poses for the multiple groups of fiducials and a correct association between the set of objects and the set of fiducials can be found based on the statistics. The subsets of the set of objects can be input into a P2P algorithm configured to output the poses for the controller.

Reducing the image search area during constellation tracking has several benefits. First, portions of the image that contain fiducials for other controllers can be avoided, thereby eliminating the need to perform one or more multiple controller disambiguation methods. Second, reducing the image search area can reduce the likelihood of false positives when identifying fiducials (e.g., due to LEDs or "LED like" features on other objects), which can be much more problematic to the 6DOF pose tracking algorithm than false negatives. Third, reducing the image search area decreases the search time and allows the 6DOF pose of the controller to be calculated quicker.

Figure 34:
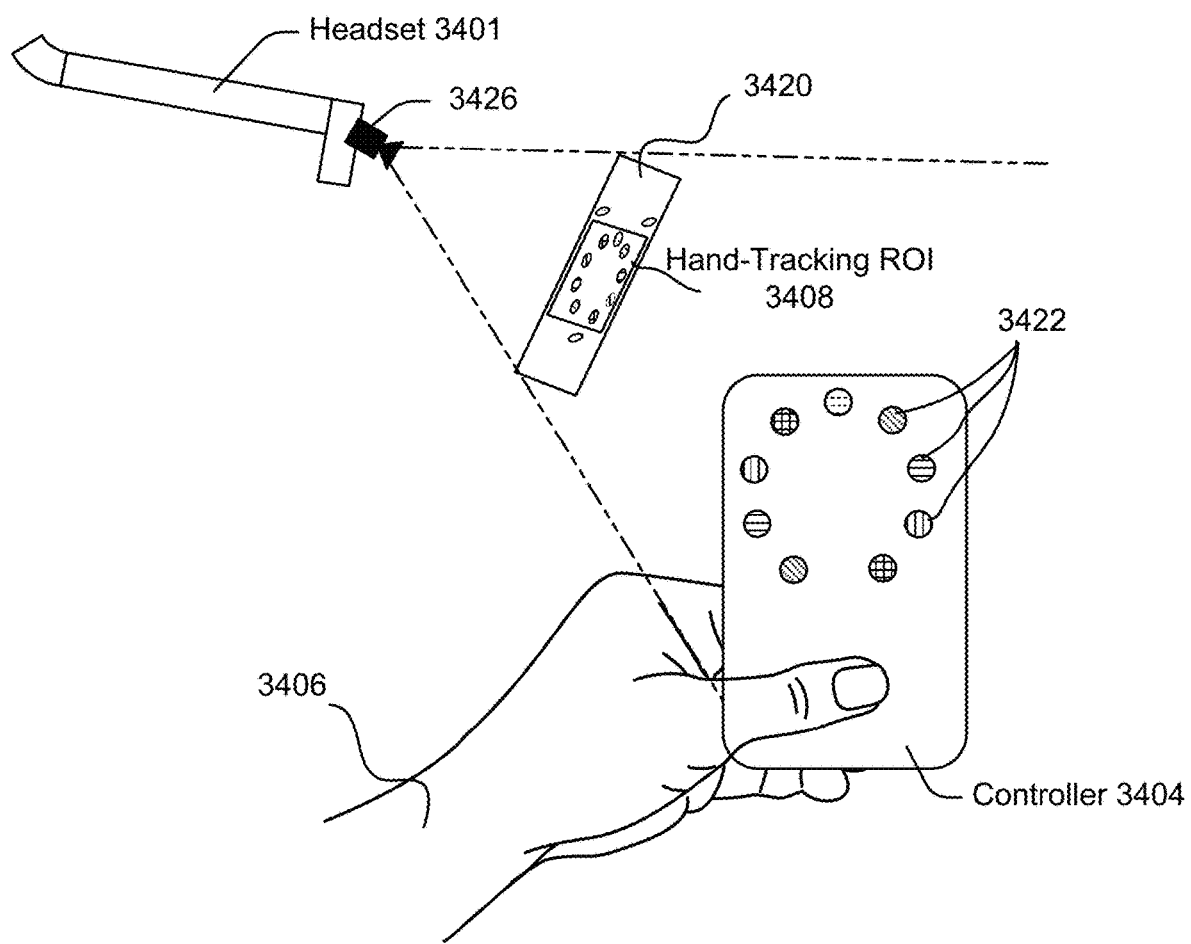
FIG. 34 illustrates an example of a hand tracking region of interest.

FIG. 34 illustrates an example of a hand tracking region of interest. In some embodiments, hand tracking data is used to reduce the image search area by reducing the size of the image and/or the searched area of the image based on the pose of the hand. Alternatively or additionally, fiducials may still be identified in the entire image and subsequently any identified fiducials outside of a region of interest may be eliminated. In one example, a camera 3426 of a headset 3401 may capture an image 3420 containing fiducials 3422 of a controller 3404. The headset 3401 can detect a hand 3406 in the image and generate hand tracking data about the hand 3406. The hand tracking data may be used to identify a position and/or an orientation of the user's hand 3406 in the image 3420. A region of interest 3408 in the image 3420 may be determined based on the position and/or the orientation of the hand 3406. As an example, the region of interest 3408 may be a predetermined area around the hand 3406 (e.g., a box starting 2 inches above the hand). Next, the region of interest 3408 may be searched to identify one or more fiducials 3422. The identified fiducials 3422 may be associated with the controller's fiducials 3422, leading to the calculation of the 6DOF pose of the controller 3404.

In many cases, hand tracking is already being performed while the controller 3404 is in the user's hand 3406, and therefore leveraging this hand tracking data during constellation tracking has little cost. Alternatively or additionally, some embodiments can cause hand tracking to be performed in response to generating a command to reduce the image search area.

Figure 35A:
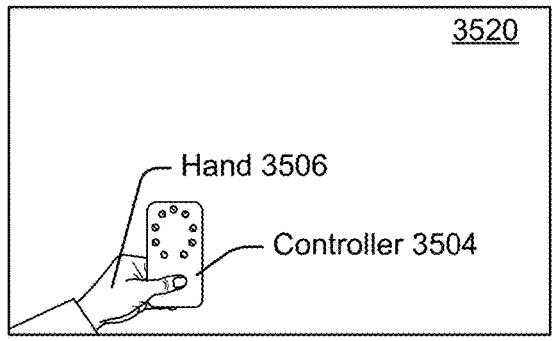
FIGS. 35A-35E illustrate exemplary steps of performing hand tracking using a position of a hand to reduce an image search space.
Figure 35B:
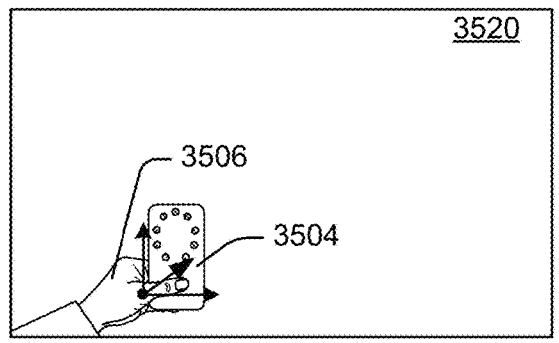

FIGS. 35A-35E illustrate exemplary steps of performing hand tracking using a position of a hand to reduce an image search space. In FIG. 35A, an image 3520 is captured with a headset camera. The image 3520 can depict a hand 3506 of a user and a constellation of fiducials of a controller 3504. So, the headset can generate hand tracking data that can be used to determine a position and/or an orientation of the hand 3506 in the image. In FIG. 35B, the hand tracking data is used to determine the position and/or orientation of hand 3506. The position may be represented as a distance in each direction that the hand 3506 is from the headset and the orientation may be represented as a rotation of the hand 3506 in each direction with respect to the headset.

Figure 35C:
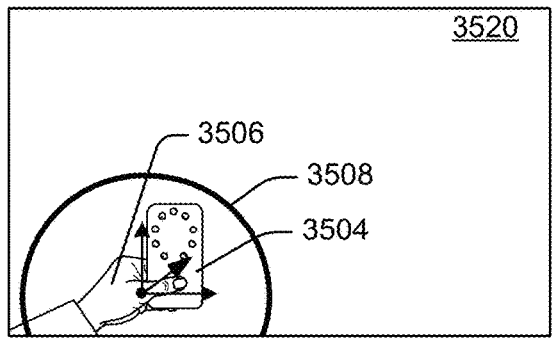

In FIG. 35C, the headset can determine a region of interest 3508 based on the position of the hand 3506. As an example, a reference point may be determined and the region of interest 3508 may be a circular area of a particular radius around the reference point. For instance, the reference point may be a point in which the hand 3506 is determined to intersect with the controller 3504. A predefined radius can be established around the reference point and the area within the radius can be the region of interest 3508. In an example, the radius may be 8 inches.

Figure 35D:
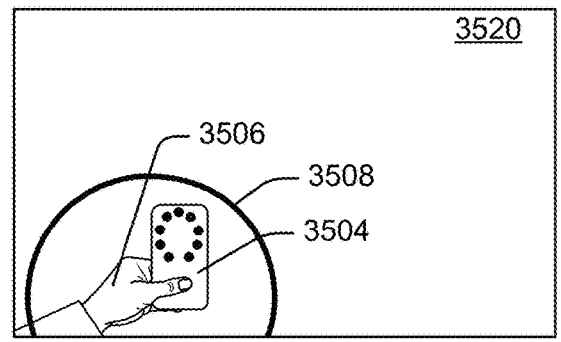
Figure 35E:
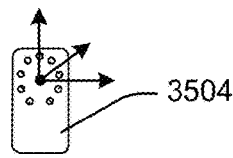

In FIG. 35D, objects in the region of interest 3508 are identified. The objects may be light projections corresponding to fiducials of the controller 3504 or other light sources projected in the image. For instance, in the region of interest 3508, nine objects may be identified, each of which correspond to a fiducial of the controller 3504. In FIG. 35E, the wearable system determines a 6DOF pose of the controller 3504 based on the identified objects. The wearable system may perform a process similar to that described in FIG. 29 using a P3P algorithm or in FIG. 33 using a P2P algorithm and IMU data of the controller 3504 to determine the 6DOF pose of the controller 3504.

Figure 36A:
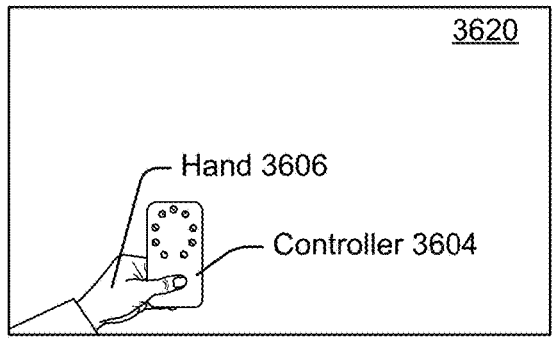
FIGS. 36A-36E illustrate exemplary steps of performing hand tracking using a position and orientation of a hand to reduce an image search space.
Figure 36B:
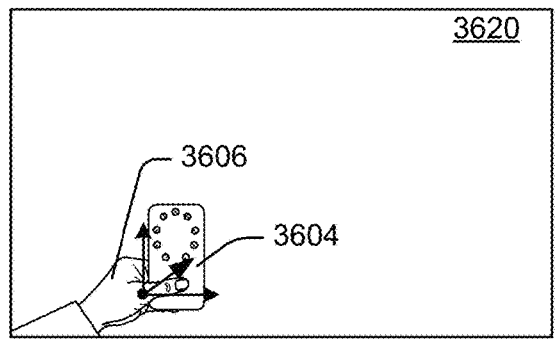

FIGS. 36A-36E illustrate exemplary steps of performing hand tracking using a position and orientation of a hand to reduce an image search space. In FIG. 36A, an image 3620 is captured with a headset camera. The image 3620 can depict a hand 3606 of a user and a constellation of fiducials of a controller 3604. So, the headset can generate hand tracking data that can be used to determine a position and/or an orientation of the hand 3606 in the image 3620. In FIG. 36B, the hand tracking data is used to determine the position and/or orientation of hand 3606. The position may be represented as a distance in each direction that the hand 3606 is from the headset and the orientation may be represented as a rotation of the hand 3606 in each direction with respect to the headset.

Figure 36C:
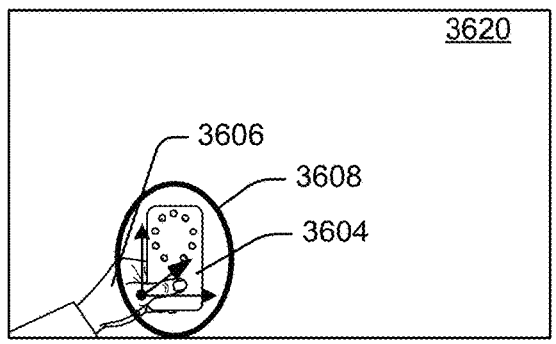

In FIG. 36C, the headset can determine a region of interest 3608 based on the position and the orientation of the hand 3606. As an example, a reference point may be determined and the region of interest 3608 may be an ovoid area of particular radii around the reference point. For instance, the reference point may be a point in which the hand 3606 is determined to intersect with the controller 3604. An oval with predefined radii can be established around the reference point and the area within the oval can be the region of interest 3608. The orientation of the hand 3606 can be used to skew the region of interest 3608 in a direction in which the controller 3604 is being held.

Figure 36D:
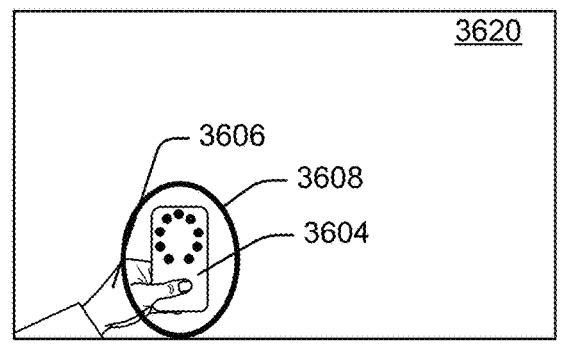
Figure 36E:
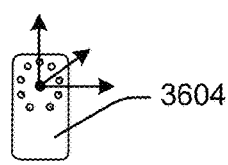

In FIG. 36D, objects in the region of interest 3608 are identified. The objects may be light projections corresponding to fiducials of the controller 3604 or other light sources projected in the image. For instance, in the region of interest 3608, nine objects may be identified, each of which correspond to a fiducial of the controller 3604. In FIG. 36E, the wearable system determines a 6DOF pose of the controller 3604 based on the identified objects. The wearable system may perform a process similar to that described in FIG. 29 using a P3P algorithm or in FIG. 33 using a P2P algorithm and IMU data of the controller 3604 to determine the 6DOF pose of the controller 3604.

Figure 37A:
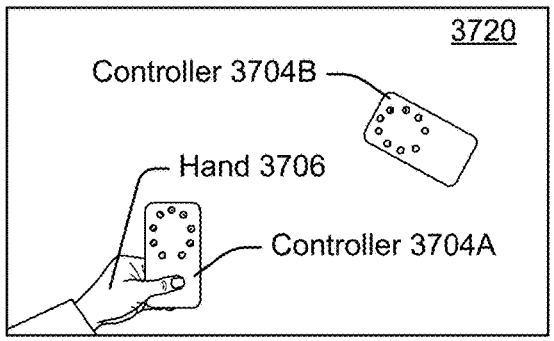
FIGS. 37A-37F illustrate exemplary steps of performing hand tracking to reduce an image search space.
Figure 37B:
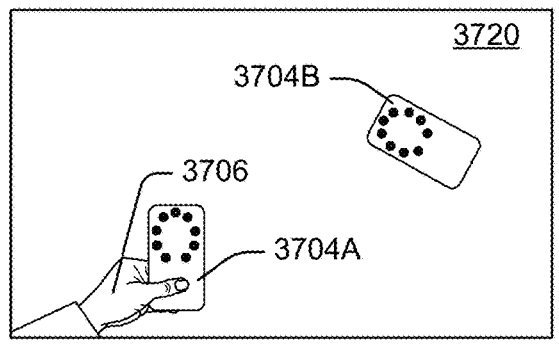

FIGS. 37A-37F illustrate exemplary steps of performing hand tracking to reduce an image search space. In FIG. 37A, an image 3720 is captured with a headset camera. The image 3720 can depict a hand 3706 of a user and at least one constellation of fiducials of at least one controller. As illustrated, the image 3720 can depict a first constellation of fiducials of controller 3704A and a second constellation of fiducials of controller 3704B. The headset can generate hand tracking data that can be used to determine a position and/or an orientation of the hand 3706 in the image 3720. In FIG. 37B, objects are identified in the image 3720. The objects may be light projections corresponding to fiducials of the controller 3704A and/or other light sources projected in the image 3720 (e.g., the fiducials of controller 3704B).

Figure 37C:
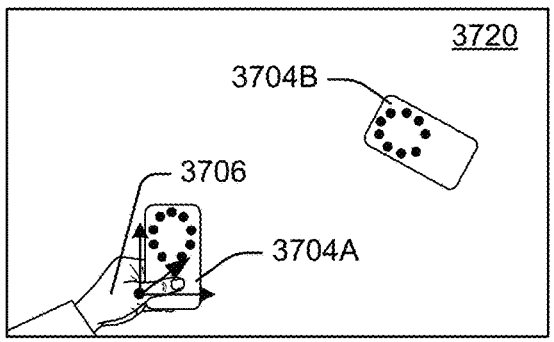
Figure 37D:
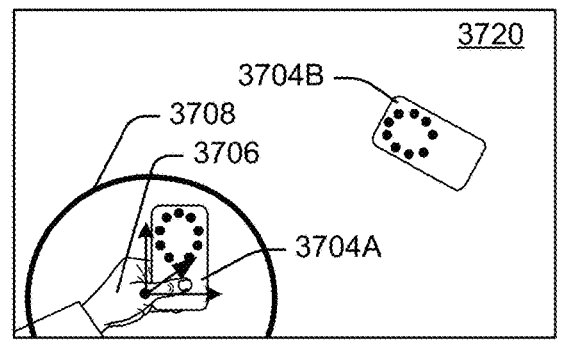

In FIG. 37C, hand tracking data is used to determine the position and/or orientation of the hand 3706. The position may be represented as a distance in each direction that the hand 3706 is from the headset and the orientation may be represented as a rotation of the hand 3706 in each direction with respect to the headset. In FIG. 37D, the headset can determine a region of interest 3708 based on the position of the hand 3706. As an example, a reference point may be determined and the region of interest 3708 may be a circular area of a particular radius around the reference point. For instance, the reference point may be a point in which the hand 3706 is determined to intersect with the controller 3704. A predefined radius can be established around the reference point and the area within the radius can be the region of interest 3708. In an example, the radius may be 8 inches.

Figure 37E:
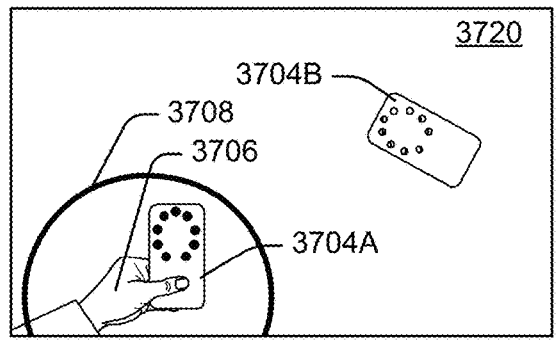
Figure 37F:
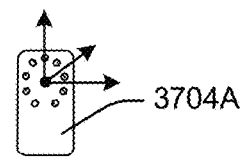

In FIG. 37E, the wearable system excludes identified objects outside of the region of interest 3708. So, since the fiducials of the controller 3704A are within the region of interest 3708 and the fiducials of controller 3704B are outside of the region of interest 3708, the fiducials of the controller 3704B can be excluded from constellation pose tracking. In FIG. 37F, the wearable system determines a 6DOF pose of the controller 3704A based on the identified objects. The wearable system may perform a process similar to that described in FIG. 29 using a P3P algorithm or in FIG. 33 using a P2P algorithm and IMU data of the controller 3704A to determine the 6DOF pose of the controller 3704A.

Figure 38:
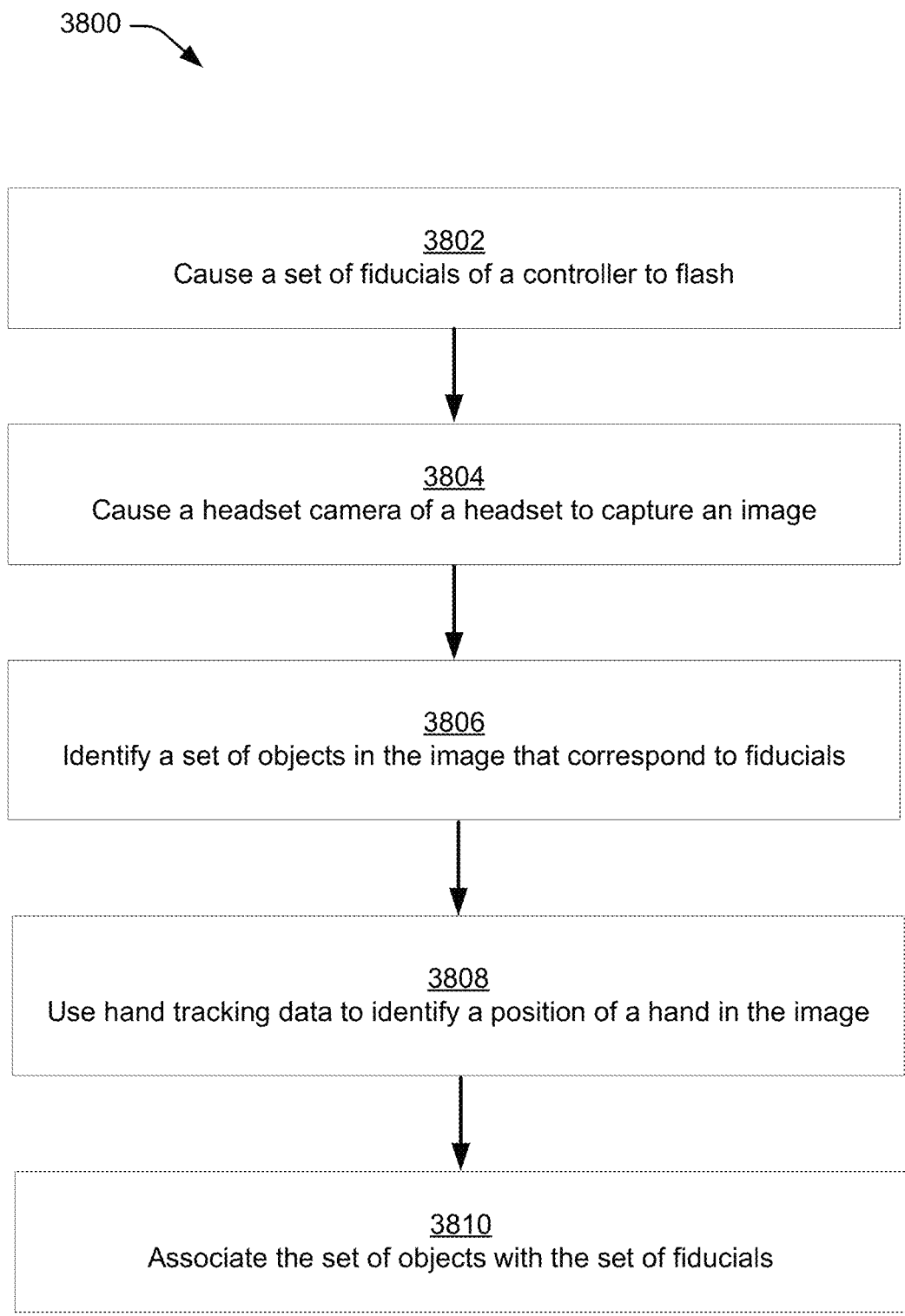
FIG. 38 illustrates an example method 3800 of using hand tracking to reduce a constellation search area, according to some embodiments of the present invention.

FIG. 38 illustrates an example method 3800 of using hand tracking to reduce a constellation search area, according to some embodiments of the present invention. One or more steps of method 3800 may be performed in a different order than the illustrated embodiment, and one or more steps of method 3800 may be omitted during performance of method 3800. Furthermore, two or more steps of method 3800 may be performed simultaneously or concurrently with each other.

At step 3802, a set of fiducials of a controller is caused to flash. The set of fiducials are arranged in a known geometry. The set of fiducials can flash at a fiducial frequency and a fiducial period.

At step 3804, a headset camera of a headset is caused to capture an image. The image can show the controller if the controller is in a field of view of the headset camera when the image is captured.

At step 3806, a set of objects in the image is identified that corresponds to fiducials. The set of objects can correspond to the set of fiducials of the controller, other set(s) of fiducials of other controller(s) in the image, and/or one or more light sources projected in the image.

At step 3808, hand tracking data is used to identify a position of a hand in the image. The hand can be detected in the image, and the hand tracking data can identify the position of the hand based on the detection. The hand tracking data may also be used to identify an orientation of the hand in the image.

At step 3810, the set of objects is associated with the set of fiducials. In an example, a region of interest can be determined in the image based on the position and/or the orientation of the hand in the image. A first subset of the set of objects that are outside of the region of interest can be excluded, and a second subset of the set of objects that are inside the region of interest can be associated with the set of fiducials. The first subset and the second subset can be mutually exclusive. In another example, the region of interest may be determined based on the position and/or the orientation of the hand in the image, a set of objects in the region of interest in the image that correspond to fiducials can be identified, and the set of objects in the region of interest can be associated with the set of fiducials.

Although the wearable device (e.g., the headset in any of the previous figures) may be calibrated with highly sophisticated instruments while in the factory, during use it may become deformed due to heat, use, and various forms of wear and tear, causing the factory calibration to become inaccurate. One possible solution is for a user to repeatedly bring the wearable device back to the factory for recalibration. To avoid the obvious costs of such a solution, some embodiments allow for an accurate and robust run-time calibration while the wearable device is in use, eliminating the need for factory recalibration. Embodiments can predict a current calibration level of the wearable device and can perform the calibration based on the predicted calibration level.

During operation, the wearable device may use one or more parameters from a calibration profile to account for the spacing and orientation differences between the front facing cameras (e.g., left front-facing world camera 306A and right front-facing world camera 306B in FIG. 3) so that captured images can be correctly analyzed. The calibration profile may additionally be used when generating virtual image light to account for the spacing and orientation differences between eyepieces such that a user may view virtual image elements comfortably and in proper alignment. To accomplish this, the wearable device may repeatedly access the calibration profile to ensure that the parameters being used reflect the most updated and accurate parameters that are available. In some instances, the wearable device may retrieve parameters from the calibration profile immediately after a calibration process is performed.

Figure 39:
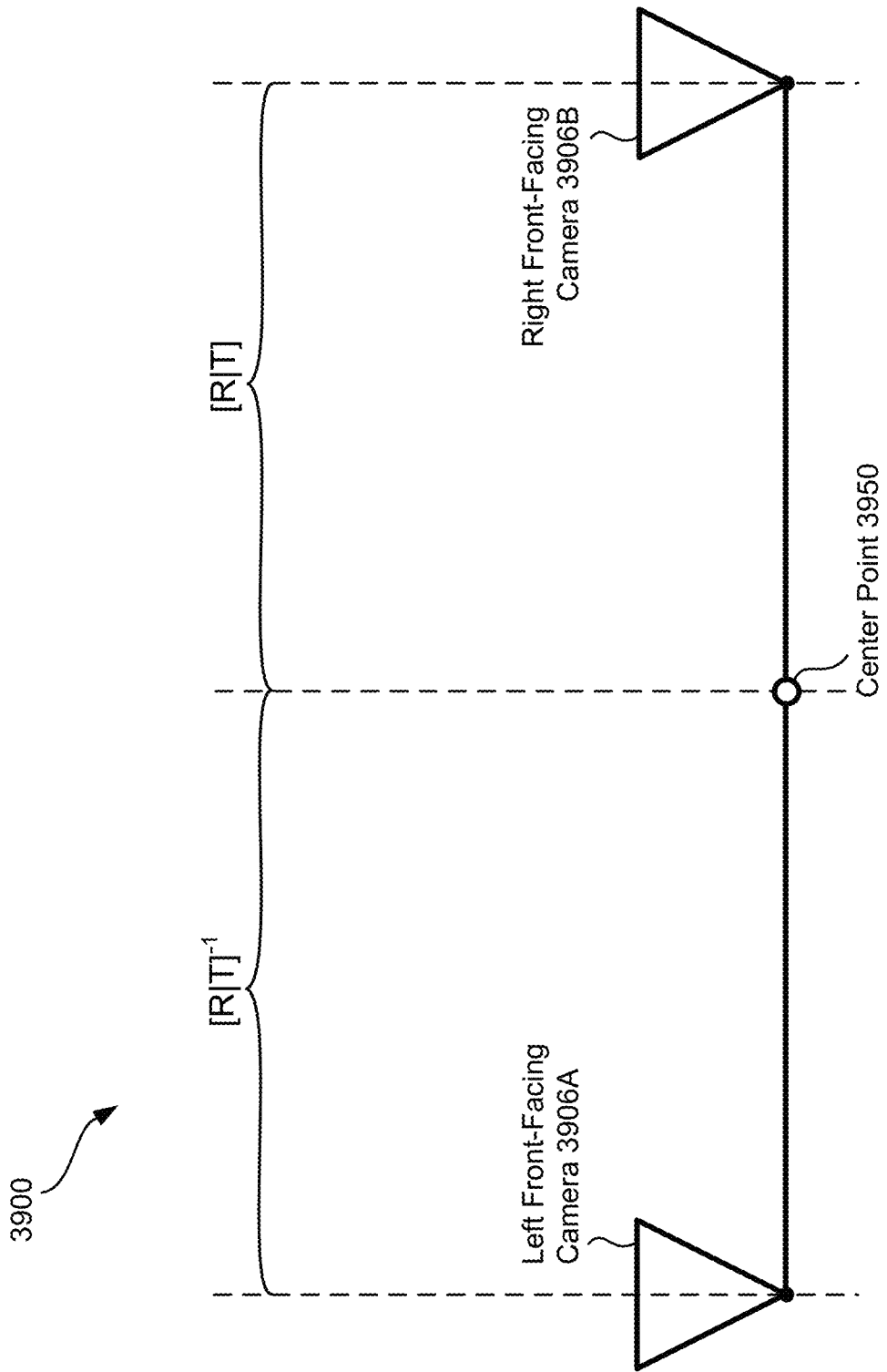
FIG. 39 illustrates a diagram of an example of a calibration profile for a wearable device.

FIG. 39 illustrates a diagram of an example of a calibration profile 3900 for a wearable device. In some embodiments, the calibration profile 3900 is maintained by the wearable device to model a physical spatial relationship between the left and right front-facing cameras 3906. The calibration profile 3900 may include a translation parameter T corresponding to the relative distance between the left front-facing camera 3906A and the right front-facing camera 3906B, and a rotation parameter R corresponding to the relative angular orientation between the left front-facing camera 3906A and the right front-facing camera 3906B. Each of translation parameter T and rotation parameter R may take on a wide range of data types. For example, translation parameter T may be a single quantity (e.g., 0.1 meters), a one-dimensional matrix (e.g., [0.1; 0; 0] meters), a multi-dimensional matrix (e.g., [[0.1; 0; 0][0; 0; 0][0; 0; 0]] meters), an array, a vector, or any other possible representation of single or multiple quantities. Similarly, rotation parameter R may be a single quantity (e.g., 0.5 degrees), a one-dimensional matrix (e.g., [0.5; 0; 0] degrees), a multi-dimensional matrix (e.g., [[0.5; 0; 0][0; 0; 0][0; 0; 0]] degrees), an array, a vector, or any other possible representation of single or multiple quantities.

The calibration profile 3900 may represent each of the front-facing cameras 3906 using the pinhole camera model as occupying a single point. A center point 3950 between the left front-facing camera 3906A and the right front-facing camera 3906B may be used to track the position of the wearable device in the environment with respect to a world origin and may also be used as a baseline for translation and rotation adjustments. In some embodiments, the relative distance between the left front-facing camera 3906A and the right front-facing camera 3906B and the center point 3950 may be equal to translation parameter T, where translation parameter T represents a 3×1 matrix corresponding to a three-dimensional (3D) vector (e.g., [0.1 0.2 0.1] meters). In some embodiments, the relative angular orientation between the left front-facing camera 3906A and the right front-facing camera 3906B and the center point 3950 may be equal to rotation parameter R, where rotation parameter R represents a 3×3 matrix. Accordingly, the transformation between the right front-facing camera 3906B and the center point 3950 may be modeled by the transformation [T|R] and the transformation between the left front-facing camera 3906A and the center point 3950 may be modeled by the transformation $[T|R]^{-1}$.

Figure 40:
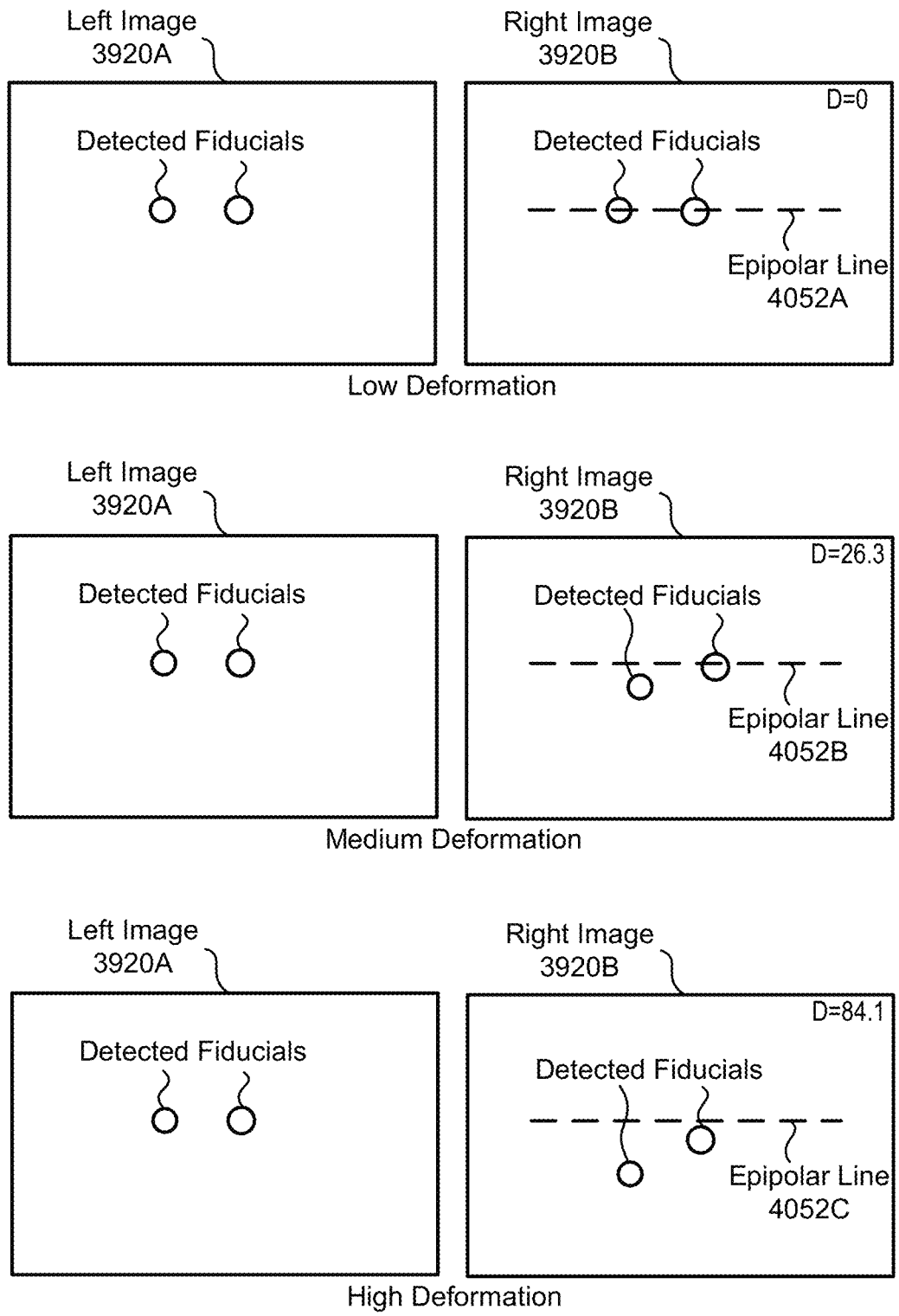
FIG. 40 illustrates various examples of calibration deformation amounts.

A calibration level associated with the calibration profile 3900 may be periodically determined. Based on the calibration level, the wearable device may cause one of several types of calibrations to occur. To determine a calibration level associated with the calibration profile 3900, a deformation amount D of the wearable device may be determined, where the deformation amount D is inversely proportional to the calibration level. FIG. 40 illustrates various examples of deformation amounts. In some instances, the calibration level is determined by identifying the same fiducials in two images 3920 captured by the left front-facing camera 3906A and the right front-facing camera 3906B. After determining that both images 3920 include at least two of the same fiducials, an epipolar line 4052 may be generated based on one image (e.g., the left image 3920A) and may be projected onto the other image (e.g., the right image 3920B). The epipolar line 4052 may be projected onto the right image 3920B using the most updated version of the calibration profile 3900. Deviation in the positions of the fiducials from the epipolar line 4052 indicates a calibration error between the left front-facing camera 3906A and the right front-facing camera 3906B. As such, the comparison between the fiducials and the epipolar line 4052 can be used to recalibrate camera.

As illustrated, the wearable device may be determined to have low deformation when the detected fiducials that are projected from the left image 3920A onto the right image 3920B are substantially centered with the epipolar line 4052A (e.g., deformation amount D is less than 20). The wearable device may be determined to have medium deformation when the detected fiducials that are projected from the left image 3920A onto the right image 3920B are slightly displaced from the epipolar line 4052B (e.g., deformation amount D is between 20 and 80). The detected fiducials might be slightly displaced if one of the detected fiducials is substantially centered with the epipolar line 4052B while the other detected fiducial is unaligned with the epipolar line 4052B. The wearable device may be determined to have high deformation when the detected fiducials that are projected from the left image onto the right image are substantially displaced from the epipolar line 4052C (e.g., deformation amount D is greater than 80). The detected fiducials might be significantly displaced if both of the detected fiducials are unaligned with the epipolar line 4052C.

Figure 41:
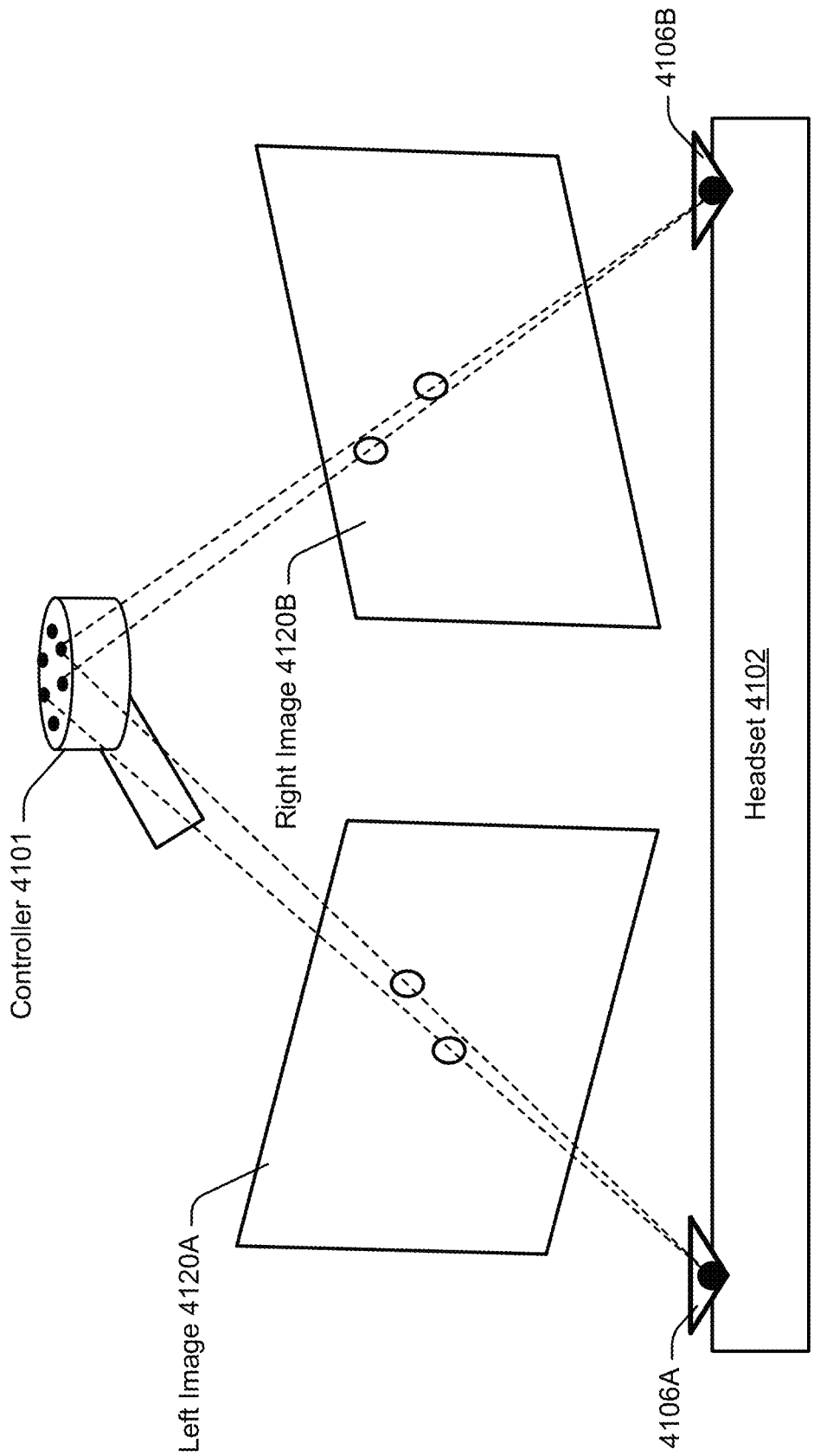
FIG. 41 illustrates calibration of a headset or other wearable device using images containing fiducials positioned on a controller.

FIG. 41 illustrates calibration of a headset 4102 or other wearable device using images 4120 containing fiducials positioned on a controller 4101. The headset 4102 may include stereo cameras 4106 including a left front-facing camera 4106A and a right front-facing camera 4106B. The headset 4102 may be vulnerable to deformation because the cameras 4106 are far apart and point triangulation is sensitive to camera extrinsic calibration. Given the location of features in the environment and their projected two-dimensional location in the cameras, it may be possible to recover the extrinsics of the stereo system. The quality of the calibration may depend on camera intrinsic calibration, constellation extrinsic calibration, and constellation detection on the image. The quality of calibration may be improved using several image pairs 4120 in the approach described in FIGS. 39-40.

In some examples, the controller 4101 may be calibrated with a headset that includes wearable stereo cameras. To recover the location of the controller using the constellation of fiducials, it may be important to have a good fiducial calibration relative the controller rig. Given a calibrated headset and the 2D location of the projected constellation on the headset cameras, it may be possible to triangulate each fiducial and recover the relative position between each other. The quality of the calibration may depend on camera intrinsic calibration, constellation extrinsic calibration, and constellation detection on the image. The quality of calibration may be improved using several image pairs in the approach described in FIGS. 39-40.

Figure 42:
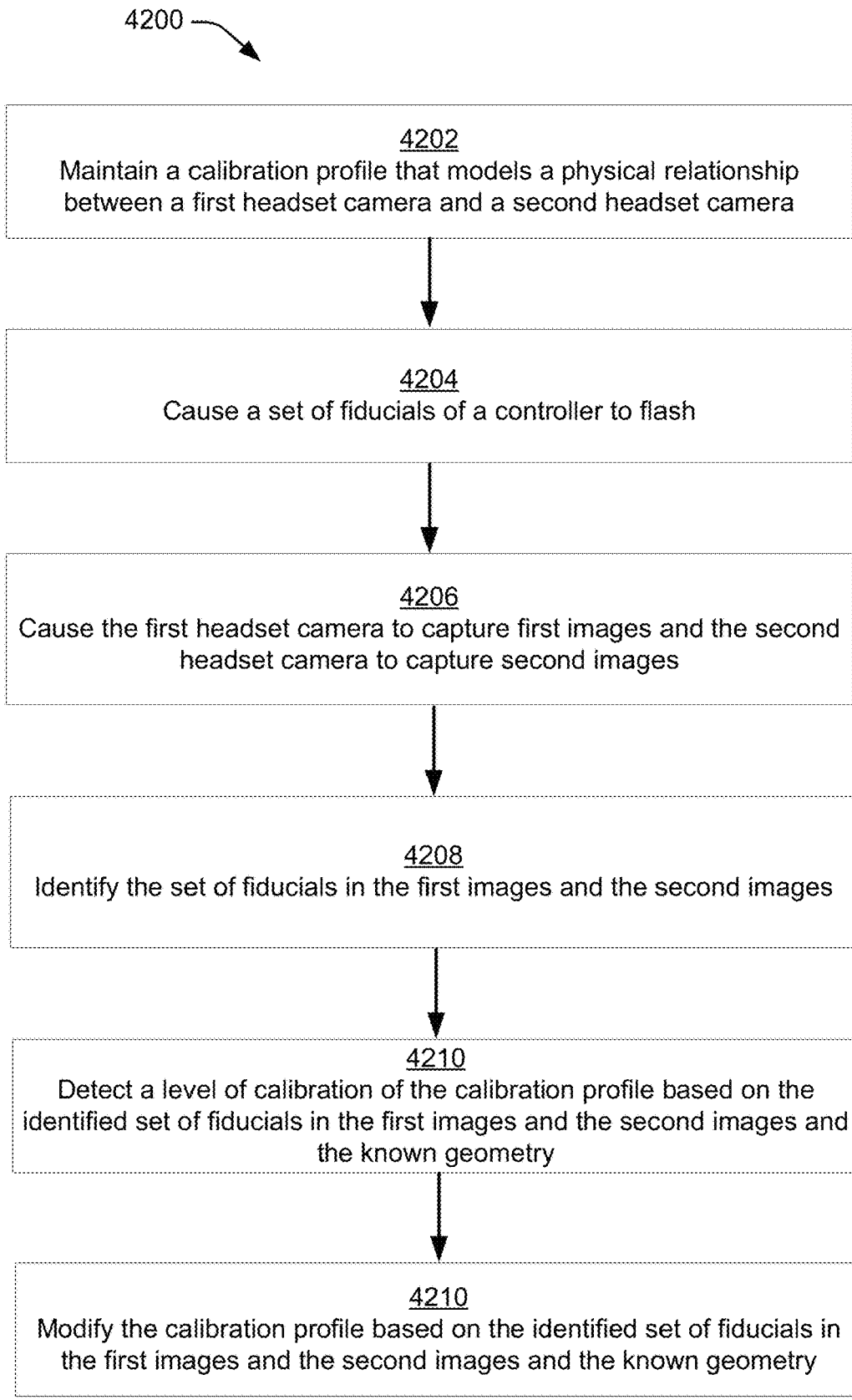
FIG. 42 illustrates an example method of using fiducials for headset camera calibration, according to some embodiments of the present invention.

FIG. 42 illustrates an example method 4200 of using fiducials for headset camera calibration, according to some embodiments of the present invention. One or more steps of method 4200 may be performed in a different order than the illustrated embodiment, and one or more steps of method 4200 may be omitted during performance of method 4200. Furthermore, two or more steps of method 4200 may be performed simultaneously or concurrently with each other.

At step 4202, a calibration profile is maintained that models a physical relationship between a first headset camera and a second headset camera. The first headset camera may be a left front-facing camera and the second headset camera may be a right front-facing camera. The calibration profile can include a translation parameter corresponding to the relative distance between the first headset camera and the second headset camera and a rotation parameter corresponding to the relative angular orientation between the first headset camera and the second headset camera.

At step 4204, a set of fiducials of a controller is caused to flash.

At step 4206, the first headset camera is caused to capture first images and the second headset camera is caused to capture second images.

At step 4208, the set of fiducials are identified in the first images and the second images. After determining that both images include at least two of the same fiducials, an epipolar line may be generated based on one image (e.g., a first image of the first images) and may be projected onto another image (e.g., a second image of the second images).

At step 4210, a level of calibration of the calibration profile is detected based on the identified set of fiducials in the first images and the second images and the known geometry. The level of calibration can be determined based on a deviation of the set of fiducials from the epipolar line in the second image. A higher deviation can correspond to a higher deformation amount and a lower calibration level.

At step 4212, the calibration profile is modified based on the identified set of fiducials in the first images and the second images and the known geometry. The calibration profile may be modified so that the identified set of fiducials in the first images align with the identified set of fiducials in the second images.

Figure 43:
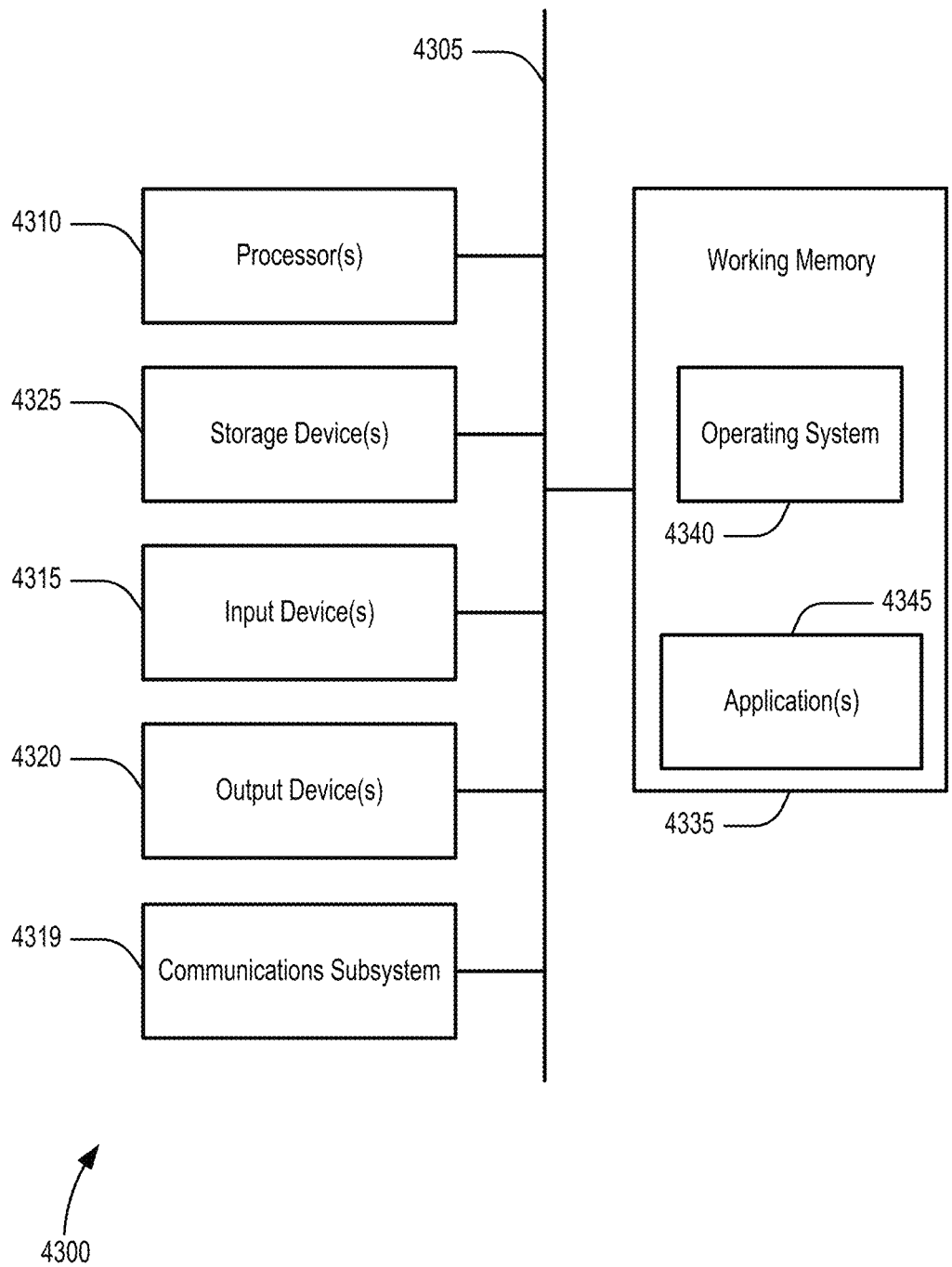
FIG. 43 illustrates a simplified computer system.

FIG. 43 illustrates a simplified computer system 4300 according to an embodiment described herein. Computer system 4300 as illustrated in FIG. 43 may be incorporated into devices described herein. FIG. 43 provides a schematic illustration of one embodiment of computer system 4300 that can perform some or all of the steps of the methods provided by various embodiments. It should be noted that FIG. 43 is meant only to provide a generalized illustration of various components, any or all of which may be utilized as appropriate. FIG. 43, therefore, broadly illustrates how individual system elements may be implemented in a relatively separated or relatively more integrated manner.

Computer system 4300 is shown comprising hardware elements that can be electrically coupled via a bus 4305, or may otherwise be in communication, as appropriate. The hardware elements may include one or more processors 4310, including without limitation one or more general-purpose processors and/or one or more special-purpose processors such as digital signal processing chips, graphics acceleration processors, and/or the like; one or more input devices 4315, which can include without limitation a mouse, a keyboard, a camera, and/or the like; and one or more output devices 4320, which can include without limitation a display device, a printer, and/or the like.

Computer system 4300 may further include and/or be in communication with one or more non-transitory storage devices 4325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 4300 might also include a communications subsystem 4319, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 4319 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 4319. In other embodiments, a portable electronic device, e.g., the first electronic device, may be incorporated into computer system 4300, e.g., an electronic device as an input device 4315. In some embodiments, computer system 4300 will further comprise a working memory 4335, which can include a RAM or ROM device, as described above.

Computer system 4300 also can include software elements, shown as being currently located within the working memory 4335, including an operating system 4340, device drivers, executable libraries, and/or other code, such as one or more application programs 4345, which may comprise computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 4325 described above. In some cases, the storage medium might be incorporated within a computer system, such as computer system 4300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 4300 and/or might take the form of source and/or installable code, which, upon compilation and/or installation on computer system 4300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 4300 to perform methods in accordance with various embodiments of the technology. According to a set of embodiments, some or all of the procedures of such methods are performed by computer system 4300 in response to processor 4310 executing one or more sequences of one or more instructions, which might be incorporated into the operating system 4340 and/or other code, such as an application program 4345, contained in the working memory 4335. Such instructions may be read into the working memory 4335 from another computer-readable medium, such as one or more of the storage device(s) 4325. Merely by way of example, execution of the sequences of instructions contained in the working memory 4335 might cause the processor(s) 4310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 4300, various computer-readable media might be involved in providing instructions/code to processor(s) 4310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 4325. Volatile media include, without limitation, dynamic memory, such as the working memory 4335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 4310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 4300.

The communications subsystem 4319 and/or components thereof generally will receive signals, and the bus 4305 then might carry the signals and/or the data, instructions, etc. carried by the signals to the working memory 4335, from which the processor(s) 4310 retrieves and executes the instructions. The instructions received by the working memory 4335 may optionally be stored on a non-transitory storage device 4325 either before or after execution by the processor(s) 4310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a wearable system having a headset and a controller, the method comprising:
    alternating between performing headset tracking and performing controller tracking by repeatedly capturing images using a headset camera of the headset during headset tracking frames and controller tracking frames, respectively;
    during each of the headset tracking frames:
        causing the headset camera to capture a first exposure image of the images having an exposure above a threshold, wherein the first exposure image is associated with a first exposure interval defined by a first exposure start time, a first exposure end time, and a first exposure duration;
    during each of the controller tracking frames:
        causing the headset camera to capture a second exposure image of the images having an exposure below the threshold, wherein the second exposure image is associated with a second exposure interval defined by a second exposure start time, a second exposure end time, and a second exposure duration, wherein the second exposure duration is less than the first exposure duration;
        determining a fiducial interval defined by a fiducial start time and a fiducial end time during which a set of fiducials of the controller are to flash multiple times at a fiducial frequency and a fiducial period, wherein the fiducial interval is determined such that the second exposure interval at least partially overlaps with the fiducial interval; and
        causing the set of fiducials to flash multiple times during the fiducial interval in accordance with the fiducial frequency and the fiducial period.

2. The method of claim 1, wherein the wearable system comprises:
    the headset comprising:
        the headset camera; and
        a headset inertial measurement unit; and
    the controller comprising:
        the set of fiducials arranged in a known geometry;
        one or more controller cameras; and
        a controller inertial measurement unit;
    wherein the wearable system is configured to determine a position or orientation of the headset or the controller based on data captured by the headset camera, the one or more controller cameras, the headset inertial measurement unit, or the controller inertial measurement unit.

3. The method of claim 2, wherein operating the wearable system comprises:
    determining a first pose of the headset with respect to a reference frame based on data captured by the headset camera of the headset or the headset inertial measurement unit of the headset;
    causing the set of fiducials of the controller to flash;
    determining a second pose of the controller with respect to the headset by:
        capturing a headset image using the headset camera;
        identifying the set of fiducials in the headset image; and
        determining the second pose of the controller with respect to the headset based on the set of fiducials identified in the headset image and the known geometry.

4. The method of claim 1, wherein the fiducial interval is determined such that the second exposure interval is centered with the fiducial interval.

5. The method of claim 1, wherein a first length of time of a headset tracking frame of the headset tracking frames is equal to a second length of time of a controller tracking frame of the controller tracking frames.

6. The method of claim 1, wherein the first exposure duration comprises at least one millisecond.

7. A wearable system comprising:
    a headset;
    a controller having a set of fiducials; and
    one or more processors configured to perform operations comprising:
        alternating between performing headset tracking and performing controller tracking by repeatedly capturing images using a headset camera of the headset during headset tracking frames and controller tracking frames, respectively;
        during each of the headset tracking frames:
            causing the headset camera to capture a first exposure image of the images having an exposure above a threshold, wherein the first exposure image is associated with a first exposure interval defined by a first exposure start time, a first exposure end time, and a first exposure duration;
        during each of the controller tracking frames:
            causing the headset camera to capture a second exposure image of the images having an exposure below the threshold, wherein the second exposure image is associated with a second exposure interval defined by a second exposure start time, a second exposure end time, and a second exposure duration, wherein the second exposure duration is less than the first exposure duration;
            determining a fiducial interval defined by a fiducial start time and a fiducial end time during which the set of fiducials of the controller are to flash multiple times at a fiducial frequency and a fiducial period, wherein the fiducial interval is determined such that the second exposure interval at least partially overlaps with the fiducial interval; and
            causing the set of fiducials to flash multiple times during the fiducial interval in accordance with the fiducial frequency and the fiducial period.

8. The wearable system of claim 7, wherein:
    the headset comprises:
        the headset camera; and
        a headset inertial measurement unit; and
    the controller comprises:
        the set of fiducials arranged in a known geometry;
        one or more controller cameras; and
        a controller inertial measurement unit; and the wearable system is configured to determine a position or orientation of the headset or the controller based on data captured by the headset camera, the one or more controller cameras, the headset inertial measurement unit, or the controller inertial measurement unit.

9. The wearable system of claim 8, wherein the operations further comprise:
  determining a first pose of the headset with respect to a reference frame based on data captured by the headset camera of the headset or the headset inertial measurement unit of the headset;
  causing the set of fiducials of the controller to flash;
  determining a second pose of the controller with respect to the headset by:
    capturing a headset image using the headset camera;
    identifying the set of fiducials in the headset image; and
    determining the second pose of the controller with respect to the headset based on the set of fiducials identified in the headset image and the known geometry.

10. The wearable system of claim 7, wherein the fiducial interval is determined such that the second exposure interval is centered with the fiducial interval.

11. The wearable system of claim 7, wherein a first length of time of a headset tracking frame of the headset tracking frames is equal to a second length of time of a controller tracking frame of the controller tracking frames.

12. The wearable system of claim 7, wherein the first exposure duration comprises at least one millisecond.

13. A non-transitory computer-readable medium comprising instructions that, when executed by one or more processors, cause the one or more processors to perform operations for operating a wearable system having a headset and a controller, the operations comprising:
  alternating between performing headset tracking and performing controller tracking by repeatedly capturing images using a headset camera of the headset during headset tracking frames and controller tracking frames, respectively;
  during each of the headset tracking frames:
    causing the headset camera to capture a first exposure image of the images having an exposure above a threshold, wherein the first exposure image is associated with a first exposure interval defined by a first exposure start time, a first exposure end time, and a first exposure duration;
  during each of the controller tracking frames:
    causing the headset camera to capture a second exposure image of the images having an exposure below the threshold, wherein the second exposure image is associated with a second exposure interval defined by a second exposure start time, a second exposure end time, and a second exposure duration, wherein the second exposure duration is less than the first exposure duration;
    determining a fiducial interval defined by a fiducial start time and a fiducial end time during which a set of fiducials of the controller are to flash multiple times at a fiducial frequency and a fiducial period, wherein the fiducial interval is determined such that the second exposure interval at least partially overlaps with the fiducial interval; and
    causing the set of fiducials to flash multiple times during the fiducial interval in accordance with the fiducial frequency and the fiducial period.

14. The non-transitory computer-readable medium of claim 13, wherein the wearable system comprises:
  the headset comprising:
    the headset camera; and
    a headset inertial measurement unit; and
  the controller comprising:
    the set of fiducials arranged in a known geometry;
    one or more controller cameras; and
    a controller inertial measurement unit;
  wherein the wearable system is configured to determine a position or orientation of the headset or the controller based on data captured by the headset camera, the one or more controller cameras, the headset inertial measurement unit, or the controller inertial measurement unit.

15. The non-transitory computer-readable medium of claim 14, wherein the operations further comprise:
  determining a first pose of the headset with respect to a reference frame based on data captured by the headset camera of the headset or the headset inertial measurement unit of the headset;
  causing the set of fiducials of the controller to flash;
  determining a second pose of the controller with respect to the headset by:
    capturing a headset image using the headset camera;
    identifying the set of fiducials in the headset image; and
    determining the second pose of the controller with respect to the headset based on the set of fiducials identified in the headset image and the known geometry.

16. The non-transitory computer-readable medium of claim 13, wherein the fiducial interval is determined such that the second exposure interval is centered with the fiducial interval.

17. The non-transitory computer-readable medium of claim 13, wherein a first length of time of a headset tracking frame of the headset tracking frames is equal to a second length of time of a controller tracking frame of the controller tracking frames.

18. The non-transitory computer-readable medium of claim 13, wherein the first exposure duration comprises at least one millisecond.

* * * * *